(12) United States Patent
Jakobsen et al.

(10) Patent No.: US 9,740,336 B2
(45) Date of Patent: Aug. 22, 2017

(54) TOUCH-SENSITIVE DEVICE

(71) Applicant: O-NET WAVETOUCH LIMITED, Hong Kong (CN)

(72) Inventors: Michael Linde Jakobsen, Roskilde (DK); Vagn Steen Gruner Hanson, Fakse (DK); Henrik Chresten Pedersen, Jylinge (DK)

(73) Assignee: O-Net WaveTouch Limited, Hong Kong (CN)

( * ) Notice: Subject to any disclaimer, the term of this patent is extended or adjusted under 35 U.S.C. 154(b) by 0 days.

(21) Appl. No.: 15/153,626

(22) Filed: May 12, 2016

(65) Prior Publication Data

US 2016/0259484 A1 Sep. 8, 2016

Related U.S. Application Data

(63) Continuation of application No. 12/812,538, filed as application No. PCT/DK2009/000007 on Jan. 12, 2009, now Pat. No. 9,342,187.

(51) Int. Cl.
*G06F 3/042* (2006.01)

(52) U.S. Cl.
CPC .. *G06F 3/0421* (2013.01); *G06F 2203/04109* (2013.01)

(58) Field of Classification Search
CPC ..................... G06F 3/0421; G06F 2203/04109
(Continued)

(56) References Cited

U.S. PATENT DOCUMENTS

| 4,553,842 A | 11/1985 | Griffin |
| 4,868,551 A | 9/1989 | Arditty et al. |

(Continued)

FOREIGN PATENT DOCUMENTS

| AU | 2007216782 | 4/2008 |
| CN | 1776586 | 5/2006 |

(Continued)

OTHER PUBLICATIONS

Search Report and Office Action for CN Application No. 200980108490.4, Mailed: Nov. 19, 2012.
(Continued)

*Primary Examiner* — Claire X Pappas
*Assistant Examiner* — Ngan T Pham Lu
(74) *Attorney, Agent, or Firm* — Hamilton, Brook, Smith & Reynolds, P.C.

(57) ABSTRACT

The present invention relates to an optical touch-sensitive device and a method of determining a position and determining a position change of an object contacting an optical touch sensitive device. In particular, the present invention relates to an optical touch pad and a method of determining a position and determining a position change of an object contacting an optical touch pad. A touch-sensitive device, according to the present invention may comprise a light source, a touch-sensitive waveguide, a detector array, and a first light redirecting member, wherein at least a part of the light propagating towards a specific point of the detector array is prevented from being incident upon the specific point of the detector array when an object contacts a touch-sensitive surface of the touch-sensitive waveguide at a corresponding specific contact point.

11 Claims, 38 Drawing Sheets

(58) Field of Classification Search
USPC ........................................................ 345/175
See application file for complete search history.

(56) References Cited

U.S. PATENT DOCUMENTS

| | | | |
|---|---|---|---|
| 5,515,083 | A | 5/1996 | Casebolt et al. |
| 6,803,900 | B1 | 10/2004 | Berkoff |
| 6,972,753 | B1 * | 12/2005 | Kimura ................ G06F 3/0428 178/18.09 |
| 7,099,553 | B1 | 8/2006 | Graham et al. |
| 7,417,627 | B2 | 8/2008 | Cok |
| 7,460,110 | B2 | 12/2008 | Ung et al. |
| 7,619,618 | B2 | 11/2009 | Westerman et al. |
| 8,031,186 | B2 | 10/2011 | Ostergaard |
| 9,342,187 | B2 | 5/2016 | Jakobsen et al. |
| 2005/0089298 | A1 | 4/2005 | Maxwell et al. |
| 2005/0190162 | A1 | 9/2005 | Newton |
| 2005/0243070 | A1 | 11/2005 | Ung et al. |
| 2005/0248540 | A1 | 11/2005 | Newton |
| 2006/0088244 | A1 | 4/2006 | Kukulj et al. |
| 2006/0114237 | A1 | 6/2006 | Crockett et al. |
| 2006/0188196 | A1 | 8/2006 | Charters et al. |
| 2006/0188198 | A1 | 8/2006 | Charters et al. |
| 2006/0238521 | A1 | 10/2006 | Westerman et al. |
| 2007/0024598 | A1 | 2/2007 | Miller et al. |
| 2007/0052684 | A1 | 3/2007 | Gruhike et al. |
| 2007/0152985 | A1 | 7/2007 | Ostergaard et al. |
| 2007/0190331 | A1 | 8/2007 | Charters et al. |
| 2007/0253717 | A1 | 11/2007 | Charters et al. |
| 2007/0256029 | A1 | 11/2007 | Maxwell |
| 2007/0258691 | A1 | 11/2007 | Charters et al. |
| 2007/0285406 | A1 | 12/2007 | Kukulj et al. |
| 2008/0007540 | A1 | 1/2008 | Ostergaard |
| 2008/0007541 | A1 | 1/2008 | Eliasson et al. |
| 2008/0013913 | A1 | 1/2008 | Lieberman et al. |
| 2008/0014367 | A1 | 1/2008 | Charters et al. |
| 2008/0074402 | A1 | 3/2008 | Cornish et al. |
| 2008/0106527 | A1 | 5/2008 | Cornish et al. |
| 2008/0111796 | A1 | 5/2008 | Atkins et al. |
| 2008/0143690 | A1 | 6/2008 | Jang et al. |
| 2008/0159694 | A1 | 7/2008 | Payne |
| 2008/0198145 | A1 | 8/2008 | Knowles et al. |
| 2008/0272973 | A1 | 11/2008 | Stutzke |
| 2008/0278455 | A1 | 11/2008 | Atkins et al. |
| 2008/0278460 | A1 | 11/2008 | Arnett et al. |
| 2009/0088547 | A1 | 4/2009 | Schamschurin et al. |
| 2009/0122027 | A1 | 5/2009 | Newton |

FOREIGN PATENT DOCUMENTS

| | | |
|---|---|---|
| CN | 1991714 | 7/2007 |
| DE | 20 2005 010570 | 9/2005 |
| EP | 1 164 466 | 3/2004 |
| JP | 63157003 | 10/1988 |
| JP | 5080935 | 4/1993 |
| JP | 2003533786 | 11/2003 |
| WO | WO 01/91043 | 11/2001 |
| WO | WO 2006/086841 | 8/2006 |
| WO | WO 2008/004097 | 1/2008 |
| WO | WO 2008/004101 | 1/2008 |
| WO | WO 2008/034191 | 3/2008 |
| WO | WO 2008/138046 | 11/2008 |
| WO | WO 2009/109014 | 9/2009 |
| WO | WO 2010/048679 | 5/2010 |

OTHER PUBLICATIONS

International Search Report and Written Opinion for Int'l Application No. PCT/DK2009/000007, titled: A Touch-Sensitive Device, Date Mailed: Mar. 16, 2009.

International Preliminary Report on Patentability for Int'l Application No. PCT/DK2009/000007, titled: A Touch-Sensitive Device, Date of Issuance: Jul. 13, 2010.

* cited by examiner

TOUCH-SENSITIVE DEVICE

RELATED APPLICATIONS

This application is a continuation of U.S. application Ser. No. 12/812,538, filed on Jan. 12, 2009 with a 35 U.S.C. §371(c) date of Aug. 20, 2010, which is the U.S. National Stage of International Application No. PCT/DK2009/000007, filed on Jan. 12, 2009, published in English, which claims priority under 35 U.S.C. §119 or 365 to Danish Patent Application No. PA200800051, filed on Jan. 11, 2008. The International application published in English on Jul. 16, 2009 as WO 2009/086836 under PCT Article 21(2). The entire teachings of the above applications are incorporated herein by reference.

TECHNICAL FIELD

The present invention relates to an optical touch-sensitive device and a method of determining a position and determining a position change of an object contacting an optical touch-sensitive device. In particular, the present invention relates to an optical touch pad and a method of determining a position and determining a position change of an object contacting an optical touch pad.

BACKGROUND

DE202005010570-U1 discloses a method of disturbing the conditions for total internal reflection to occur inside a waveguide for determining contact.

SUMMARY

It is one of the objects of the present invention to provide an optical touch-sensitive device that can be manufactured at a low cost.

According to a first aspect of the present invention a touch-sensitive device is provided, comprising: a light source for emitting light, a touch-sensitive waveguide configured for guiding light from the light source towards a touch-sensitive surface of the touch-sensitive waveguide in such a way that an object disturbs at least a part of the guided light at a contact point where the object contacts the touch-sensitive surface, a detector array configured for detecting intensity distribution of light having propagated from the light source through the touch-sensitive waveguide for position encoding the contact point between the object and the touch-sensitive surface, and a first light redirecting member configured for redirecting light having propagated from the light source through the touch-sensitive waveguide and to the first light redirecting member towards the detector array, wherein at least a part of the light propagating towards a specific point of the detector array is prevented from being incident upon the specific point of the detector array when the object contacts the touch-sensitive surface at a corresponding specific contact point. Preferably, the redirection of light involves changing the direction of propagation in (in particularly as seen if projected into) a plane parallel to the touch-sensitive surface.

According to another aspect of the present invention a method for position encoding an object contacting a touch-sensitive surface is provided, the method comprising: emitting light from a light source, guiding light from the light source towards the touch-sensitive surface of the touch-sensitive waveguide, using a touch-sensitive waveguide, in such a way that the object disturbs at least a part of the guided light at a contact point where the object contacts the touch-sensitive surface, detecting, using a detector array, intensity distribution of light having propagated from the light source through the touch-sensitive waveguide for position encoding the contact point between the object and the touch-sensitive surface, and redirecting light having propagated from the light source through the touch-sensitive waveguide and to the first light redirecting member towards the detector array using a first light redirecting member, wherein at least a part of the light propagating towards a specific point of the detector array is prevented from being incident upon the specific point of the detector array when the object contacts the touch-sensitive surface at a corresponding specific contact point. Preferably, the redirection of light involves changing the direction of propagation in a plane parallel to the touch-sensitive surface.

BRIEF DESCRIPTION OF THE DRAWINGS

Features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

DETAILED DESCRIPTION OF THE INVENTION

Figure 1:
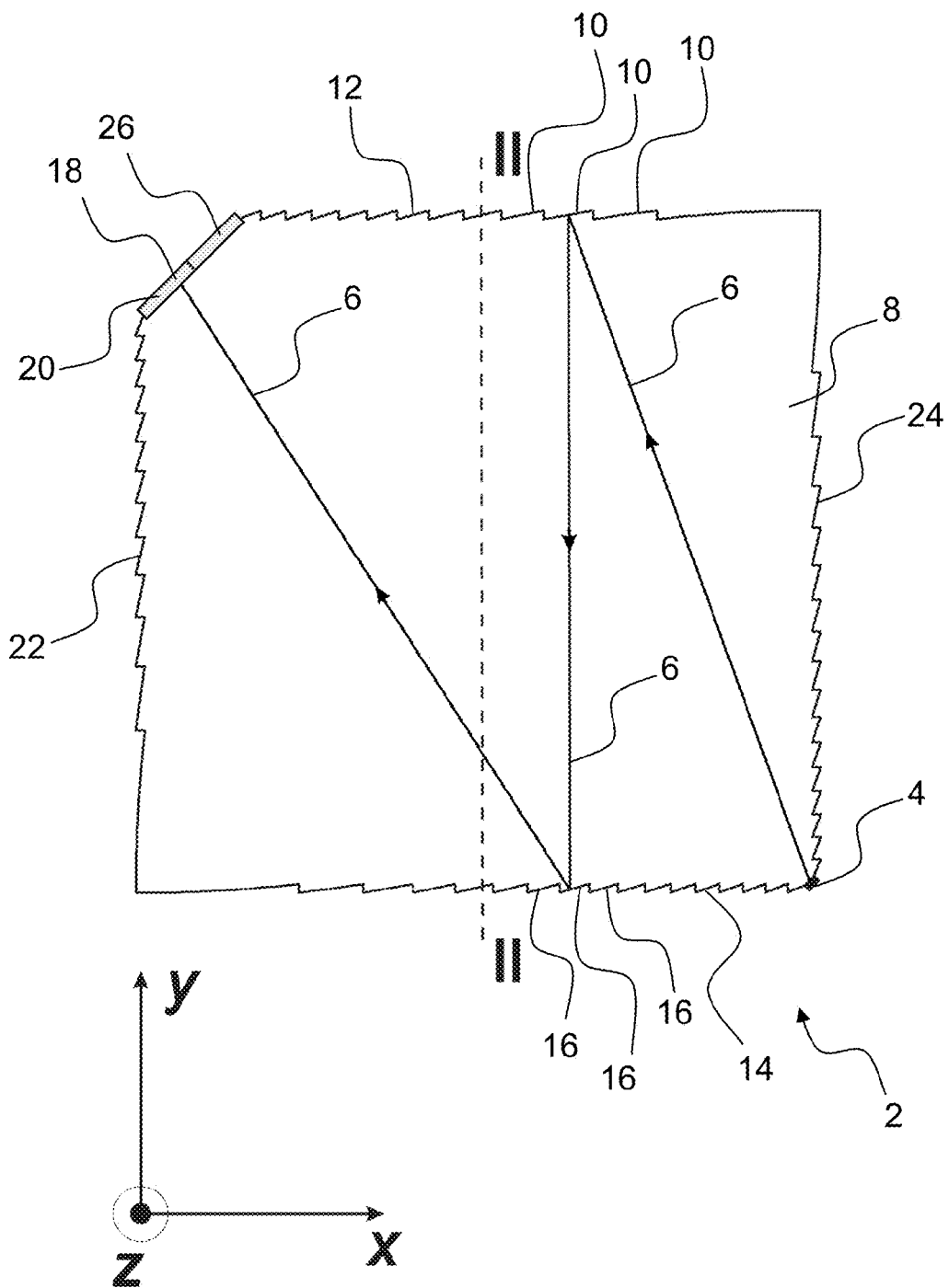
FIG. 1 schematically illustrates a plane view of a preferred embodiment of a device according to the present invention.
Figure 2:
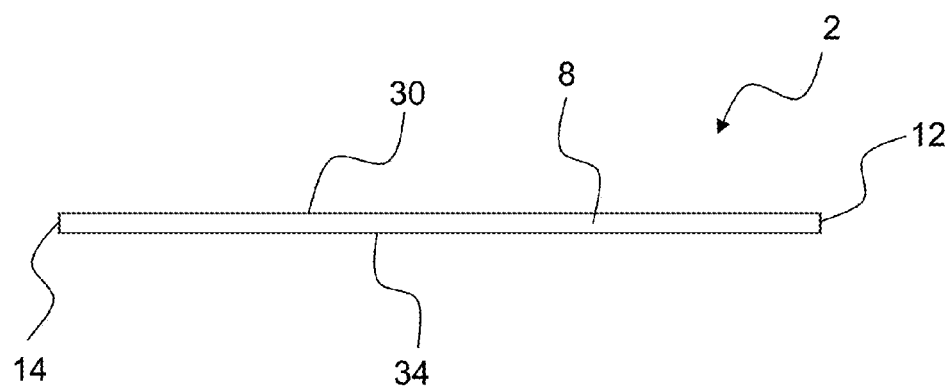
FIG. 2 illustrates a cross section taken along the line II-II of FIG. 1, FIG. 3 illustrate a plane view of the embodiment of FIG. 1, FIG. 4 illustrate a plane view of the embodiment of FIG. 1, FIG. 5 illustrate a plane view of the embodiment of FIG. 1, FIG. 6 illustrate a plane view of the embodiment of FIG. 1, FIG. 7 schematically illustrates a plane view of a preferred embodiment of a device according to the present invention.
Figure 2:
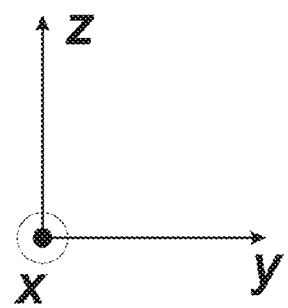

FIG. 1 schematically illustrates a plane view of a preferred embodiment of a device 2 according to the present invention. FIG. 2 illustrates a cross section taken along the line II-II of FIG. 1.

The illustrated touch-sensitive device 2 comprises a planar and substantially rectangular touch-sensitive waveguide 8 that is made of a material capable of guiding light propagating inside the touch-sensitive waveguide 8. The light guiding is based on total internal reflection as is well-known in the art of optical fibres and waveguides. Light is emitted into the touch-sensitive waveguide 8 from a light source 4 positioned at one corner of the device 2. The light source 4 illuminates substantially the entire internal volume of the device 2. Light redirecting members 12, 14, 22, and 24 are positioned along the edges for deflecting light for propagation across the length and breadth of the touch-sensitive waveguide 8 and finally arriving at a detector array 20 positioned at a corner of the device 2 opposite the light source 4. Thus, the redirection of light 6 preferably involves changing the direction of propagation in a plane parallel to the touch-sensitive waveguide 8. An object (not shown), such as a finger, that contacts a touch-sensitive surface 30 of the touch-sensitive waveguide 8 changes the refractive index at the point of contact (not shown) in such a way that some of the light propagating within the touch-sensitive waveguide 8 is no longer subject to total internal reflection, rather light is coupled out of the touch-sensitive waveguide 8. This change in light propagating inside the touch-sensitive waveguide 8 is detected by the detector array 20 and based on the changed intensity distribution detected by the detector array 20, the position of the contact point (not shown) is determined.

In an embodiment, the object (not shown) may disturb light propagating in the touch-sensitive device 2 in another way than by coupling light out of the touch-sensitive waveguide 8, for example by absorption, or scattering, or any other disturbance that would influence the light intensity distribution detected by the detector array 20.

It is not required that the object (not shown) physically contacts the touch-sensitive surface 30 at the contact point, it is sufficient that the object (not shown) disturbs the evanescent field at the contact point to an extent sufficient for creating a detectable change in the light intensity distribution at the detector array 20. Thus, the contact point (not shown) is the point at which the evanescent field is disturbed by the object (not shown).

The light source 4 emits a light beam 6 into the planar touch-sensitive waveguide 8. The touch-sensitive waveguide 8 guides the light beam 6 towards a light reflecting part 10 of a second light redirecting member 12. A light reflecting part of a light redirecting member of any device according to the present invention may alternatively or additionally be referred to as a segment. The light beam 6 is guided by the touch-sensitive waveguide 8 by total internal reflection as explained later. The second light redirecting member 12 comprises a number of light reflecting parts 10 situated adjacent to the touch-sensitive waveguide. Each light reflecting part 10 of the second light redirecting member 12 has substantially the shape of a parabola opening in a direction parallel to the y-axis and having a focus substantially coinciding with the location of the light source 4. Thus, the second light redirecting member 12 reflects the light beam 6 towards a light reflecting part 16 of a first light redirecting member 14 in a direction substantially parallel to the y-axis. The light beam 6 is guided towards the first redirecting member 14 by the touch-sensitive waveguide 8. The first light redirecting member 14 has a number of light reflecting parts 16 and is substantially identical to the second light redirecting member 12. The foci of the light reflecting parts 16 of the first light redirecting member 14 coincide slightly behind a first part 18 of a detector array 20 seen from the first light redirecting member 14. Thus, the first light redirecting member 14 reflects the light beam 6 towards the first part 18 of the detector array 20. Thus, the redirection of light 6 by the first light redirecting member 14 involves changing the direction of propagation in a plane parallel to the touch-sensitive waveguide 8, such as parallel to the touch-sensitive surface 30. The light beam 6 is guided towards the detector array 20 by the touch-sensitive waveguide 8. The detector array 20 detects the point of incidence of the light beam 6 that is incident upon the detector array 20 and detects preferably also the intensity.

It is seen that light emitted in another direction in the xy-plane from the light source 4 impedes on the second light directing member 12 at another point of incidence and therefore also impedes on the first light directing member 14 at another point of incidence and finally impedes on the first part 18 of the detector array 20 at another point of incidence.

Thus, if a light beam is emitted by the light source 4 into the touch-sensitive waveguide 8 having a different direction of propagation, projected onto the xy-plane, than the above-described light beam 6, such that the light beam (not shown) has a different point of incidence on the second light redirecting member 12, then the light beam (not shown) will also have a different point of incidence on the first light redirecting member 14 and a different point of incidence on the first part 18 of the detector array 20. Therefore, a light beam emitted by the light source 4 in a specific direction in the xy-plane is incident on a corresponding point on the detector array with a one-to-one relationship.

The illustrated touch-sensitive device 2 further comprises a fourth light redirecting member 22 that is substantially identical to a mirror-image of the second light redirecting member 12, and a third light redirecting member 24 that is substantially identical to a mirror-image of the first light redirecting member 14. Thus, a light beam (not shown) emitted by the light source 4 into the touch-sensitive waveguide 8 towards the fourth light redirecting member 22 will be guided and reflected towards the detector array 20 in a way similar to what is described above. However, the light beam (not shown) will be incident upon a second part 26 of the detector array 20.

In one embodiment (not shown), light redirected by a first light redirecting member and light redirected by a third light redirecting member may have a common area of incidence on a detector array. In such a case, light redirected by the two different light redirecting members may be distinguished by different angles of incidence at the detector array, e.g. projected onto the xy-plane, or by emission of light with different wavelengths towards the second light redirecting member and fourth light redirecting member, respectively, or a combination hereof.

Figure 3:
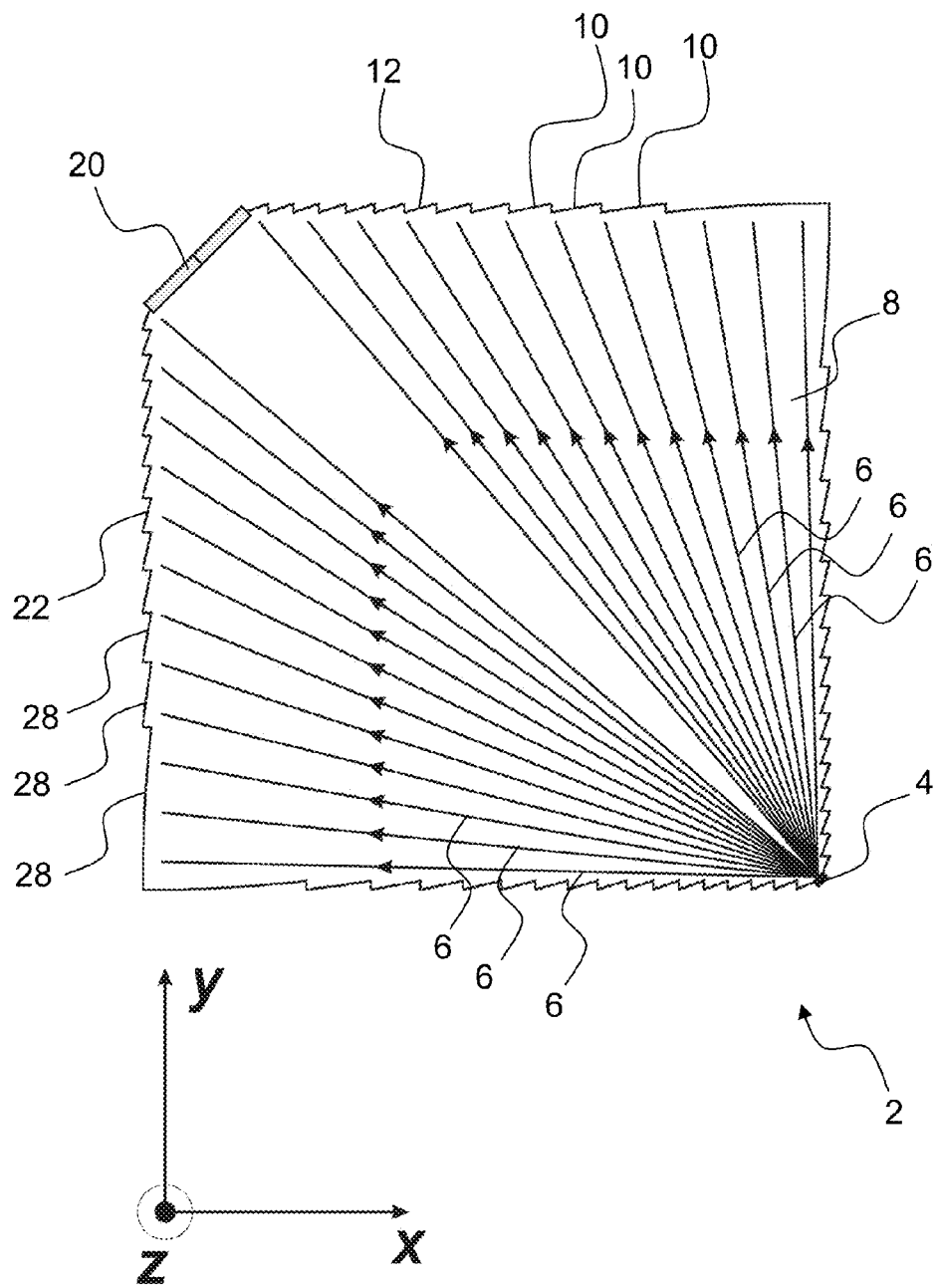
Figure 4:
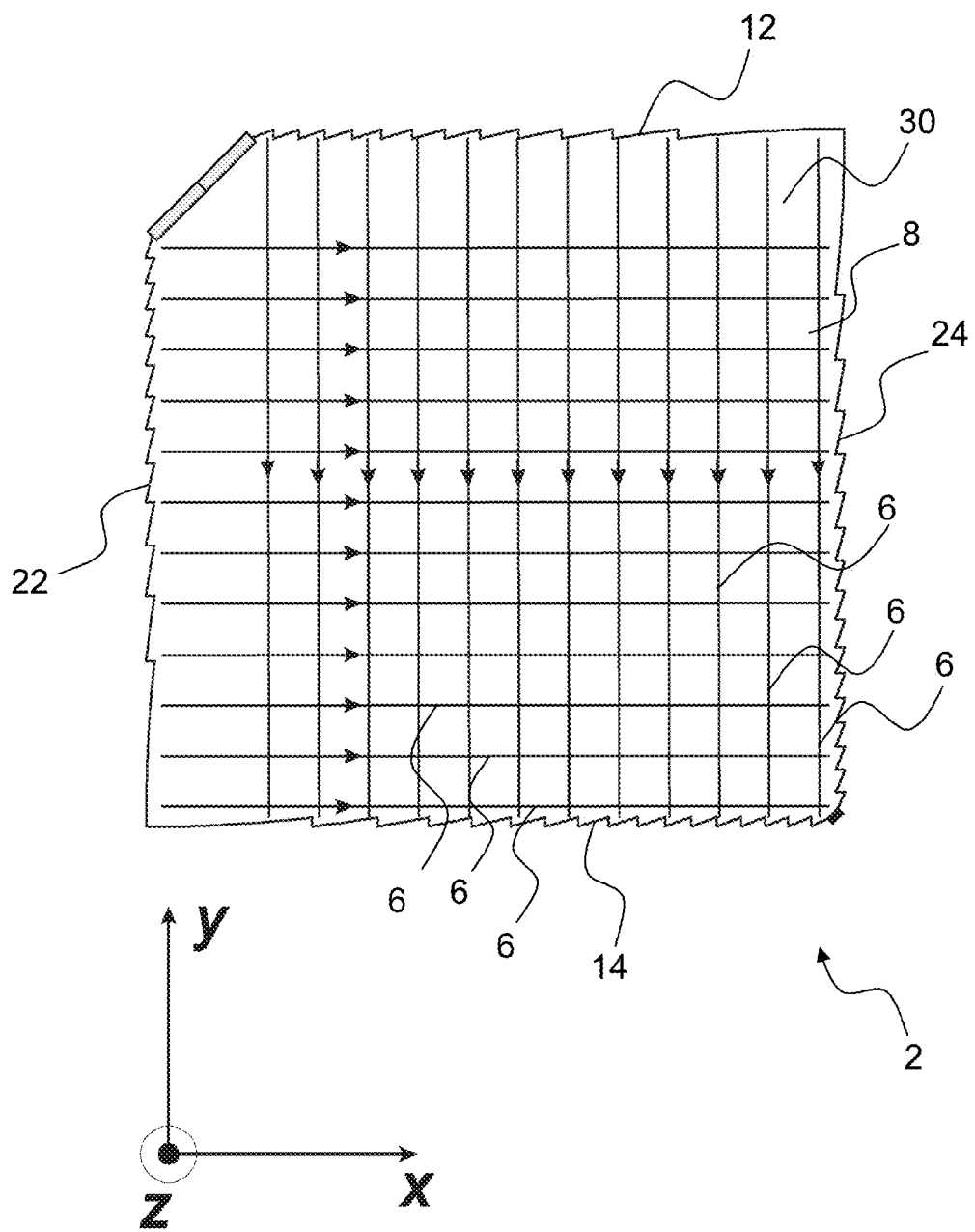
Figure 5:
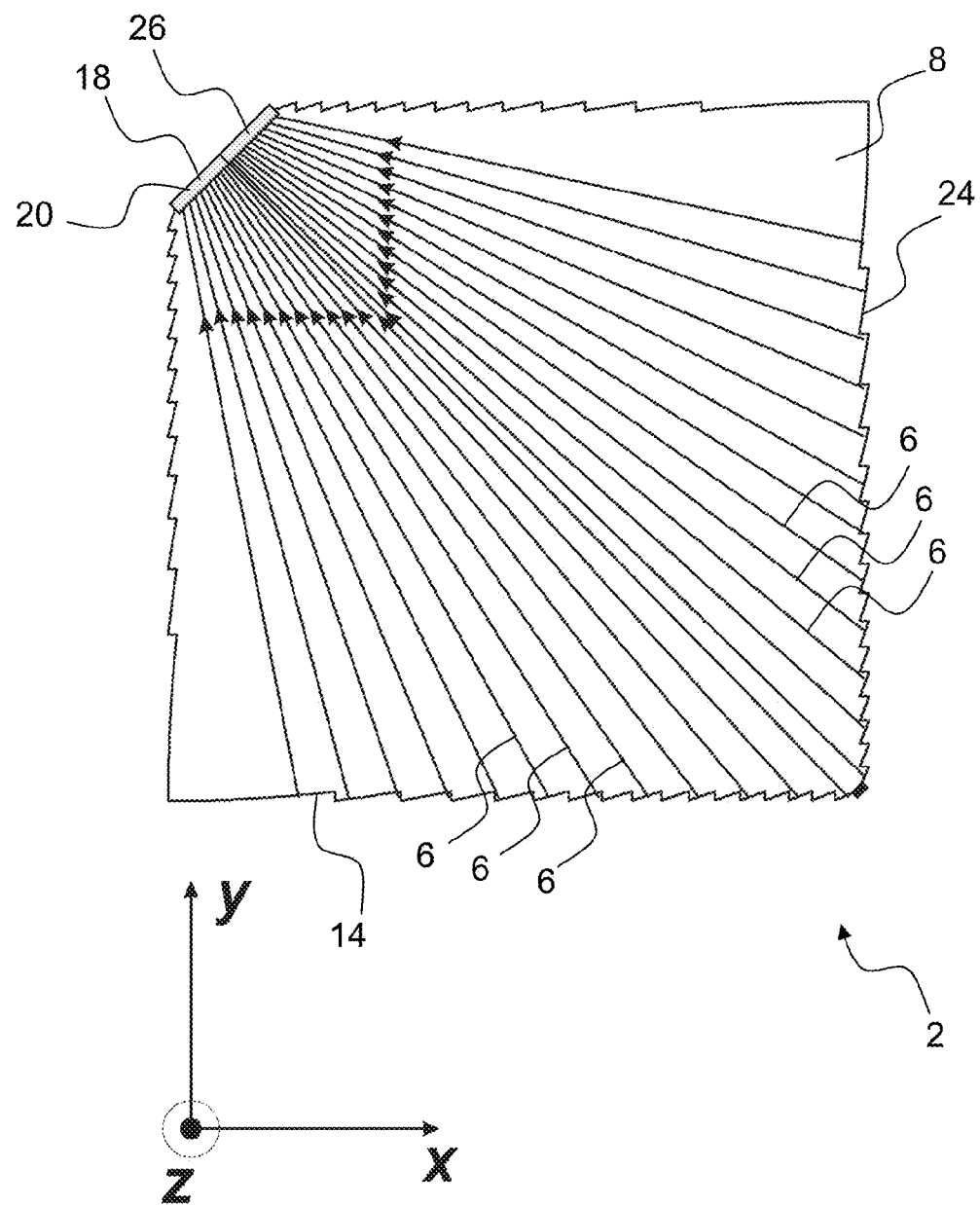

FIGS. 3-5 illustrate plane views of the device 2 showing guiding of different parts of different light beams 6 through the touch-sensitive waveguide 8 towards the detector array 20.

FIG. 3 illustrates that light beams 6 emitted by the light source 4 are guided by the touch-sensitive waveguide 8 towards the second light redirecting member 12 for illuminating substantially the entire redirecting surfaces of all the light reflecting parts 10 of the second light redirecting member 12. Further, light beams 6 are guided towards the fourth light redirecting member 22 for illuminating substantially the entire redirecting surfaces of all the light reflecting parts 28 of the fourth light redirecting member 22. It is prevented that light is guided directly from the light source 4 towards the detector array 20 for the illustrated embodiment. In one embodiment this is prevented by provision of a member (not shown) positioned in front of the light source 4 for blocking the direct path from the light source 4 to the detector array 20, i.e. for blocking light that would otherwise be incident upon the detector array without being redirected by any of the light redirection members 12, 14, 22, 24. The light beams 6 emitted by the light source 4 towards the second light redirecting member 12 are diverging. Further, the light beams 6 emitted by the light source 4 towards the fourth light redirecting member 22 are diverging.

FIG. 4 illustrates that the light beams 6 that are incident upon the second light redirecting member 12 (shown in FIG. 3), are redirected by the second light redirecting member 12 towards the first light redirecting member 14 such that the light beams 6 are guided by the touch-sensitive waveguide 8 in directions substantially parallel to the y-axis. Further, the light beams 6 that are incident upon the fourth light redirecting member 22 are redirected by the fourth light redirecting member 22 towards the third light redirecting member 24, such that the light beams 6 are guided by the touch-sensitive waveguide 8 in directions substantially parallel to the x-axis.

FIG. 5 illustrates that the light beams 6 that are incident upon the first light redirecting member 14 (shown in FIG. 4) are redirected towards a first part 18 of the detector array 20. Furthermore, the light beams 6 redirected by the first light redirecting member 14 are converging towards the detector array 20. Further, the light beams 6 that are incident upon the third light redirecting member 24 are redirected towards a second part 26 of the detector array 20. Further, the light beams 6 redirected by the third light redirecting member 24 are converging towards the detector array 20.

FIG. 5 shows that each light beam 6, as defined by its propagation path projected onto the xy-plane, has a unique point of incidence on the detector array 20. In the illustrated embodiment, the detector array 20 is one-dimensional for position encoding. By changing the intensity of a light beam 6 propagating along a particular propagation path within the touch-sensitive waveguide 8, a changed intensity at the corresponding point of incidence on the detector array 20 will occur.

The intensity of a given light beam 6 that is incident upon a specific point of the detector array 20, may be decreased by the object (not shown) disturbing the light beam 6 at a contact point (not shown) such that at least a part of the light beam 6 is prevented from being incident upon the specific point of the detector array 20 when the object (not shown) contacts the touch-sensitive surface 30. As explained above, the object (not shown) contacting the touch-sensitive surface means that the object (not shown) is within the evanescent field of the light in question that is guided by the touch-sensitive waveguide 8. As explained above, the object (not shown) may disturb a light beam 6 propagating within the touch-sensitive waveguide 8 e.g. by coupling out at least a part of the light beam 6. Alternatively or additionally, the object (not shown) may disturb a light beam 6 propagating within the touch-sensitive waveguide 8 by absorbing at least a part of the light beam 6. Alternatively or additionally, the object (not shown) may disturb a light beam 6 propagating within the touch-sensitive waveguide 8 by scattering at least a part of the light beam 6.

Due to the intersecting light beams 6 propagating within the touch-sensitive waveguide 8 which light beams 6 are substantially parallel to the x-axis and the y-axis, respectively, as shown in FIG. 4, it is possible to disturb light propagating in each of these directions at substantially a single contact point (not shown) by the object (not shown) contacting the touch-sensitive surface 30. However, light emitted by the light source 4 towards either the second light redirecting member 12 or the fourth light redirecting member 22, c.f. FIG. 3, may also be disturbed by the object (not shown). Furthermore, light redirected by either the first light redirecting member 14 or the third light redirecting member 24 towards the detector array 20, c.f. FIG. 5, may also be disturbed by the object (not shown). However, by comparing the corresponding change of intensity of light arriving at different respective points of the detector array 20, the location of a single contact point may be deduced.

Figure 6:
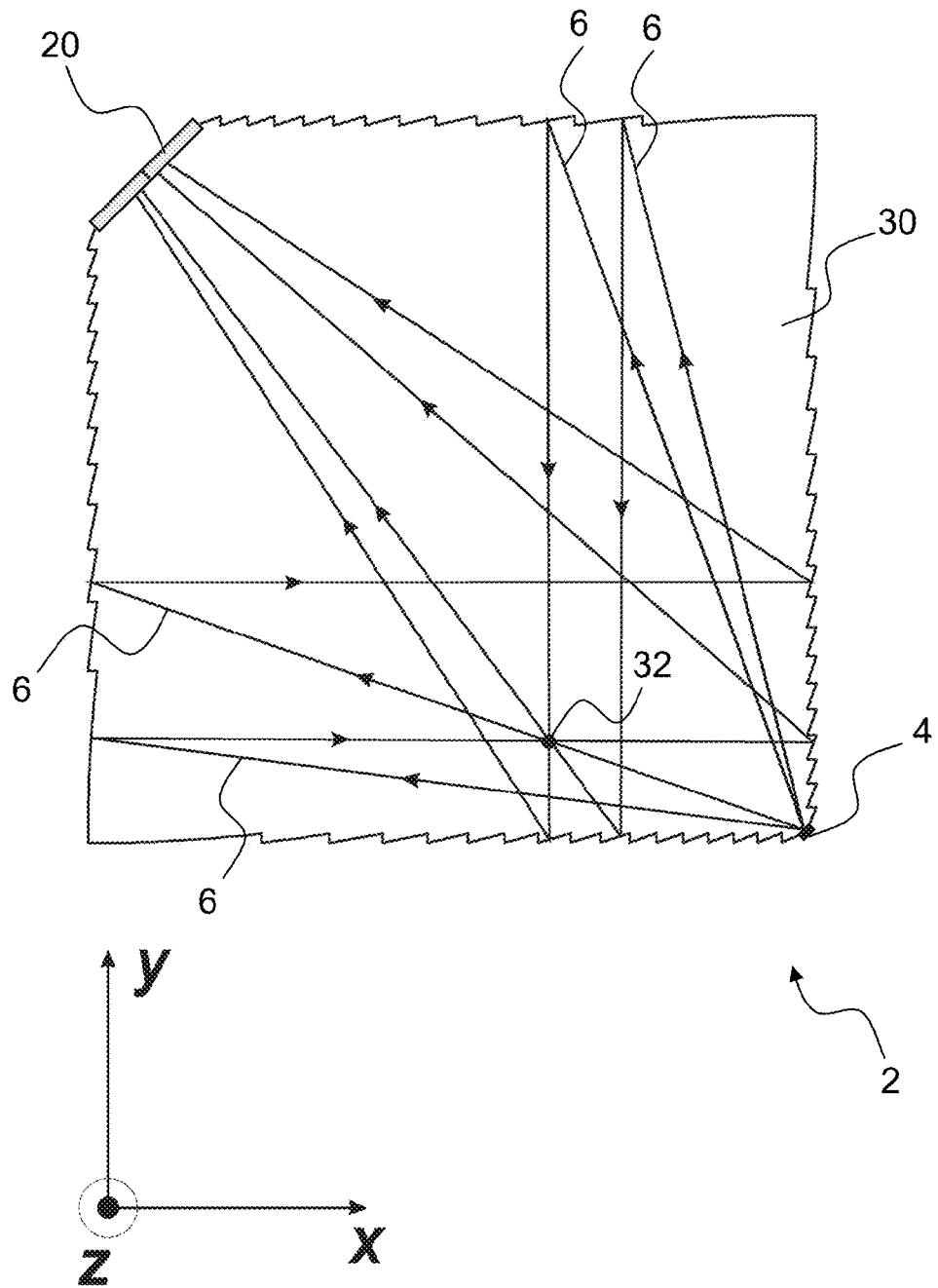

This is illustrated by the exemplified situation shown in FIG. 6, where the object (not shown) is contacting the touch-sensitive surface 30 at a contact point 32. Projected onto the xy-plane, four light beams 6 that are guided by the touch-sensitive waveguide 8 are intersecting at the contact point 32. At least a part of the light from each of these four light beams 6 are disturbed by the object (not shown) at the contact point 32. Thus, the light intensity of incident light will decrease at four points at the detector array 20. Since the four light beams 6 corresponding to the four points of incidence on the detector array have exactly one common point of intersection, i.e. the contact point 32, the position of the contact point 32 may be deduced from the intensity distribution of light detected at the detector array 20.

Thus, an embodiment of a device 2 according to the present invention, as illustrated in FIGS. 1-6, comprising a single light source 4 and a single detector array 20 may be used for estimating a position of a contact point 32 between the object (not shown) and a touch-sensitive surface 30. In one embodiment, a second surface 34, which is opposite the touch-sensitive surface 30 as shown in FIG. 2, is also touch-sensitive.

For the embodiment illustrated in FIGS. 1-6, light is guided by total internal reflection at the touch-sensitive surface 30 and by reflection at the second surface 34. Total internal reflection occurs when light that is incident upon the touch-sensitive surface 30 from within, has an angle of incidence larger than a critical angle. The angle of incidence of a light beam is defined as the angle between the light beam and a normal of the surface of incidence. Likewise a critical angle is defined relative to a normal of the surface of incidence. The critical angle is dependent on a relation between the refractive index of the touch-sensitive waveguide 8 and the refractive index of the medium outside the touch-sensitive surface 30. A critical angle, $\theta_{c,a}$, is defined by the equation:

$$\theta_{c,a} = \arcsin(n_a/n_w),$$

where $n_a$ is the refractive index of the ambient medium (usually air) and $n_w$ is the refractive index of the touch-sensitive waveguide 8. The refractive index for air is under normal conditions approximately 1.

If, at a contact point, the ambient medium is replaced by the object with a refractive index $n_o$, the local critical angle changes accordingly to:

$$\theta_{c,o} = \arcsin(n_o/n_w).$$

Preferably, $\theta_{c,o}$ is larger than $\theta_{c,a}$. This occurs if $n_o$ is larger than $n_a$. If the object is a finger, then $n_o$ is approximately 1.47. Preferably, the angle of incidence of all light beams are controlled to be between the two critical angles $\theta_{c,a}$ and $\theta_{c,o}$. In this case total internal reflection is inhibited exclusively at the contact point resulting in at least part of the light being coupled out of the waveguide. As a result, the intensity of that light beam, detected at the detector array 20 will decrease.

If, at another point, the ambient medium is replaced by a drop of water with a refractive index $n_{water}$, the local critical angle changes accordingly to:

$$\theta_{c,water} = \arcsin(n_{water}/n_w).$$

Water has a refractive index of approximately 1.33. Preferably, the angle of incidence of all light beams are controlled to be between the two critical angles $\theta_{c,water}$ and $\theta_{c,o}$ so that total internal reflection is not inhibited by the water drop. In such an embodiment, water residing on the touch-sensitive surface will not affect light propagating within the waveguide. Throughout the present disclosure, the three above-mentioned critical angles are primarily denoted the critical angle $\theta_{c,a}$ of the ambient medium, the critical angle $\theta_{c,o}$ of the object, and the critical angle $\theta_{c,water}$ of water.

The touch-sensitive waveguide may be made of a number of different materials such as acrylic glass. If the light beams are within the visible range and the touch-sensitive waveguide is made of acrylic glass that has a refractive index of approximately 1.49, then the critical angles are approximately as follows: the critical angle $\theta_{c,a}$ of air is 42°; the critical angle $\theta_{c,water}$ of water is 63.2°; and the critical angle $\theta_{c,o}$ of the object (a finger) is 80.6°.

Figure 7:
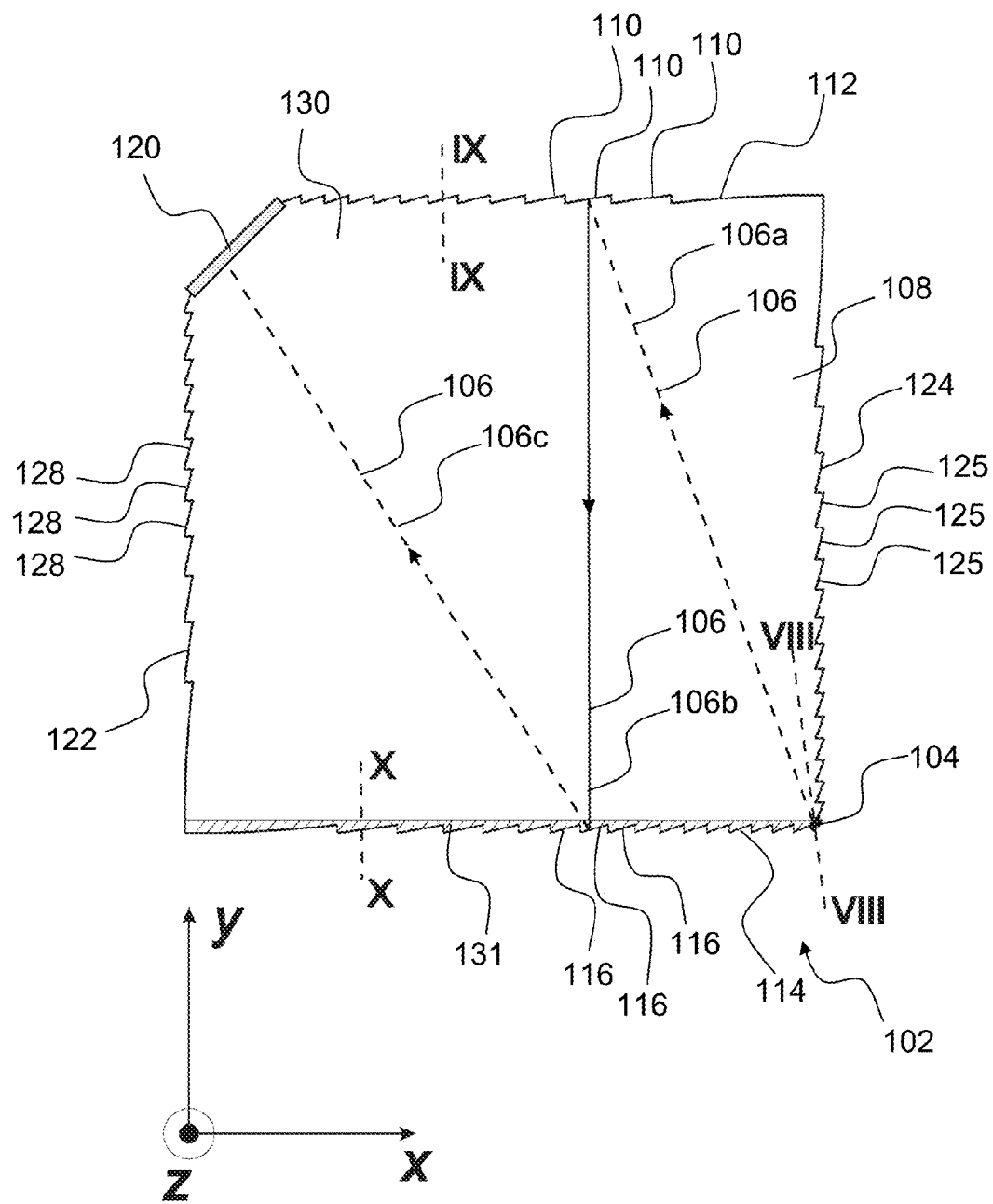

FIG. 7 schematically illustrates a plane view of a preferred embodiment of a device 102 according to the present invention. The device 102 is similar to the device 2 shown in FIGS. 1-6. The projections onto the xy-plane of the propagation paths of light propagating within the touch-sensitive waveguide 108 of the device 102 shown in FIG. 7 are substantially identical to the projections onto the xy-plane of the propagation paths of light propagating within the touch-sensitive waveguide 8 of the device 2 described in connection with FIGS. 3-5.

FIG. 7 shows a light source 104 emitting a light beam 106 towards a light reflecting part 110 of a second light redirecting member 112 which redirects the light beam 106 towards a light reflecting part 116 of a first light redirecting member 114 which redirects the light beam 106 towards a detector array 120. The light beam 106 comprises three light beams 106a, 106b, and 106c. One light beam 106a, illustrated by a broken line with an arrowhead for indicating the direction of propagation, is guided by the waveguide 108 from the light source 104 to the second light redirecting member 112. One light beam 106b, illustrated by a solid line with an arrowhead for indicating the direction of propagation, is guided by the waveguide 108 from the second light redirecting member 112 towards the first light redirecting member 114. Finally, one light beam 106c, illustrated by a broken line with an arrowhead for indicating the direction of propagation, is guided by the waveguide 108 from the first light redirecting member 112 to the detector array 120.

In the illustrated embodiment and as will be further explained below, the light beam 106a cannot be disturbed by the object (not shown) contacting the touch-sensitive surface 130. The light beam 106b may be disturbed by the object (not shown) contacting the touch-sensitive surface 130. Finally, the light beam 106c cannot be disturbed by the object (not shown) contacting the touch-sensitive surface 130.

Likewise, a light beam (not shown) emitted by the light source 104 towards the detector array 120 via redirection by the fourth light redirecting member 122 and subsequently the third light redirecting member 124, can only be disturbed by the object (not shown) contacting the touch-sensitive surface 130 during propagation from the fourth light redirecting member 122 to the third light redirecting member 124.

The fact that the light beam 106a cannot be disturbed by the object (not shown) contacting the touch-sensitive surface 130 leads to the advantage that the object (not shown) may be placed at the touch-sensitive surface 130 immediately in front of the light source 104 without disturbing a relatively large part of diverging light 106a emitted by the light source 104. Thus, it may be possible to achieve a more simple position encoding. Alternatively or additionally, it may be possible to achieve a more accurate position encoding. Further, position encoding the object (not shown) contacting the touch-sensitive surface 130 close to the second light redirecting member 112 or the fourth light redirecting member 122 may be more accurate.

The fact that the light beam 106c cannot be disturbed by the object (not shown) contacting the touch-sensitive surface 130 leads to the advantage that the object (not shown) may be placed at the touch-sensitive waveguide 108 immediately in front of the detector array 120 without disturbing a relatively large part of the converging light 106c propagating towards the detector array 120. Thus, it may be possible to achieve a more simple position encoding. Alternatively or additionally, it may be possible to achieve a more accurate position encoding. Further, position encoding the object (not shown) contacting the touch-sensitive surface 130 close to the first light redirecting member 114 or the third light redirecting member 124 may be more accurate.

A further advantage of the illustrated embodiment is that while the object (not shown) contacting the touch-sensitive surface 130 causes a change in the light intensity distribution detected by the detector array 120 which change is dependent on the location of the contact point (not shown) at the touch-sensitive surface 130, the change in the overall light intensity detected by the detector array 120 is substantially not affected by the specific location of the contact point (not shown). Thus, detection of a contact point (not shown) may function substantially equally well anywhere on the touch-sensitive surface 130, such as at any distance from the light source 104 and the detector array 120.

Light (not shown) emitted by the light source 104 substantially illuminates the light reflecting parts 110 of the second light redirecting member 112. Likewise, light (not shown) emitted by the light source 104 substantially illuminates light reflecting parts 128 of the fourth light redirecting member 122.

Further, the device 102 comprises a strip of coating 131, situated at the touch-sensitive surface 130 in front of the first light redirecting member 114. The function of the coating strip 131 is explained later in connection with FIG. 10. Further, the device 102 comprises a strip of coating (not shown) at the touch-sensitive surface 130 in front of the third light redirecting member 124. In one embodiment, which is similar to the device 102, strips of coating are absent.

Figure 8:
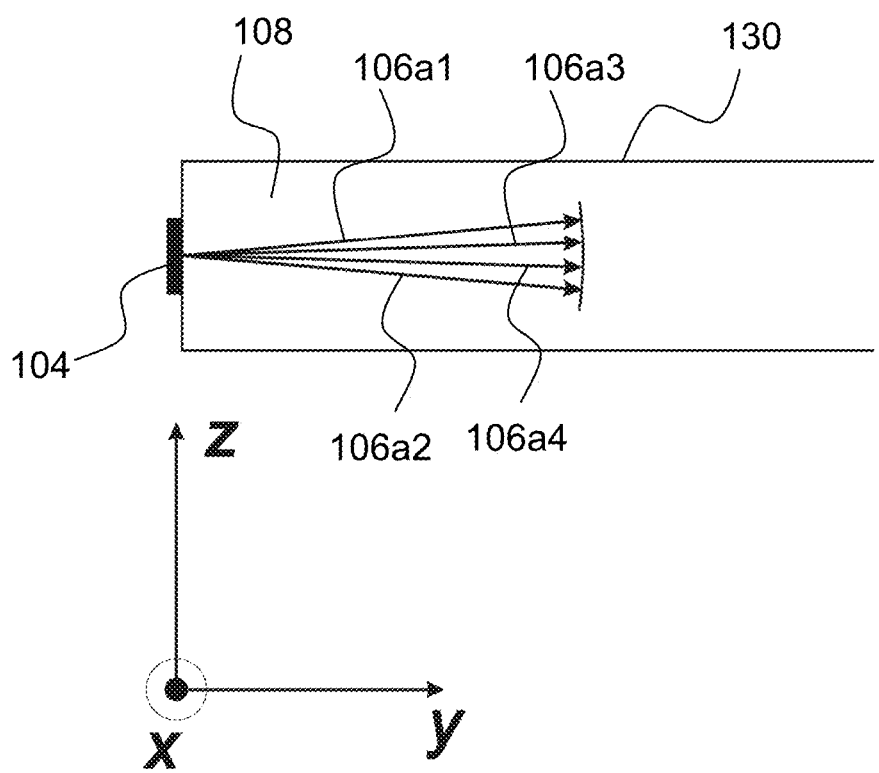
FIG. 8 illustrates a cross section taken along the line VIII-VIII of FIG. 7.
Figure 9:
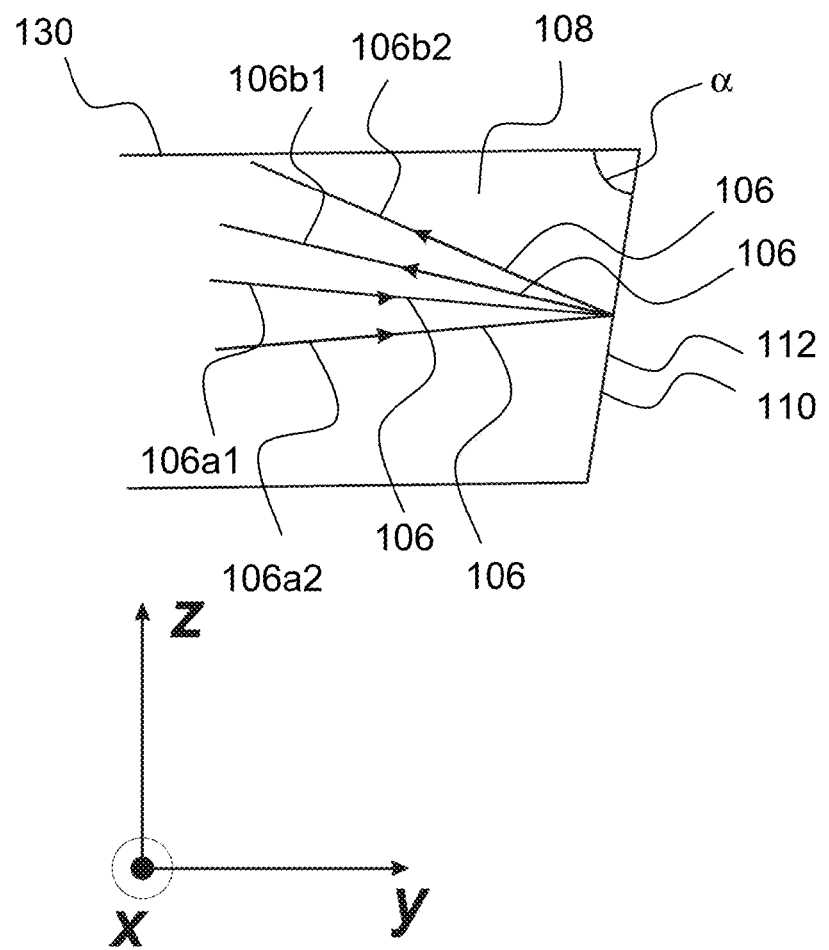
FIG. 9 illustrates a cross section taken along the line IX-IX of FIG. 7.
Figure 10:
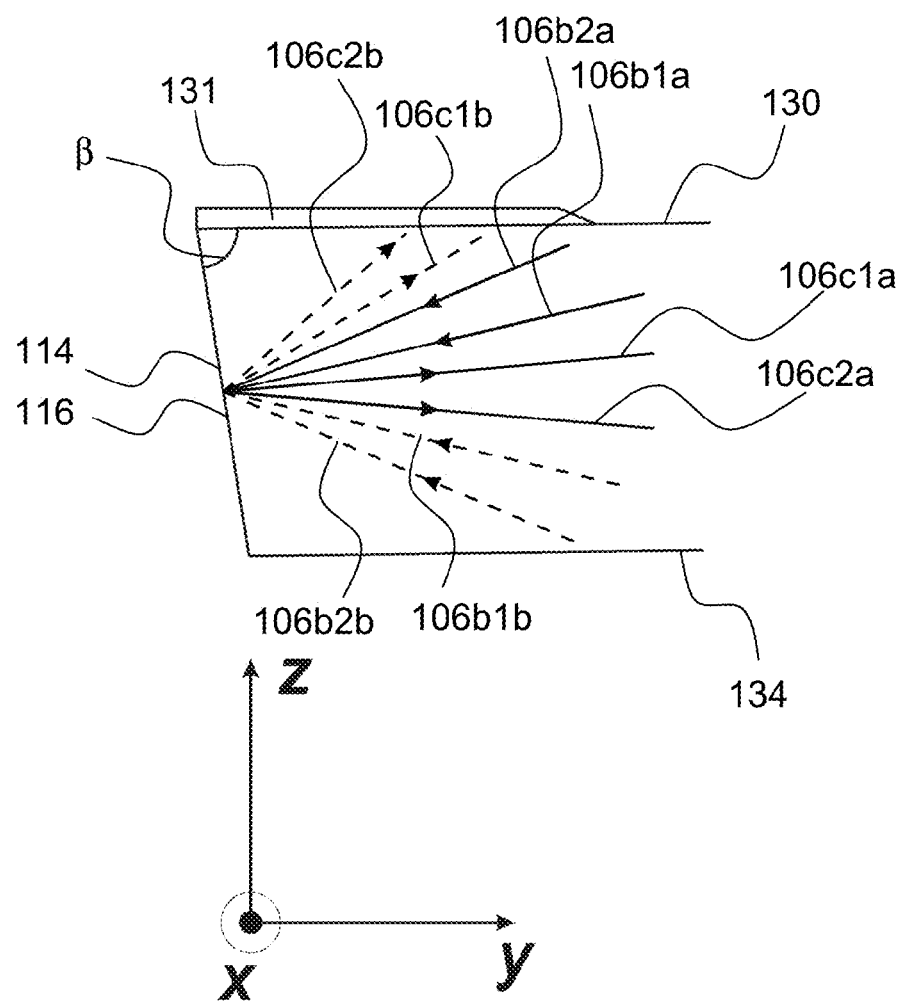
FIG. 10 illustrates a cross section taken along the line X-X of FIG. 7, FIG. 11 schematically illustrates a cross sectional view of an embodiment of a device according to the present invention, FIG. 12 schematically illustrates a plane view of a preferred embodiment of a device according to the present invention.

The above-described features for the device 102 shown in FIG. 7 are further explained in connection with FIGS. 8-10 showing different cross sections of different parts of the device 102 shown in FIG. 7.

FIG. 8 illustrates a cross section taken along the line VIII-VIII of FIG. 7, showing inter alia the light source 104 and a part of the touch-sensitive waveguide 108, and light beams 106a3, 106a4 emitted in directions between light beam 106a1 and light beam 106a2 with angles of incidence in relation to the touch-sensitive surface 130 that are larger than the critical angle $\theta_{c,o}$ of the object (not shown) so that the illustrated light is not influenced by the object (not shown). It should be noted that the illustrated light beams are insensitive to the object (not shown) touching the touch-sensitive surface 130 during propagation from the light source 104 towards the second light redirecting member 112.

Preferably the light source 104 does not emit light having smaller angles of incidence in relation to the touch-sensitive surface 130 than the light beams 106a1, 106a2. For example, a member with an aperture (not shown) may be positioned in relation to the light source 104 so that the aperture (not shown) blocks light having smaller angles of incidence in relation to the touch-sensitive surface 130.

Further, light emitted by the light source 104 illuminates substantially all the light reflecting parts 110 of the second light redirecting member 112, as already described in connection with FIG. 7.

Light (not shown) is emitted by the light source 104 towards the fourth light redirecting member 122 in a similar manner.

FIG. 8 shows four light beams 106a1, 106a2, 106a3, and 106a4 that are coupled into the touch-sensitive waveguide 108 for being guided by the touch-sensitive waveguide 108 towards the second light redirecting member 112. The arrowheads indicate the directions of propagation of the light beams. The light beams are shown having the same point of entrance into the touch-sensitive waveguide 108. However, different light beams may have different entrance points into the touch-sensitive waveguide 108. The light source 104 substantially illuminates the touch-sensitive waveguide 108 with light having angles in between the two light beams 106a1 and 106a2. That is, projected onto the plane of the cross section, the two light beams 106a1 and 106a2 defines a cross section of a cone of light diverging from the light source 104.

Likewise, light (not shown) emitted by the light source 104 is guided towards the fourth light redirecting member 122 shown in FIG. 7.

In the illustrated embodiment, each of the light beams 106a1 and 106a2 forms an angle with the touch-sensitive surface 130 that is approximately 5°. Light beams (not shown) forming different angles with the touch-sensitive surface 130 may be launched into the touch-sensitive waveguide 108. Furthermore, light may be emitted continuously, in pulses, or any combination hereof FIG. 9 illustrates a cross section taken along the line IX-IX of FIG. 7, showing inter alia the second light redirecting member 112 and a part of the touch-sensitive waveguide 108. The second light redirecting member 112 has at least two functions. Firstly, the second light redirecting member 112 redirects at least a part of the light originating from the light source towards the first light redirecting member 114, so that the light substantially propagates along a path parallel to the y-axis, as shown in connection with FIG. 7. Secondly, the second light redirecting member 112 redirects at least a part of the light towards the first light redirecting member 114 in a way so that the light may be disturbed by the object (not shown) contacting the touch-sensitive surface 130.

FIG. 9 shows two light beams 106a1 and 106a2 that are redirected by the second light redirecting member 112 resulting in the redirected beams 106b1 and 106b2, respectively. The arrowheads indicate the directions of propagation of the light beams 106. For convenience, both of the incident light beams 106a1 and 106a2 and both of the reflected light beams 106b1 and 106b2 are projected onto the plane of the cross section IX-IX in FIG. 7. The two incident light beams 106a1 and 106a2 shown in FIG. 9 correspond to the two light beams 106a1 and 106a2 shown in FIG. 8. For convenience, the two light beams 106a1 and 106a2 shown in FIG.

9 are having a common point of incidence on the second light redirecting member 112.

Due to the light source 104 illuminating the waveguide with light propagating in between the two light beams 106a1 and 106a2, shown in FIG. 8, the light reflecting part 110 illustrated in FIG. 9 will be illuminated with light beams (not shown) having angles of incidence in between the two shown incident light beams 106a1 and 106a2.

The light reflecting part 110 is inclined relative to a normal of the touch-sensitive surface 130 and forms an angle α with the touch-sensitive surface that is approximately 81°. The angle α may have a different value, such as in the range between 60° and 89°, such as between 70° and 86° or 180° minus any of the mentioned angles or ranges of angles.

Furthermore, a light redirecting part 110 may comprise different portions (not shown) which may form different angles with the touch-sensitive surface 130.

The inclination of the light reflecting part 110 with respect to the touch-sensitive surface 130 causes the angles of incidence of the reflected light beams 106b1 and 106b2 with respect to the touch-sensitive surface 130 to be different from the angles of incidence of the incident light beams 106a1 and 106a2. Each of the reflected light beams 106b1 and 106b2 form an angle with a normal of the touch-sensitive surface 130 that is smaller than the critical angle $\theta_{c,o}$ of the object (not shown) and larger than the critical angle $\theta_{c,a}$ of the ambient medium. Thus, the reflected light beams 106b1 and 106b2 are guided by the touch-sensitive waveguide 108 from the second light redirecting member 112 towards the first light redirecting member 114 by means of total internal reflection at the touch-sensitive surface 130 when no object contacts the touch-sensitive surface 130. However, the light beams 106b1 and 106b2 may be disturbed in case the object (not shown) is contacting the touch-sensitive surface 130.

Likewise, light (not shown) illuminating the fourth light redirecting member 122 is redirected towards the third light redirecting member 124, during which redirection the angle that a light beam (not shown) forms with the touch-sensitive surface 130 is changed such that the light beam (not shown) may be disturbed by the object (not shown) contacting the touch-sensitive surface 130 when the light beam (not shown) is guided by the touch-sensitive waveguide 108 from the fourth light redirecting member 122 towards the third light redirecting member 124.

FIG. 10 illustrates a cross section taken along the line X-X of FIG. 7, showing inter alia the first light redirecting member 114 and a part of the touch-sensitive waveguide 108. The first light redirecting member 114 provides at least two functions. Firstly, the first light redirecting member 114 provides that at least a part of the light arriving from the second light redirecting member 112 is redirected towards the detector array 120, as shown in connection with FIG. 7. Secondly, the first light redirecting member 114 provides that at least a part of the light redirected by the first light redirecting member 114 towards the detector array 120 cannot be disturbed by the object (not shown) contacting the touch-sensitive surface 130 while the light is guided by the waveguide 108.

FIG. 10 shows four light beams 106b1a, 106b2a, 106b1b and 106b2b that are incident upon and redirected by the first light redirecting member 114. The arrowheads indicate the directions of propagation of the light beams 106. For convenience, the four light beams 106b1a, 106b2a, 106b1b and 106b2b are all shown having the same point of incidence upon the first light redirecting member 114.

The four incident light beams 106b1a, 106b2a, 106b1b and 106b2b shown in FIG. 10 illustrate possible angles of incidence upon the first light redirecting member 114 resulting from the two light beams 106b1 and 106b2 reflected from the second light redirecting member 112, as shown in FIG. 9.

A light beam, such as 106b1a, 106b2a, 106b1b or 106b2b, that is incident upon the first light redirecting member 114 will be incident either from above, as illustrated by the solid lines 106b1a and 106b2a, or from below, as illustrated by the broken lines 106b1b and 106b2b. Whether a light beam, such as 106b1a, 106b2a, 106b1b or 106b2b, will be incident from below or from above depends on different factors, such as the distance between the point of incidence on the second light redirecting member 112 and the point of incidence on the first light redirecting member 114, the distance between the touch-sensitive surface 130 and the second surface 134, and the angle that the light beam in question forms with the touch-sensitive surface 130.

The light reflecting part 116 of the first light redirecting member 114 illustrated in FIG. 10 is inclined relative to the touch-sensitive surface 130, forming substantially the same angle β as the angle α that the light reflecting part 110 of the second light redirecting member 112 illustrated in FIG. 9 forms with the touch-sensitive surface 130. Thus, the incident light beams 106b1a and 106b2a, illustrated by solid lines, which light beams 106b1a and 106b2a are incident from above, will be reflected such that corresponding reflected light beams 106c1a and 106c2a, also illustrated by solid lines, will form substantially the same angles with the touch-sensitive surface 130 as the light beams 106a1 and 106a2 coupled into the touch-sensitive waveguide 108, shown in FIG. 8. However, the light beams 106b1b and 106b2b, illustrated by broken lines, which light beams 106b1b and 106b2b are incident from below, will be reflected such that the corresponding reflected light beams 106c1b and 106c2b, also illustrated by broken lines, will form smaller angles with a normal of the touch-sensitive surface 130 than the incident light beams 106b1b and 106b2b.

Approximately half the light illuminating the first light redirecting member 114 is incident from above and forms angles of incidence between the two shown incident light beams 106b1a and 106b2a illustrated by the incident solid lines, and correspondingly, substantially the other half of the light illuminating the first light redirecting member 114 is incident from below and forms angles of incidence between the two shown incident light beams 106b1b and 106b2b illustrated by the incident broken lines.

Since the reflected light beams 106c1a and 106c2a illustrated by the solid lines form angles with the touch-sensitive surface 130, substantially within the same range as the light beams 106a1 and 106a2 illustrated in FIG. 8, the light beams 106c1a and 106c2a will be guided by the touch-sensitive waveguide 108 towards the detector array 120. Light beams (not shown) within the angular range between 106c1a and 106c2a cannot be disturbed by the object (not shown) contacting the touch-sensitive surface since the angles of incidence these light beams will form with the touch-sensitive surface 130 are all larger than the critical angle $\theta_{c,o}$ of the object (not shown).

The reflected light beams 106c1b and 106c2b, illustrated by the broken lines, may, due to the large angle of incidence on the touch-sensitive surface 130, not experience total internal reflection by incidence on the touch-sensitive surface 130. The device 102 comprises a strip of coating 131 (or coating) for disturbing at least a part of the light beams

106c1b and 106c2b. The disturbance may include coupling out, scattering, absorbing, or any combination hereof. The strip of coating may comprise a material having a refractive index below that of the object, e.g. approximately like or above the refractive index of water. In an embodiment, the coating 131 is embedded in the waveguide 108. In an embodiment, the strip of coating 131 is not present.

As an alternative to the coating 131, or in addition to the coating 131, another principle may be utilized in an embodiment in order to ensure that light beams, such as the light beams 106c1b and 106c2b, do not reach a detector array, such as the detector array 120. Since the light beams 106c1b and 106c2b may be disturbed during propagation from the first light redirecting member 114 towards the detector array 120, it may be desirable that the light beams 106c1b and 106c2b are prevented from reaching the detector array 120. The light beams 106c1b and 106c2b may for instance be prevented from being coupled from the waveguide 108 to the detector array 120. This may be achieved by providing spatial filtering between the detector array 120 and the waveguide 108. Spatial filtering may for instance be provided by having an air gap between the waveguide 108 and the detector array 120. Preferably, a spatial filtering, such as an air gap, provides that substantially only light propagating substantially in a plane parallel to the touch-sensitive surface of the waveguide, such as the light beams 106c1a and 106c2a, will arrive at the relevant detector array. Preferably, a spatial filtering, such as an air gap, provides that light that does not propagate substantially in a plane parallel to the touch-sensitive surface of the waveguide, such as the light beams 106c1b and 106c2b, do not arrive at the relevant detector array. The light, which in general cannot be disturbed by an object contacting the touch-sensitive surface, is the light that propagates substantially in a plane parallel to the touch-sensitive surface of the waveguide.

Summing up, a device 102 for position encoding of a contact point (not shown) between the object (not shown) and the touch-sensitive surface 130 by disturbance of light beam(s) at the contact point (not shown) is provided. The object at the contact point disturbs light beams 106 that travel from the light source 104 and through the device 102 from side to side back and forth, typically three times, and finally arrives at the detector array 120. In the device 102, the light initially propagates through the device 102 forming angles with the touch-sensitive surface 130 preventing the light from being disturbed by the object at the contact point. The light redirecting members 112, 114, 122, 124 form angles with the touch-sensitive surface 130 so that upon reflection by the light reflecting parts 110, 128 the light propagates through the device 102 forming angles with the touch-sensitive surface 130 so that at least part of the light may be disturbed by the object at the contact point. Upon subsequent reflection by the light reflecting parts 116, 125 the light again propagates through the device forming angles with the touch-sensitive surface 130 preventing the light from being disturbed by the object at the contact point.

Variations of the above described device 102 can of course be contemplated. For instance, for one embodiment of a device (not shown) similar to the device 102, light emitted by a light source may further form angles with a touch-sensitive surface, which angles are outside the range described in connection with FIG. 8. By doing so, this device may still function in a similar way as explained in connection with the device 102 although, typically, determination of the contact point will be more complicated and less accurate.

Figure 11:
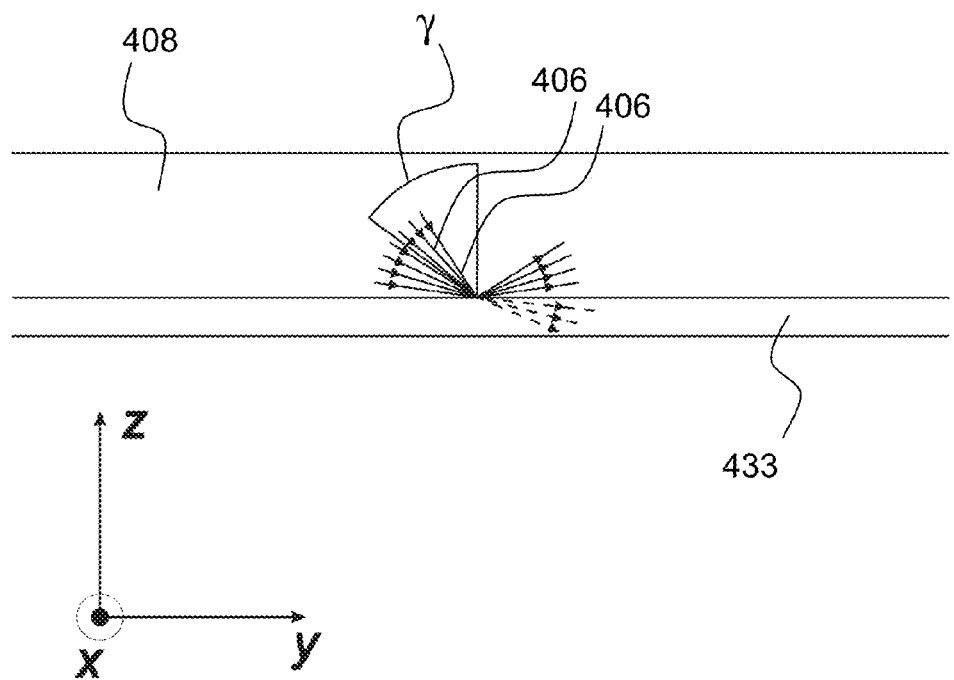

FIG. 11 schematically illustrates a section of a waveguide 408 of a device 402 according to the invention having a layer or coating 433 for disturbing light 406 that is incident with an angle of incidence below a certain threshold indicated by the angle γ. The disturbance may include coupling out, scattering, absorbing, or any combination of these. The layer or coating 433 may comprise a material having a refractive index below that of the object, e.g. approximately like or above the refractive index of water. Hereby, a part of light propagating from the first or third redirecting member towards the detector array forming angles with the touch-sensitive surface allowing disturbance by for example water or the object will be coupled out of the device beforehand so that the light propagating from the first or third redirecting member towards the detector array provides a minimum contribution to the light intensity distribution at the detector array.

Figure 12:
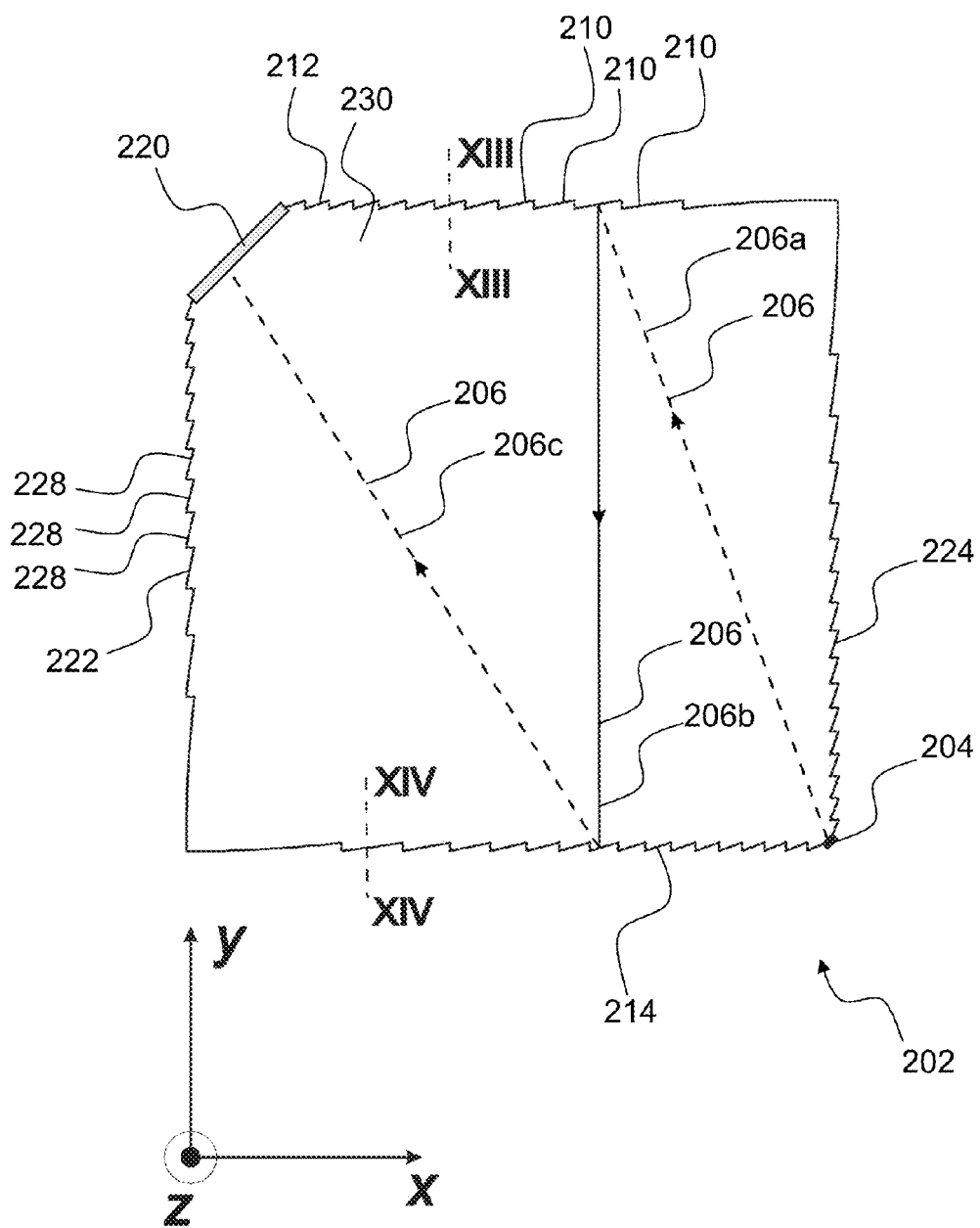

FIG. 12 schematically illustrates a plane view of a device 202 according to the present invention. The device 202 comprises a planar touch-sensitive waveguide 208 having a touch-sensitive surface 230, and a planar first transmitter waveguide 236. The two waveguides 208 and 236 are stacked; see FIG. 13 or 14 each showing a cross section of different parts of the device 202.

During propagation towards a detector array 220, light emitted by a light source 204 is partly guided by the first transmitter waveguide 236 and partly guided by the touch-sensitive waveguide 208. During propagation from the light source 204 towards the detector array 220, light redirecting members 212, 214, 222, and 224 redirect light between the waveguides. FIG. 12 shows an example of a light beam 206 comprising the light beams 206a, 206b, and 206c. Light beams 206a and 206c indicated by broken lines with arrowheads are guided by the first transmitter waveguide 236, whereas the light beam 206b indicated by a solid line with an arrowhead is guided by the touch-sensitive waveguide 208. It should be noted that seen from above projected onto the xy-plane, the propagation paths of light, such as the light beam 206, propagating within the device 202 are similar to the propagation paths of light propagating within the device 2 as well as the device 102.

The light source 204 emits light, such as the light beam 206a, into the first transmitter waveguide 236 for substantially illuminating all light reflecting parts 210 of a second light redirecting member 212. Likewise, the light source 204 emits light (not shown) into the first transmitter waveguide 236 for substantially illuminating all light reflecting parts 228 of a fourth light redirecting member 222.

Light, substantially illuminating all the parts 210 is redirected by the second light redirecting member 212 into the touch-sensitive waveguide 208 and towards a first light redirecting member 214. Likewise, light (not shown), substantially illuminating all the parts 228, is redirected into the touch-sensitive waveguide 208 and towards a third light redirecting member 224 by the fourth light redirecting member 222.

Light, such as the light beam 206b, that is incident on the first light redirecting member 214 is redirected into the first transmitter waveguide 236 and towards the detector array 220 by the first light redirecting member 214. Likewise, light (not shown), that is incident on the third light redirecting member 224 is redirected into the first transmitter waveguide 236 and towards the detector array 220 by the third light redirecting member 224.

It is desirable that only light propagating from the second light redirecting member 212 towards the first light redirecting member 214, such as the light beam 206b, and light propagating from the fourth light redirecting member 222 towards the third light redirecting member 224 may be disturbed by the object (not shown) contacting the touch-sensitive surface 230.

Accordingly, an advantage of utilizing the touch-sensitive waveguide 208 in connection with the first transmitter waveguide 236 as explained above is that a clear separation of light that preferably may be disturbed by the object (not shown) contacting the touch-sensitive surface 230 and light that preferably may not be disturbed by the object (not shown) contacting the touch-sensitive surface 230, is possible.

Light guided by the touch-sensitive waveguide 208 from the second light redirecting member 212 towards the first light redirecting member 214, forms angles of incidence relative to the touch-sensitive surface 230 that is smaller than the critical angle $\theta_{c,o}$ of the object (not shown), and larger than the critical angle $\theta_{c,a}$ of the ambient medium. Correspondingly, light (not shown) that is guided by the touch-sensitive waveguide 208 from the fourth light redirecting member 222 towards the third light redirecting member 224 forms angles of incidence relative to the touch-sensitive surface 230 that is smaller than the critical angle $\theta_{c,o}$ of the object (not shown), and larger than the critical angle $\theta_{c,a}$ of the ambient medium. Thus, the object (not shown) contacting the touch-sensitive surface 230 for example at a contact point on the touch-sensitive surface also reflecting the light beam 206b disturbs the light beam 206b, e.g. by coupling light beam 206b out of the touch-sensitive waveguide 208. Thus, the advantages stated in connection with the device 102 also apply for the device 202.

In one embodiment (not shown), a first transmitter waveguide comprises a touch-sensitive surface.

Figure 13:
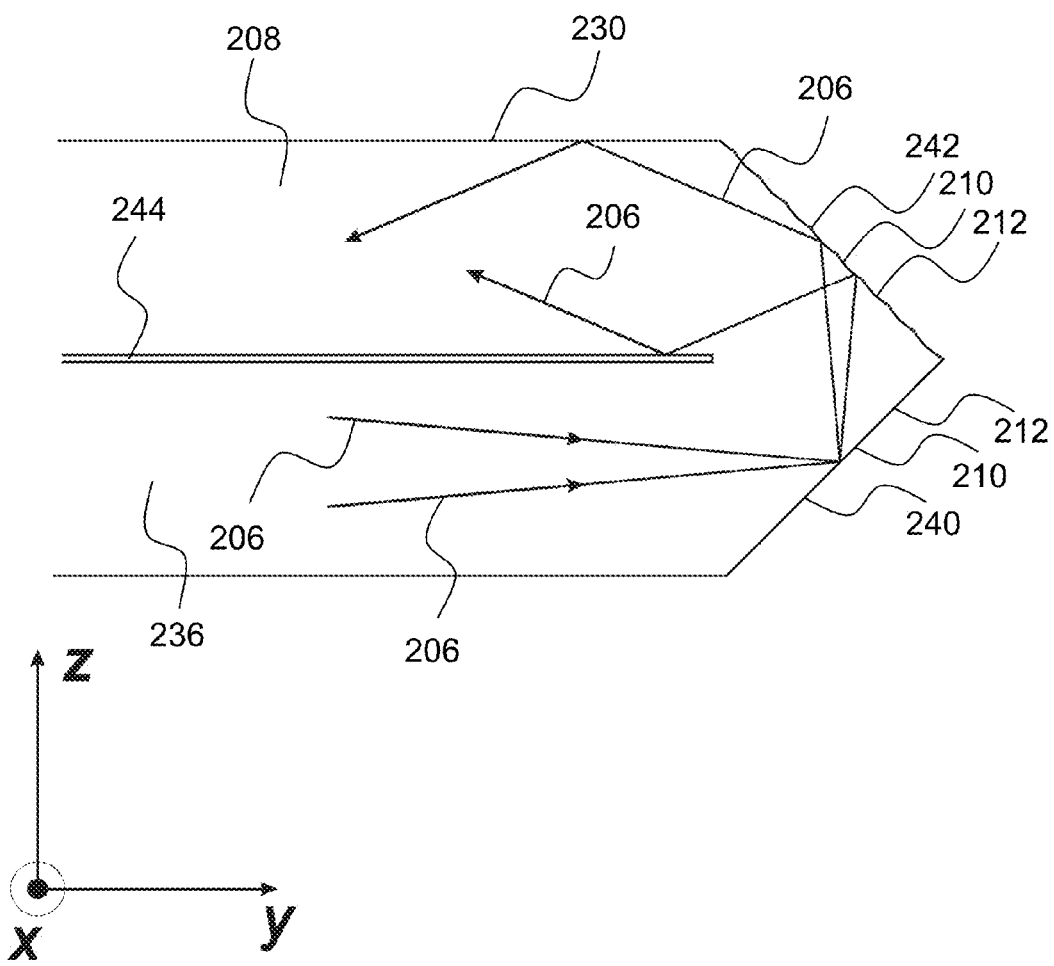
FIG. 13 illustrates a cross section taken along the line XIII-XIII of FIG. 12.

FIG. 13 illustrates a cross section taken along the line XIII-XIII of FIG. 12, showing among other things the second light redirecting member 212. The lines with arrowheads in FIG. 13 are illustrative examples of light beams 206 emitted by the light source 204, as illustrated in FIG. 12, which light beams 206 are incident upon the light reflecting part 210 of the second light redirecting member 212. The light beams 206 propagating in the first transmitter waveguide 236 are reflected into the touch-sensitive waveguide 208 towards the first light redirecting member 214.

The light reflecting part 210 of the second light redirecting member 212 comprises a first light reflecting portion 240 and a second light reflecting portion 242, arranged substantially at right angles in relation to each other. The surface of the second light reflecting portion 242 comprises consecutive areas having tilted planes that alternatingly form angles of approximately +9° and −9°, respectively, relative to a normal of the first light reflecting portion 240. The inclinations are adapted to a certain range of angles of light emitted by the light source 204. Thus, in one embodiment (not shown), tilted planes may form other angles, such as in the range of ±1° to ±20°.

Light is emitted into the first transmitter waveguide 236 by the light source 204 in a similar way as light is emitted into the touch-sensitive waveguide 108 by the light source 104 for the device 102. Consequently, the first light reflecting portion 240, shown in FIG. 13, is substantially illuminated with light having angles of incidence between the two light beams 206 that are incident upon the first light reflecting portion 240.

The second light reflecting portion 242 are formed so that the light beams 206 reflected from there, which light beams 206 are directed towards the first light redirecting member 214, forms angles with the touch-sensitive surface, such that the object (not shown) contacting the touch-sensitive surface 230 may disturb the light beams 206 during propagation towards the first light redirecting member 214.

The fourth light redirecting member 222 operates in a similar way.

Between the first transmitter waveguide 236 and the touch-sensitive waveguide 208, an insulating layer 244 is situated for separating the waveguides, such that light guided by one waveguide is prevented from being coupled into the other waveguide by crossing the insulating layer 224.

Figure 14:
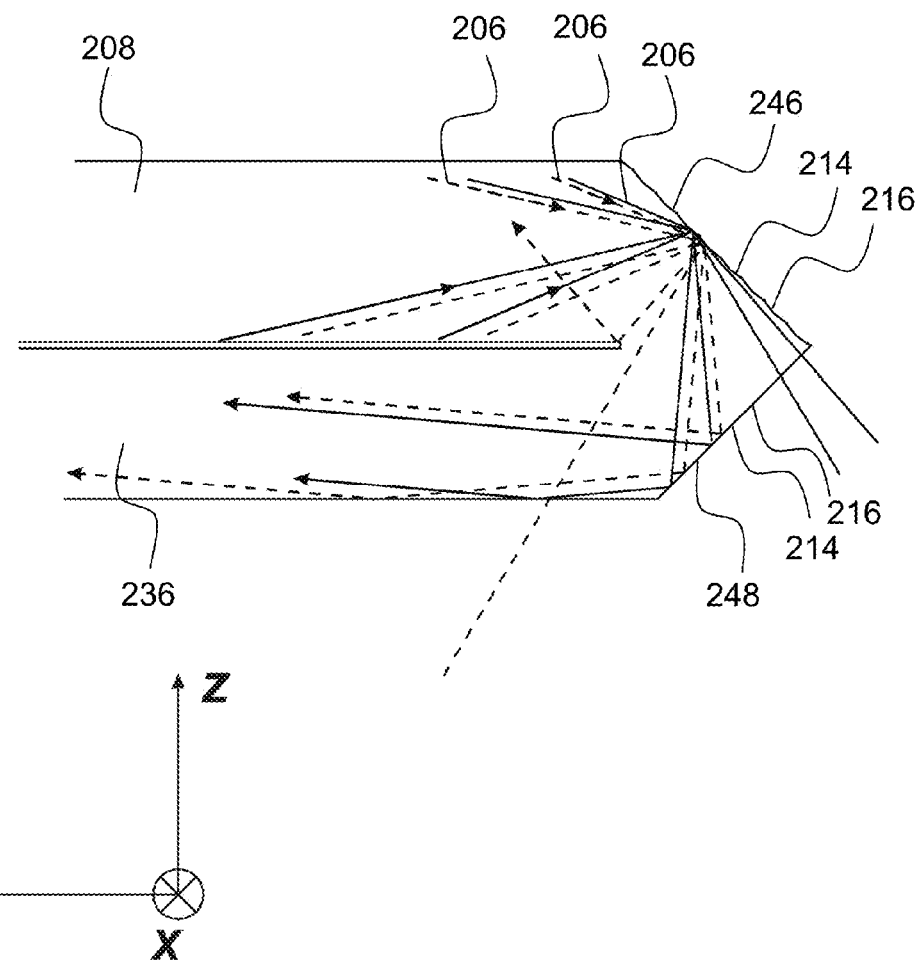
FIG. 14 illustrates a cross section taken along the line XIV-XIV of FIG. 12.

FIG. 14 illustrates a cross section taken along the line XIV-XIV of FIG. 12, showing among other things the first light redirecting member 214. The first light redirecting member 214 is substantially identical to the second light redirecting member 212. FIG. 14 includes illustrative examples of eight light beams 206 that are redirected by a light reflecting part 216 of the first light redirecting member 214. The light beams 206, propagating within the touch-sensitive waveguide 208, are incident upon a first light reflecting portion 246 of the light reflecting part 216 and some of the light beams 206 are subsequently reflected by a second light reflecting portion 248 of the light reflecting part 216 for being guided by the first transmitter waveguide 236 towards the detector array 220.

The first light reflecting portion 246 and the second light reflecting portion 248 are arranged substantially at right angles in relation to each other. However, the surface of the first light reflecting portion 246 comprises consecutive areas having tilted planes that alternatingly form angles of approximately −9° and +9°, respectively, in relation to a normal of the second light reflecting portion 248.

Four of the eight light beams 206 that are incident upon the first light reflecting portion 246, are illustrated by solid lines, and the other four of the eight light beams 206 are illustrated by broken lines. Each of the four light beams 206 illustrated by the broken lines is parallel to a respective one of the four light beams 206 illustrated by the solid lines. The four light beams 206 illustrated by the broken lines and the four light beams 206 illustrated by the solid lines are incident upon two neighbouring nonparallel planes of the first light reflecting portion 246.

Lines continuing out through the light reflecting part 216 or through a surface of the first transmitter waveguide 236 indicate that the corresponding light beam does not propagate towards the detector array 220. The corresponding light beam may have been coupled out, absorbed, scattered, such as redirected in an indifferent direction, or any combination of the mentioned.

In one embodiment (not shown) that is similar to the device 202, a light beam assuming an angle relative to a touch-sensitive surface, which angle is smaller than the critical angle $\theta_{c,o}$ of the object, is coupled into a first transmitter waveguide.

The third light redirecting member 224 operates in a similar way.

In one embodiment (not shown) light that is incident on a first light redirecting member from a second light redirecting member is redirected towards a detector array through a touch-sensitive waveguide. Likewise, light that is incident on a third light redirecting member from a fourth light redirecting member is redirected towards the detector array through the touch-sensitive waveguide.

In one embodiment (not shown) light emitted by a light source is coupled into a touch-sensitive waveguide that guides the light towards a second light redirecting member.

Likewise, light emitted by the light source is coupled into the touch-sensitive waveguide that guides the light towards a fourth light redirecting member.

Figure 15:
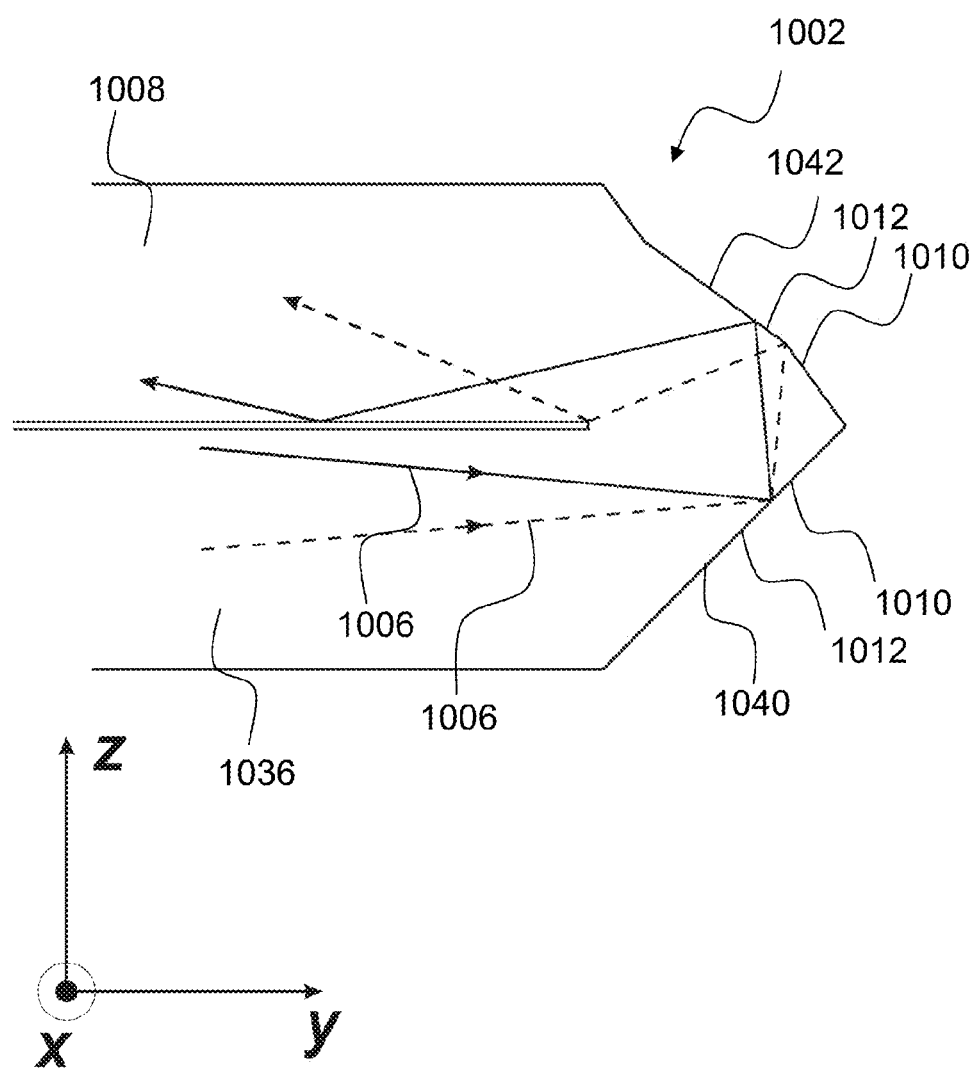
FIG. 15 illustrates a cross section of a light redirecting member.

FIG. 15 illustrates a part of a device 1002 according to the present invention showing a cross sectional view of a light reflecting part 1010 of a second light redirecting member 1012. The device 1002 is similar to the device 202. The light reflecting part 1010 comprises a first light reflecting portion 1040 and a second light reflecting portion 1042. The second light reflecting portion 1042 comprises three consecutive areas having tilted planes that alternatingly form angles of approximately +9° and −9°, respectively, relative to a normal of the first light reflecting portion 1040. The area of the second light reflecting portion 1042 that is closest to the first light reflecting portion 1040 forms an obtuse angle with the first light reflecting portion 1040 for optimal coupling of light from a first transmitter waveguide 1036 into a touch-sensitive waveguide 1008. Illustrative examples of light beams 1006 that are redirected from the first transmitter waveguide 1036 into the touch-sensitive waveguide 1008 by the light reflecting part 1010 are shown by lines with arrowheads.

Figure 16:
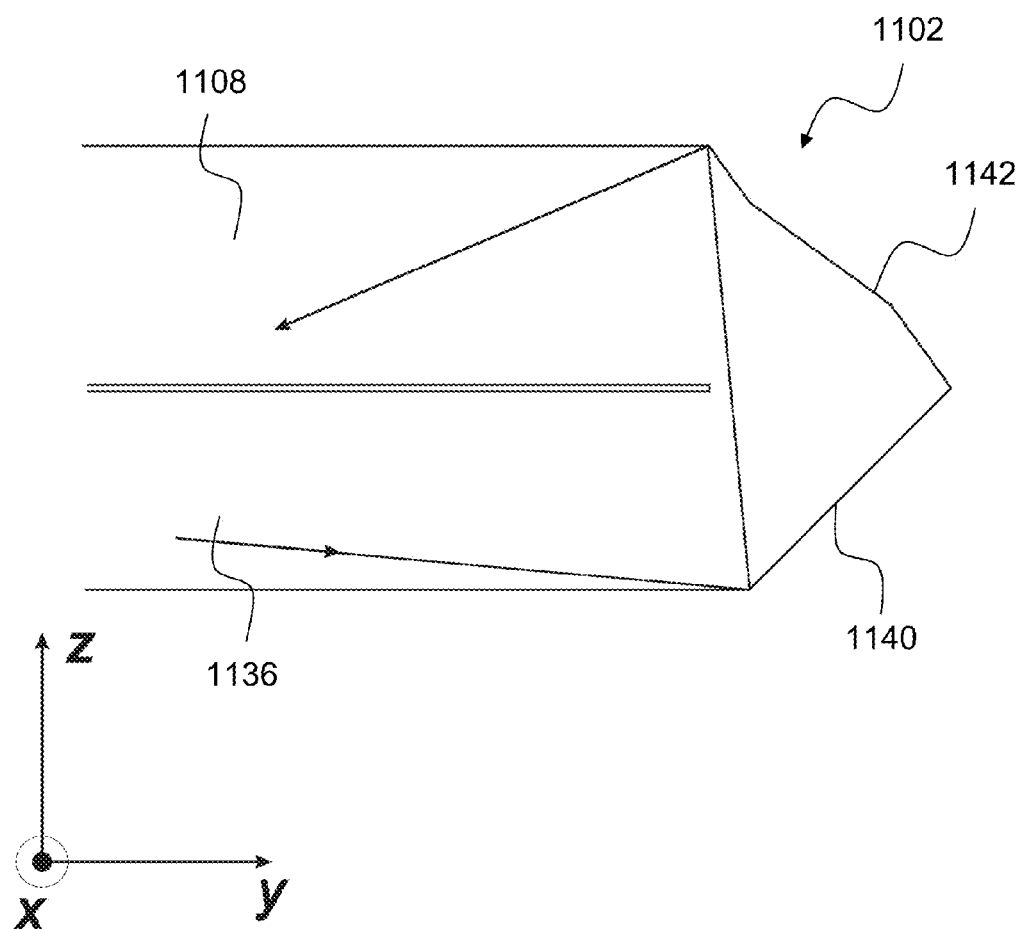
FIG. 16 illustrates a cross section of a light redirecting member, FIG. 17 schematically illustrates a plane view of a preferred embodiment of a device according to the present invention, FIG. 18 illustrate a partly exploded view of the embodiment illustrated in FIG. 17, FIG. 19 illustrate a partly exploded view of the embodiment illustrated in FIG. 17, FIG. 20 illustrate a partly exploded view of the embodiment illustrated in FIG. 17, FIG. 21 schematically illustrates a plane view of an embodiment of a device according to the present invention, FIG. 22 schematically illustrates a plane view of an embodiment of a device according to the present invention, FIG. 23 schematically illustrates a plane view of an embodiment of a device according to the present invention, FIG. 24 schematically illustrates a plane view of an embodiment of a device according to the present invention, FIG. 25 schematically illustrates a plane view of an embodiment of a device according to the present invention, FIG. 26 schematically illustrates a cross sectional view of an embodiment of a device according to the present invention, FIG. 27 schematically illustrates a cross sectional view of an embodiment of a device according to the present invention, FIG. 28 schematically illustrates a cross sectional view of an embodiment of a device according to the present invention with a display, FIG. 29 schematically illustrates an embodiment of a device according to the present invention comprising a signal processor, FIG. 30 schematically illustrates a plane view of an embodiment of a device according to the present invention.

FIG. 16 illustrates a part of an embodiment of a device 1102 according to the invention showing a cross sectional view of a light reflecting part 1110 of a second light redirecting member 1112. A touch-sensitive waveguide 1108 is thicker than a first transmitter waveguide 1136. Further, a second light reflecting portion 1142 is bigger than a first light reflecting portion 1140.

Figure 17:
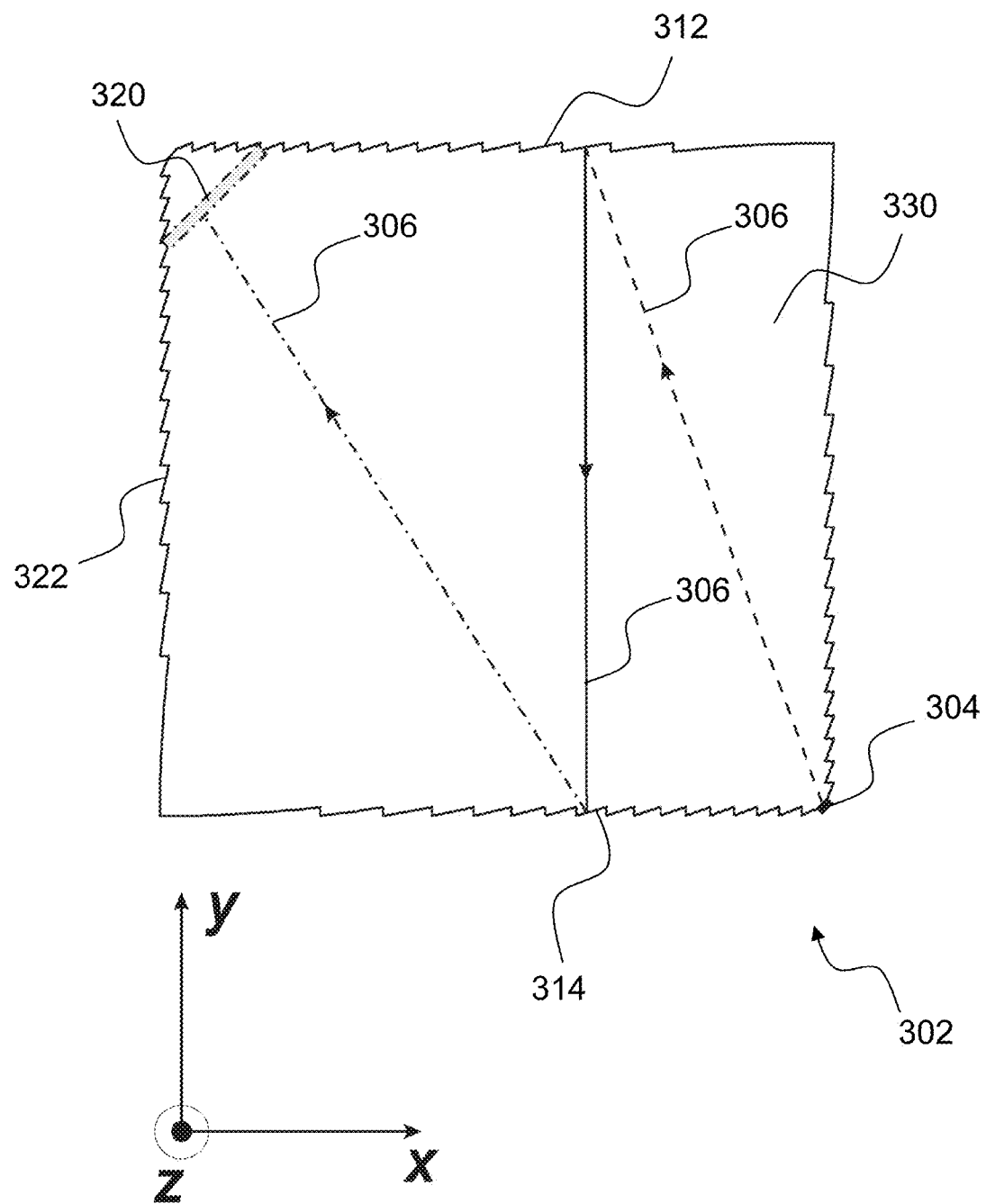
Figure 18:
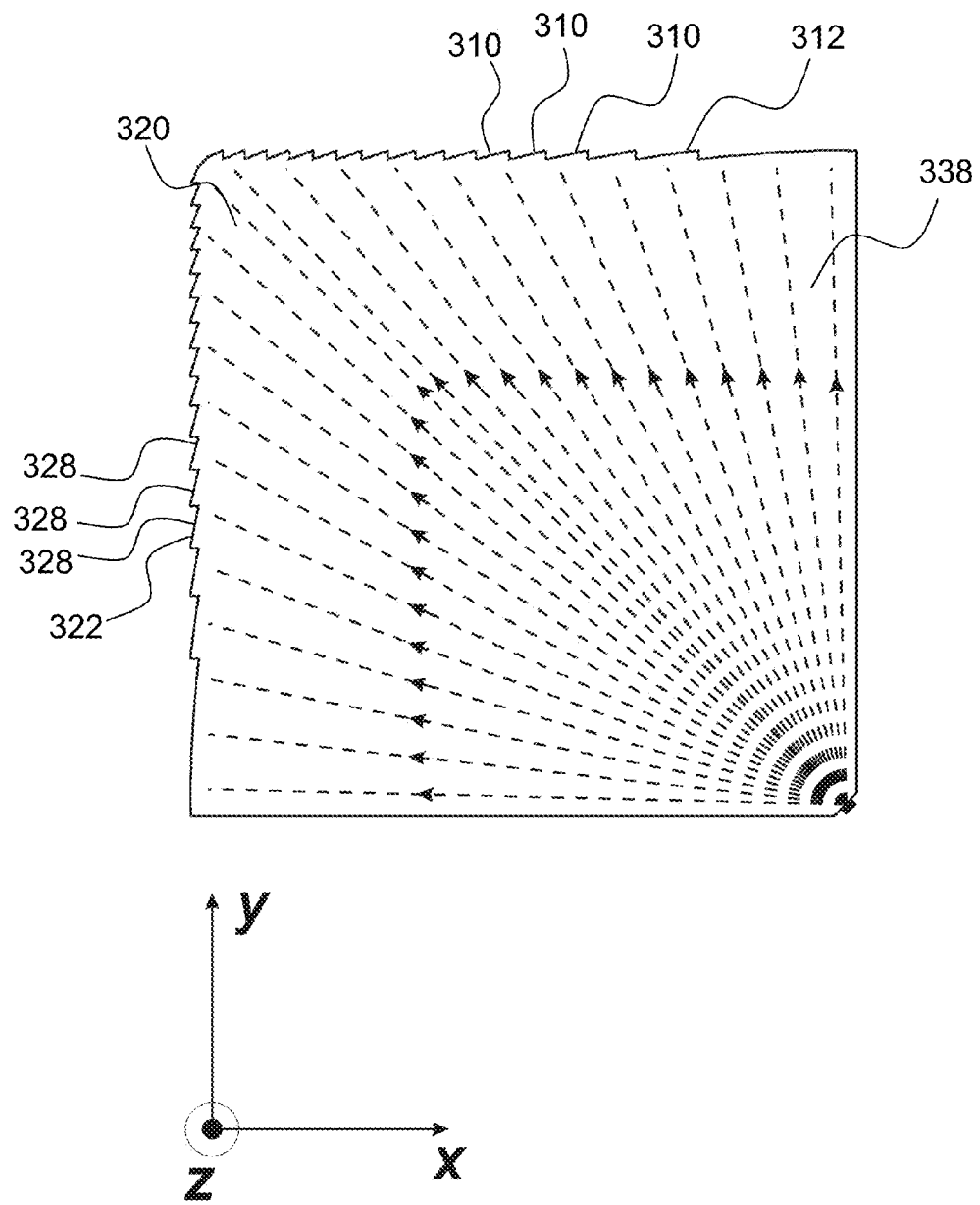
Figure 19:
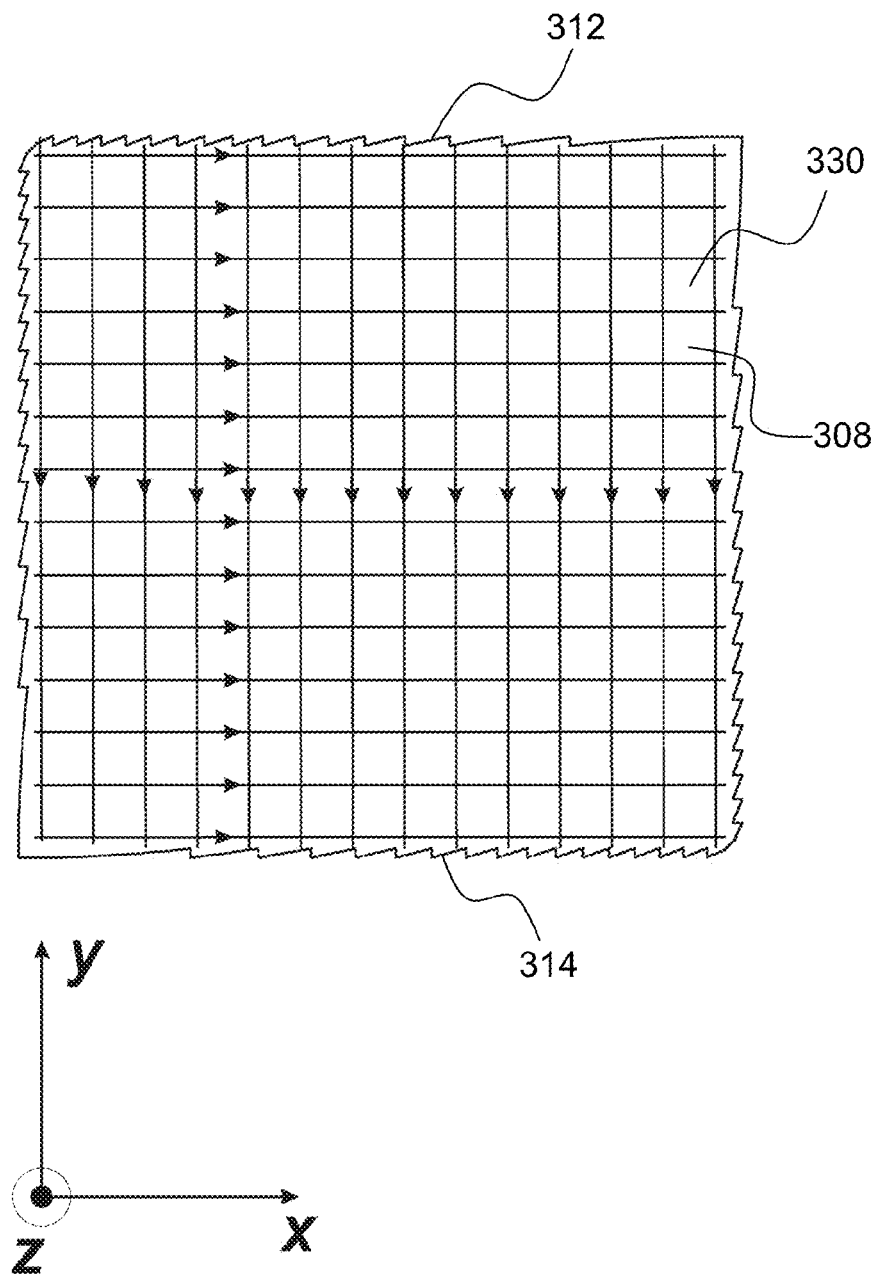
Figure 20:
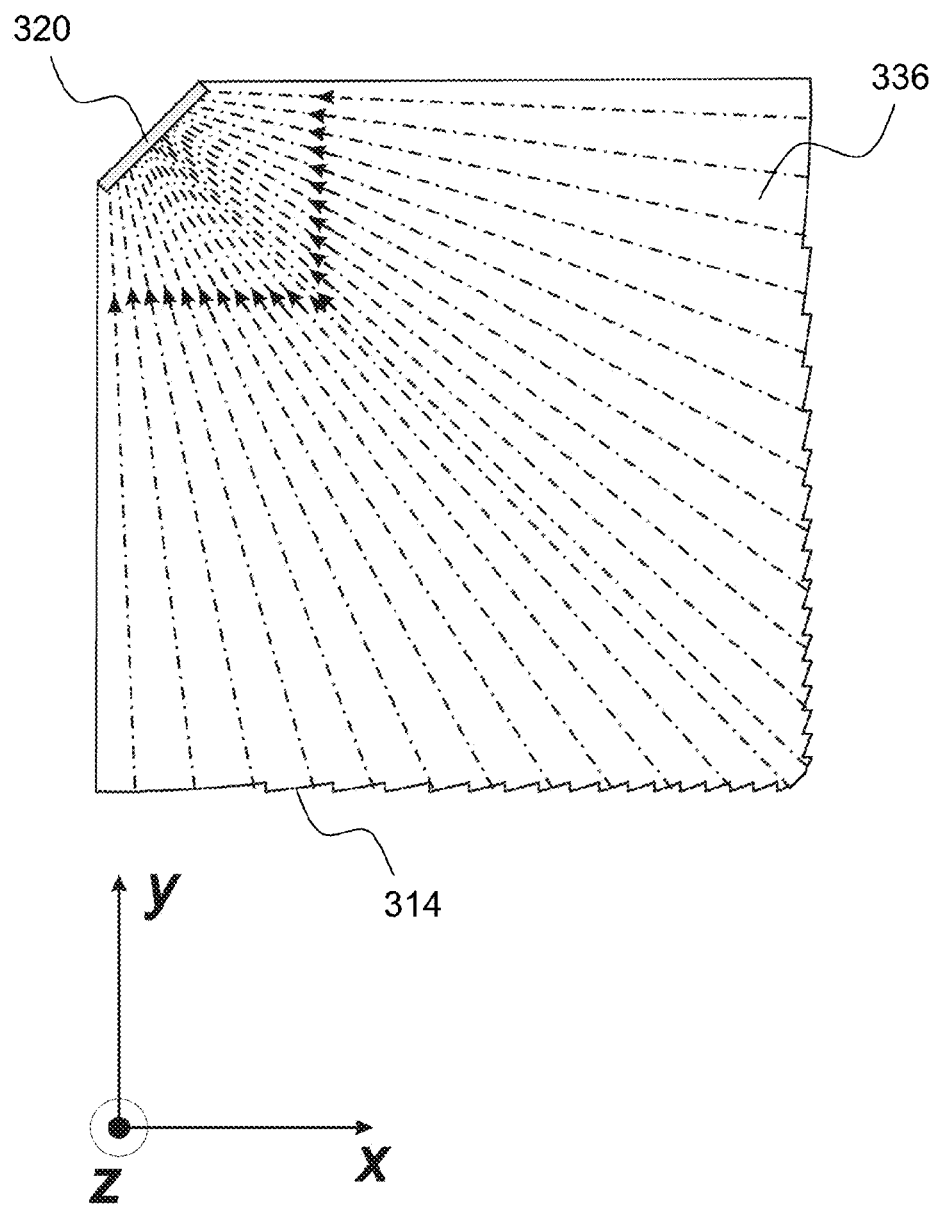

FIG. 17 schematically illustrates a plane view of a preferred embodiment of a device 302 according to the present invention. The device 302 functions in a similar way as the device 202. However, the device 302 comprises three planar waveguides that are illustrated in FIGS. 18-20 showing partly exploded views of the device 302. The device 302 comprises a planar first transmitter waveguide 336, see FIG. 20, a planar second transmitter waveguide 338, see FIG. 18, and a planar touch-sensitive waveguide 308, see FIG. 19. The three planar waveguides are stacked, in which stack the first transmitter waveguide 336 and the second transmitter waveguide 338 are stacked underneath the touch-sensitive waveguide 308 such that a touch-sensitive surface 330 of the touch-sensitive waveguide 308 is accessible for the object (not shown).

Light guided by the touch-sensitive waveguide 308 from a second light redirecting member 312 towards a first light redirecting member 314, forms angles with a normal of the touch-sensitive surface 330 that is smaller than the critical angle of the object (not shown), and larger than the critical angle $\theta_{c,a}$ of the ambient medium. Similar applies for light that is guided by the touch-sensitive waveguide 308 from a fourth light redirecting member 322 towards a third light redirecting member 324. Thus, the object (not shown) contacting the touch-sensitive surface 330 may disturb light that is redirected by the second light redirecting member 312 towards the first light redirecting member 314 or redirected by the fourth light redirecting 322 member towards the third light redirecting member 324. Thus, the advantages stated in connection with the device 102 and 202 also apply for the device 302.

FIG. 17 illustrates an example of a light beam 306 emitted by the light source 304 into the second transmitter waveguide 338, see FIG. 18, for being guided towards a second light redirecting member 312. The second light redirecting member 312 redirects the light beam 306 into the touch-sensitive waveguide 308 for being guided towards a first light redirecting member 314, see FIG. 19. The first light redirecting member 314 redirects the light beam 306 into the first transmitter waveguide 336 for being guided towards a detector array 320, see FIG. 20. The light beam 306 is illustrated by a broken line when being guided by the second transmitter waveguide 338, by a solid line when being guided by the touch-sensitive waveguide 308, and by a dash-dotted line when being guided by the first transmitter waveguide 336. The detector array 320 is illustrated by a dash-dotted line in FIG. 17 for indicating that light guided by the second transmitter waveguide 338 and the touch-sensitive waveguide 308 does not communicate with the detector array 320.

FIG. 18 illustrates that light emitted by the light source 304 substantially illuminates all the light reflecting parts 310 of the second light redirecting member 312. FIG. 18 furthermore illustrates that light emitted by the light source 304 substantially illuminates all the light reflecting parts 328 of a fourth light redirecting member 322.

The device 302 has the advantage that below substantially the entire surface of the touch-sensitive waveguide 308 light beams propagates from both the second light redirecting member 312 and from the fourth light redirecting member 322 as shown in FIG. 19. Thus, the touch-sensitive surface may be substantially larger relative to the extent of the touch-sensitive waveguide 308 in the xy-plane.

Further, the device 302 has the advantage that no special effort has to be made, such as providing a member (not shown) in front of the light source 304, to avoid emitting light directly from the light source 304 into the detector array 320.

Thus, with the device 302 it is possible to detect a contact between the object (not shown) and the touch-sensitive surface 330 of the touch-sensitive waveguide 308.

Figure 21:
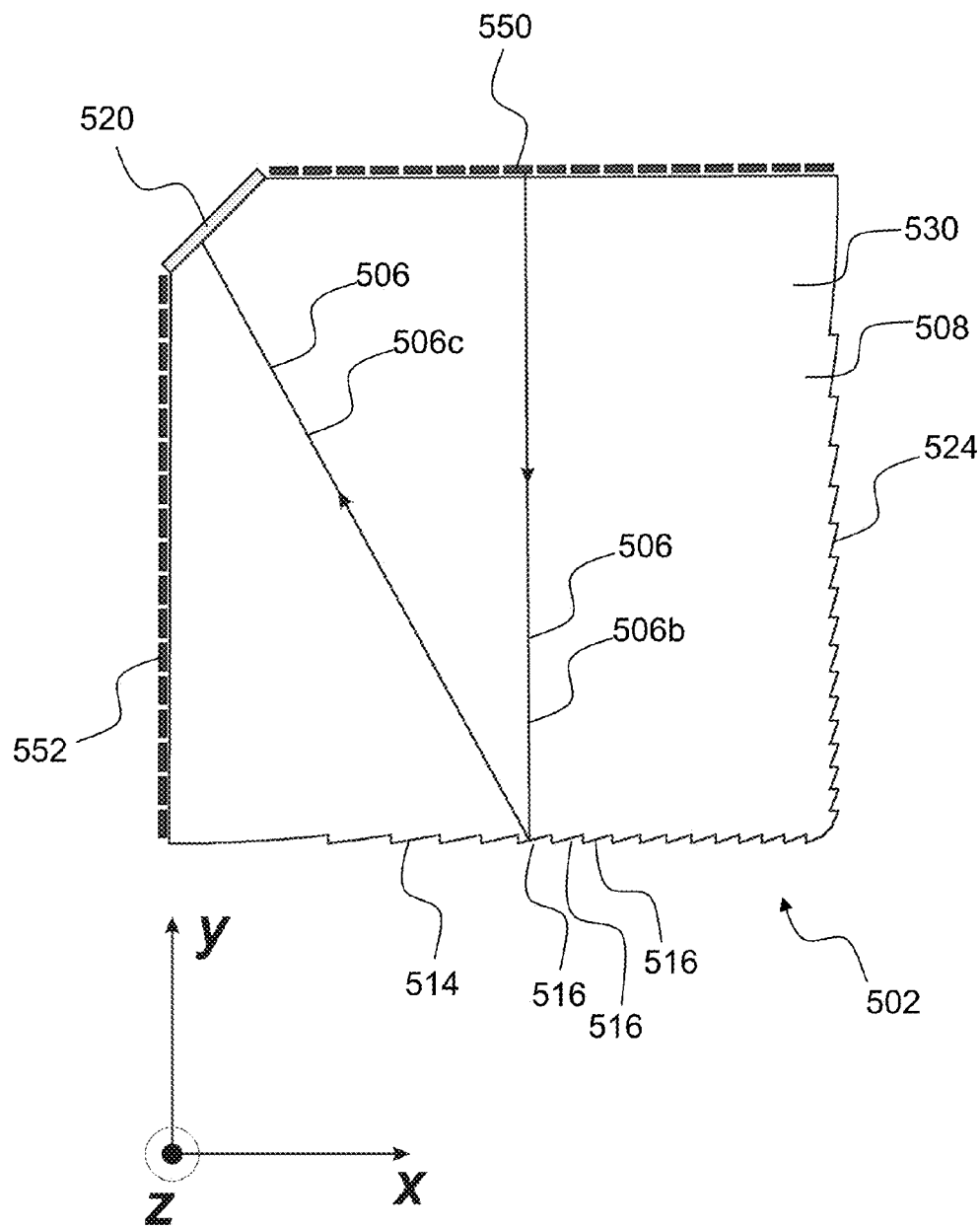

FIG. 21 schematically illustrates a plane view of a touch-sensitive device 502 according to the present invention. The device 502 comprises a planar touch-sensitive waveguide 508 having a touch-sensitive surface 530, a first array of light sources 550, a second array of light sources 552, a first light redirecting member 514 having light reflecting parts 516, a third light redirecting member 524, and a detector array 520. The object (not shown) may interact with the device 502 in a similar way as the object (not shown) may interact with the device 102, i.e. the object (not shown) contacting the touch-sensitive surface 530 may disturb light propagating towards the first light redirecting member 514 and may preferably not disturb light redirected by the first light redirecting member 514 towards the detector array 520. Similarly applies for the third light redirecting member 524.

The embodiment 502 has the advantage that a light beam propagating towards the detector array 520 is redirected only once by a light redirecting member 514, 524.

FIG. 21 shows a light beam 506, illustrated by the solid lines with arrowheads, which light beam 506 is guided from the first array of light sources 550 towards the first light redirecting member 514 and subsequently towards the detector array 520. The light beam 506 comprises two light beams 506b and 506c. The light beam 506b forms an angle with a normal of the touch-sensitive surface 530 that is smaller than the critical angle $\theta_{c,o}$ of the object (not shown) and larger than the critical angle $\theta_{c,a}$ of the ambient medium. Thus, the object (not shown) contacting the touch-sensitive surface 530 may disturb the light beam 506b during propagation towards the first light redirecting member 514.

The first light redirecting member 514 redirects the light beam 506 such that the light beam 506c propagates towards the detector array 520 and such that the light beam 506c during propagation forms an angle with a normal of the touch-sensitive surface 530 that is larger than the critical angle θ$_{c,o}$ of the object (not shown). Thus, the object (not shown) cannot disturb the light beam 506c during propagation towards the detector array 520.

The first array of light sources 550 substantially illuminates the light reflecting parts 516 of the first light redirecting member 514.

Likewise, light beams (not shown) emitted from the second array of light sources 552 towards the third light redirecting member 524 and, therefore towards the detector array 520, functions in a similar way and provides similar features as light emitted from the first array of light sources 550, described above.

Figure 22:
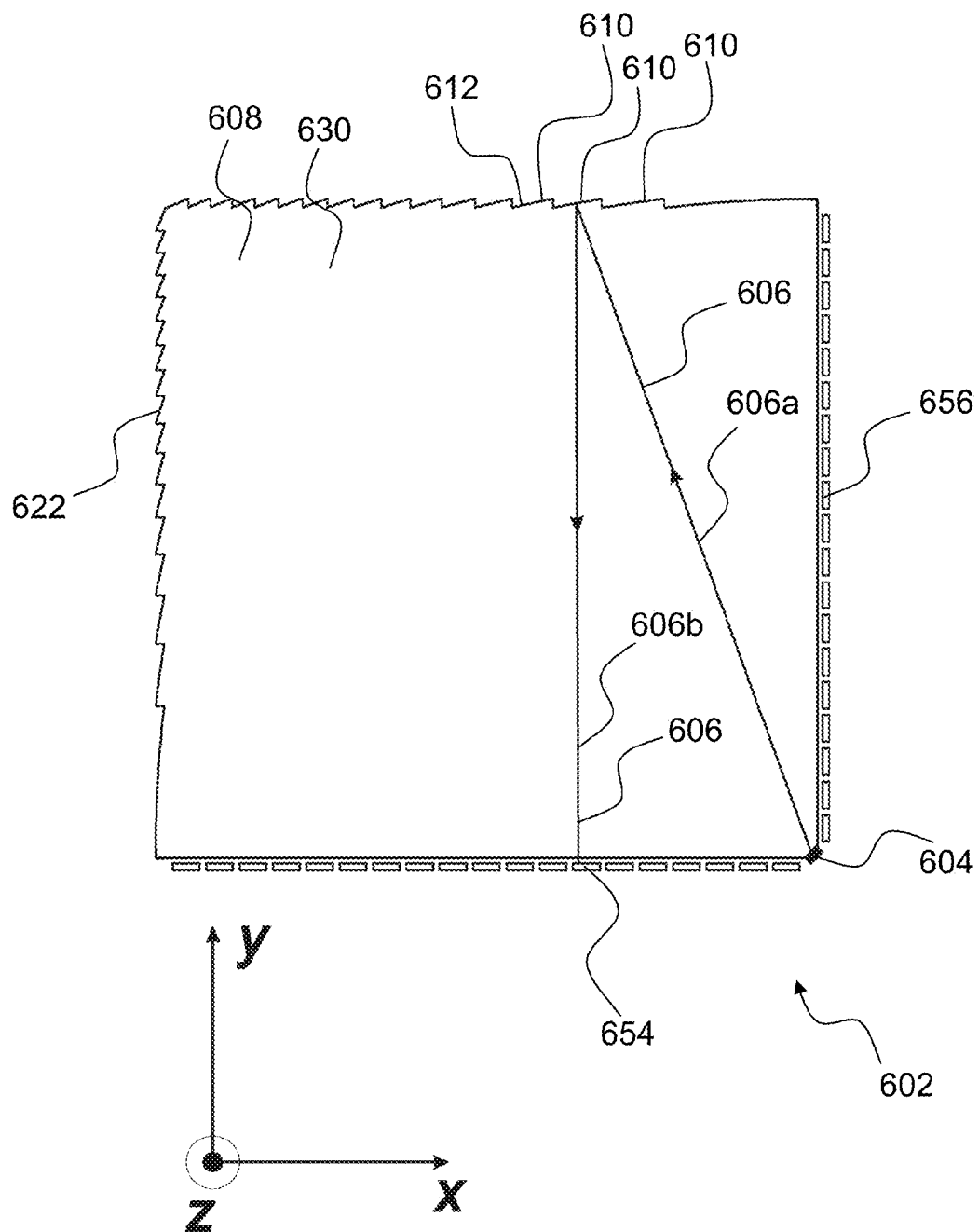

FIG. 22 schematically illustrates a plane view of an embodiment of a touch-sensitive device 602 according to the present invention. The device 602 comprises a planar touch-sensitive waveguide 608 having a touch-sensitive surface 630, a light source 604, a second light redirecting member 612 having light reflecting parts 610, a fourth light redirecting member 622, a first detector array 654, and a second detector array 656. The object (not shown) may interact with the device 602 in a similar way as the object (not shown) may interact with the device 102, i.e. the object (not shown) contacting the touch-sensitive surface 630 may disturb light redirected by the second light redirecting member 612 and may preferably not disturb light emitted by the light source 604 towards the second light redirecting member 612. The fourth light redirecting member 622 operates in a similar way.

The embodiment 602 has the advantage that a light beam emitted by the light source 604 only is redirected once by a light redirecting member 514, 524 before the light beam is incident on a detector array 654, 656.

FIG. 22 shows a light beam 606, illustrated by solid lines with arrowheads, which light beam 606 is guided from the light source 604 towards the second light redirecting member 612 which redirects the light beam 606 towards the first detector array 654.

The light beam 606 comprises light beams 606a and 606b. The light beam 606a forms an angle with a normal of the touch-sensitive surface 630 that is larger than the critical angle θ$_{c,o}$ of the object (not shown). Thus, the object (not shown) cannot disturb the light beam 606a.

The second light redirecting member 612 redirects the light beam 606 such that the light beam 606b propagates towards the first detector array 654 and such that the light beam 606b forms an angle with a normal of the touch-sensitive surface 630 that is smaller than the critical angle qc,o of the object (not shown) and larger than the critical angle qc,a of the ambient medium. Thus, the object (not shown) contacting the touch-sensitive surface 630 may disturb the light beam 606b during propagation from the second light redirecting member 612 towards the first detector array 654.

The light source 604 substantially illuminates the light reflecting parts 610 of the second light redirecting member 612.

Light beams (not shown) emitted by the light source 604 towards the fourth light redirecting member 622 and, therefore towards the second detector array 656, functions in a similar way and provides similar features as light emitted by the light source 604 towards the fourth light redirecting member 622, as described above.

Figure 23:
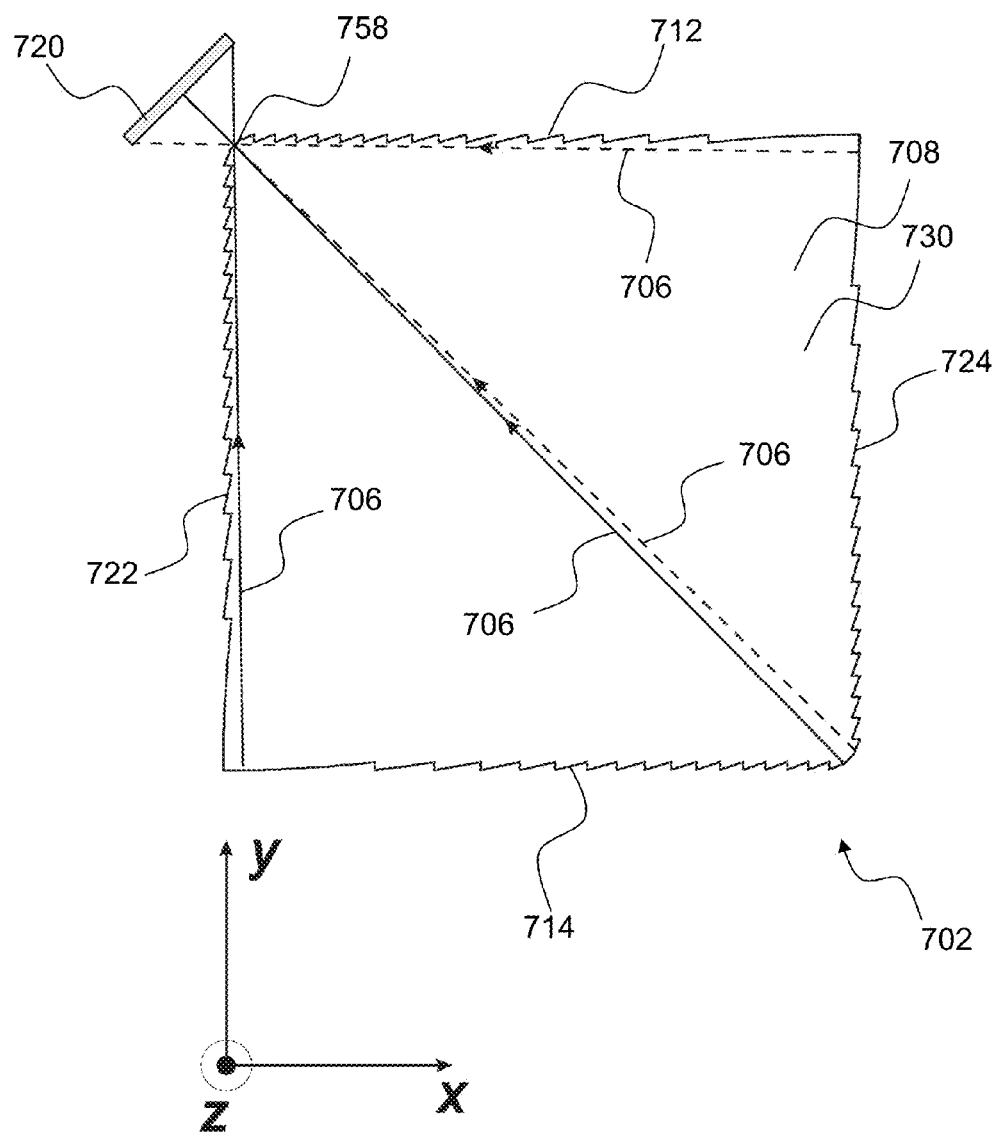
Figure 24:
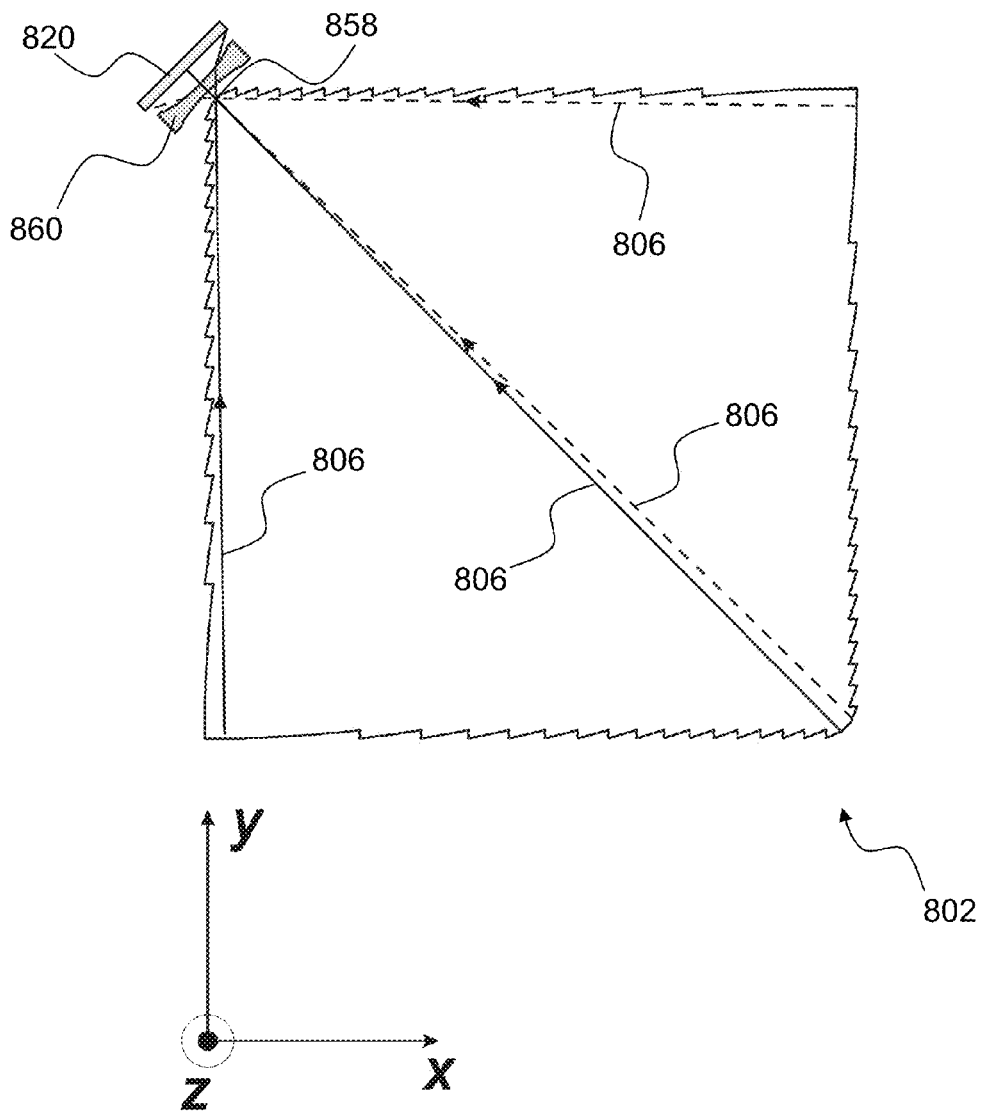
Figure 25:
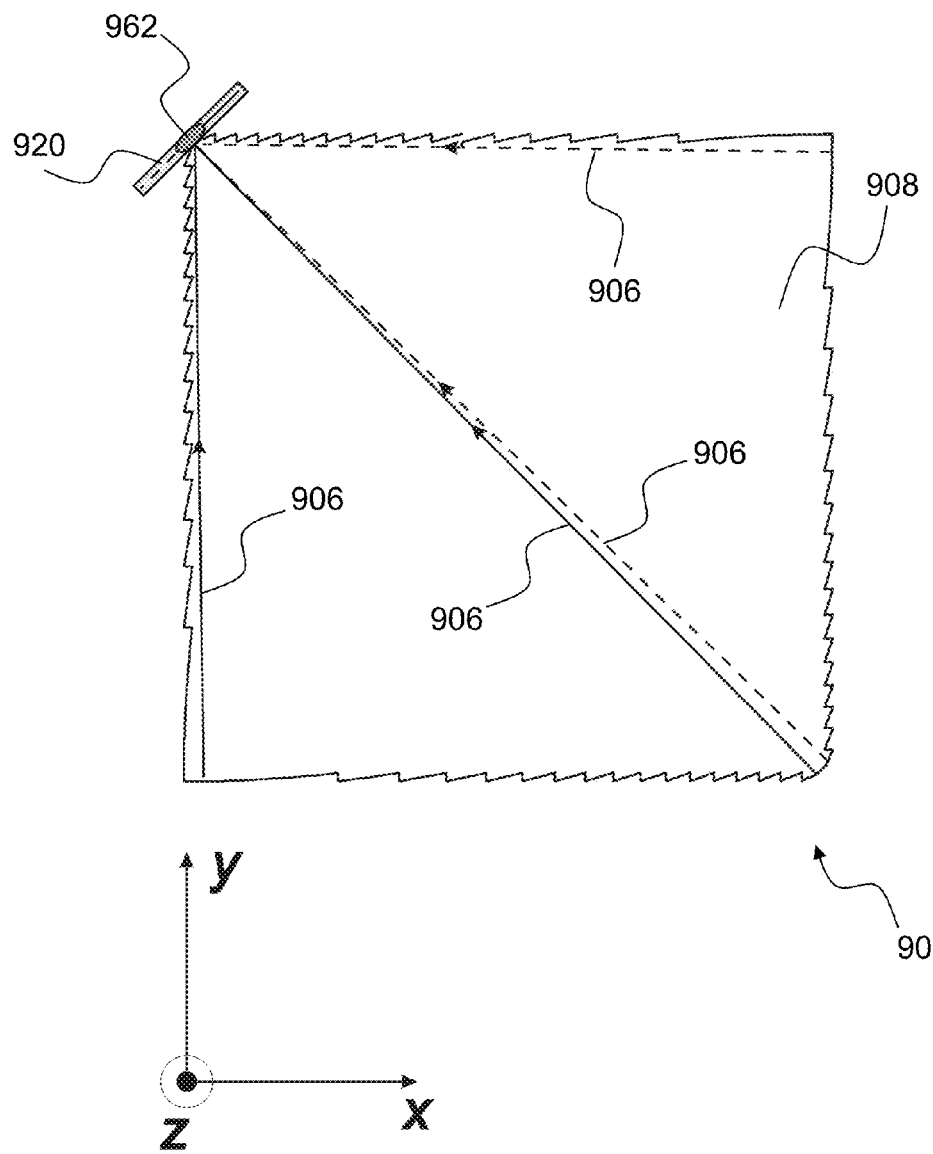

FIGS. 23-25 show different embodiments according to the present invention wherein a detector array is arranged in different ways. Any of the embodiments shown in FIGS. 23-25 may be combined with any of the devices according to the invention, such as 2, 102, 202, 302, 402, 502, etc.

Figure 34:
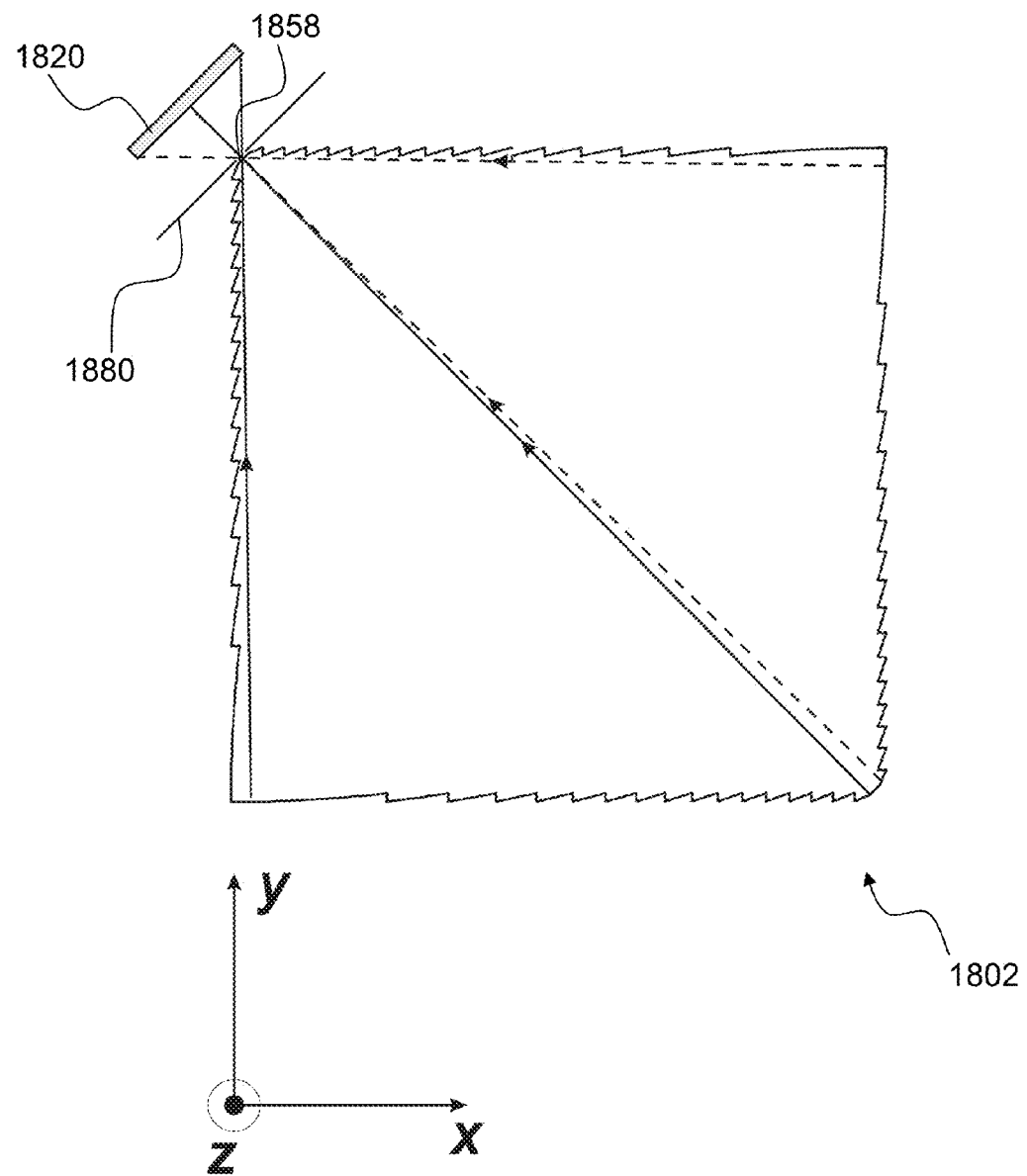

FIG. 23 schematically illustrates a plane view of an embodiment of a touch-sensitive device 702 according to the present invention. A detector array 720 is situated behind a focal point 758 of four illustrated substantially extreme light beams 706. By placing the detector array 720 behind the focal point 758 of the light beams 706, it is possible that a second light redirecting member 712 and a fourth light redirecting member 722 may be situated substantially next to each other allowing that a substantially larger part of the touch-sensitive surface 730 may be usable. A filter may be situated near or at the focal point 758 in order to avoid noise, i.e. e.g. light from unwanted directions, to reach the detector array 720. The embodiments illustrated in FIGS. 24 and 25 may comprise a similar filter near or at the respective focal points. An embodiment comprising a filter is illustrated in FIG. 34.

FIG. 24 schematically illustrates a plane view of an embodiment of a touch-sensitive device 802 according to the present invention. The major part of the device 802 is similar to the device 702, and the device 802 therefore functions in substantially the same way as the device 702. Further, the device 802 provides substantially similar advantages. The device 802 includes an optical element 860 situated in front of a detector array 820. The optical element 860 may be an imaging element. The optical element 860 spreads diverging light further before the light is incident upon the detector array 820, such that a relatively wide detector array 820 is fully usable closer to the focal point 858 than what is possible without the optical element 860.

FIG. 25 schematically illustrates a plane view of a touch-sensitive device 902 according to the present invention. The device 902 resembles the device 702 and the device 802. Light beams 906 having propagated through the touch-sensitive waveguide 908 are projected downwards by a light projecting member 962 before the light beams 906 are incident upon the detector array 920. This has the advantage that the extent of the embodiment in the xy-plane is reduced. In one embodiment (not shown), a detector array is entirely covered by a touch-sensitive waveguide, whereby the extent in the xy-plane of the embodiment is reduced further compared to the device 902.

The embodiments illustrated in connection with FIGS. 23-25 furthermore have the advantage that only light propagating substantially in the yz-plane towards the respective first light redirecting member or substantially in the xz-plane towards the respective second light redirecting member, may be incident upon the detector array. For instance, this may in particular be advantageous if combined with the device 502, given that at least one light source within the first array of light sources 550 emits light in a direction not lying in the yz-plane, or, if at least one light source within the second array of light sources 552 emits light in a direction not lying in the xz-plane.

Figure 26:
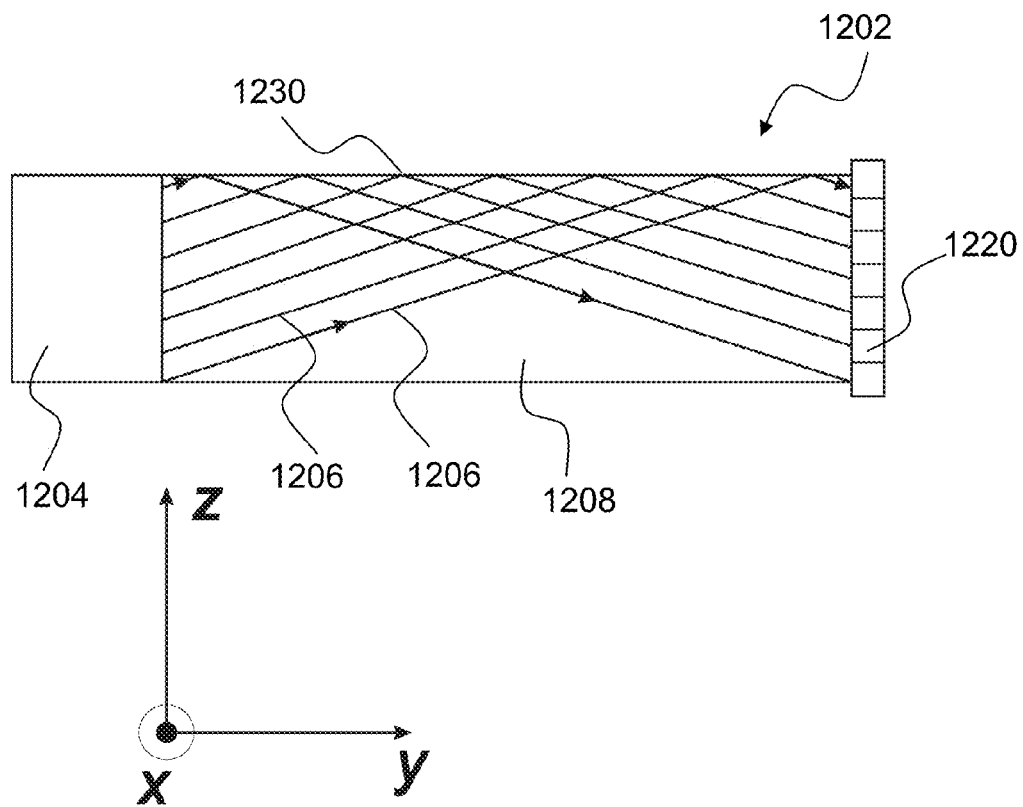

FIG. 26 schematically illustrates a cross section of an embodiment of a device 1202 according to the present invention. Any light redirecting members are omitted in the schematic drawing for the purpose of simplifying the illustration. The device 1202 shows that one reflection and the corresponding point of incidence of a light beam 1206 at a touch-sensitive surface 1230 may correspond unambiguously to a point of incidence on a two-dimensional detector array 1220 and vice versa. This can be utilized by an embodiment (not shown) according to the present invention comprising a two-dimensional detector array, a first light redirecting member and a second light redirecting member, but where a third light redirecting member and a fourth light redirecting member are not needed in order to position encode a contact between a touch-sensitive surface and the object in two-dimensions. As shown in FIG. 26, an x-coordinate of the touch-sensitive surface corresponds to an x-coordinate of the two-dimensional detector array, and a y-coordinate of the touch-sensitive surface corresponds to a z-coordinate of the two-dimensional detector array.

Figure 27:
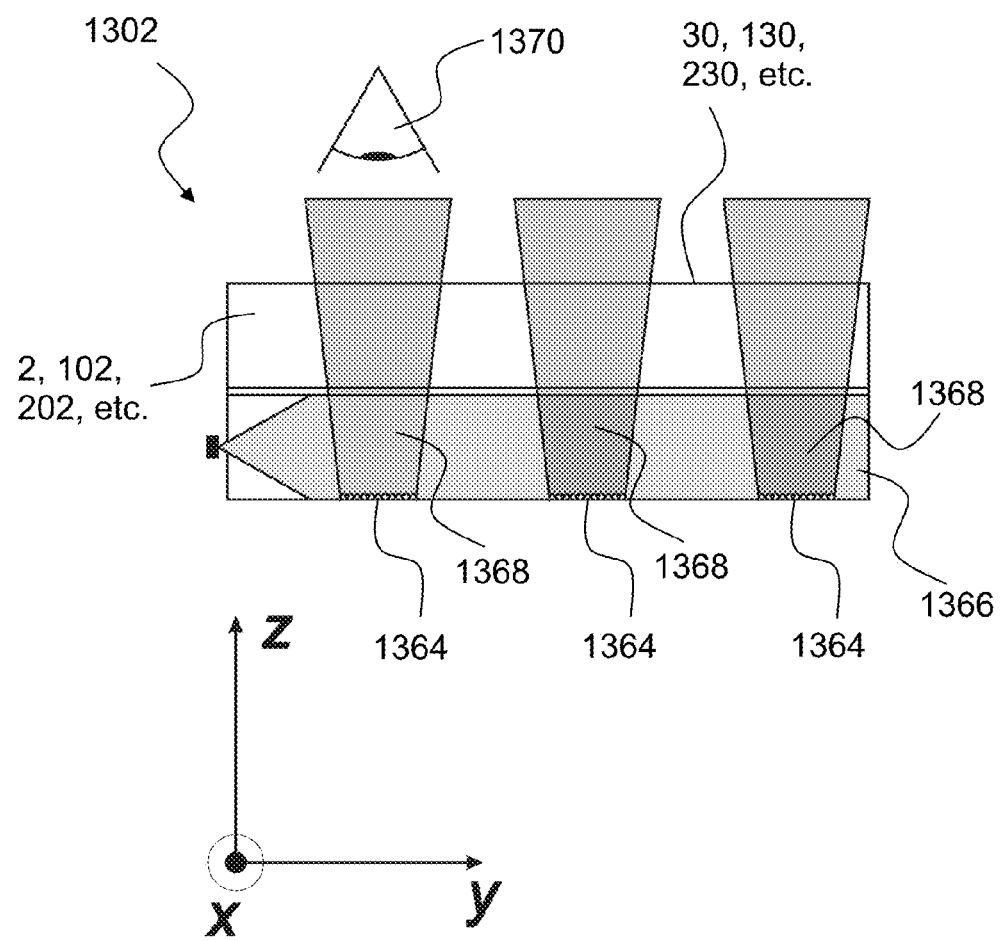

FIG. 27 schematically illustrates a cross sectional view of an embodiment of a touch-sensitive device 1302 according to the present invention. A number of microstructures 1364 are embedded in a waveguide 1366 situated under a touch-sensitive device, such as 2, 102, 202, 302, 402, 502, 602, 702, 802, 902, 1002, 1102, or 1202. Light 1368 redirected by a microstructure 1364 is propagating through a touch-sensitive surface of the touch-sensitive device for displaying information to a user 1370, who is schematically illustrated by an eye 1370. For simplification, any refraction etc. of the light 1368 is not shown.

Figure 28:
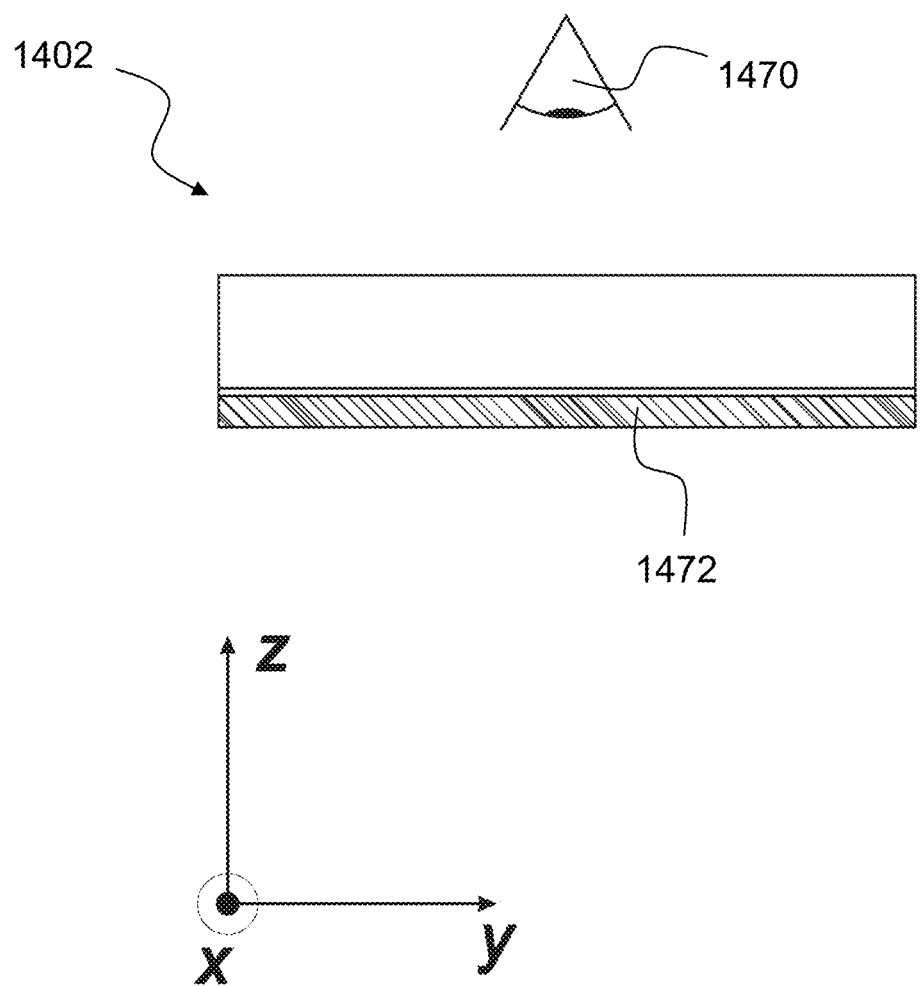

FIG. 28 schematically illustrates a cross sectional view of an embodiment of a touch-sensitive device 1402 according to the present invention. A display 1472 is situated below a touch-sensitive device, such as 2, 102, 202, 302, 402, 502, 602, 702, 802, 902, 1002, 1102, 1202 or 1302, for providing information to a user 1470, who is schematically illustrated by an eye 1470. By combining the display 1472 with a touch-sensitive device according to the present invention, a touch screen is provided.

Figure 29:
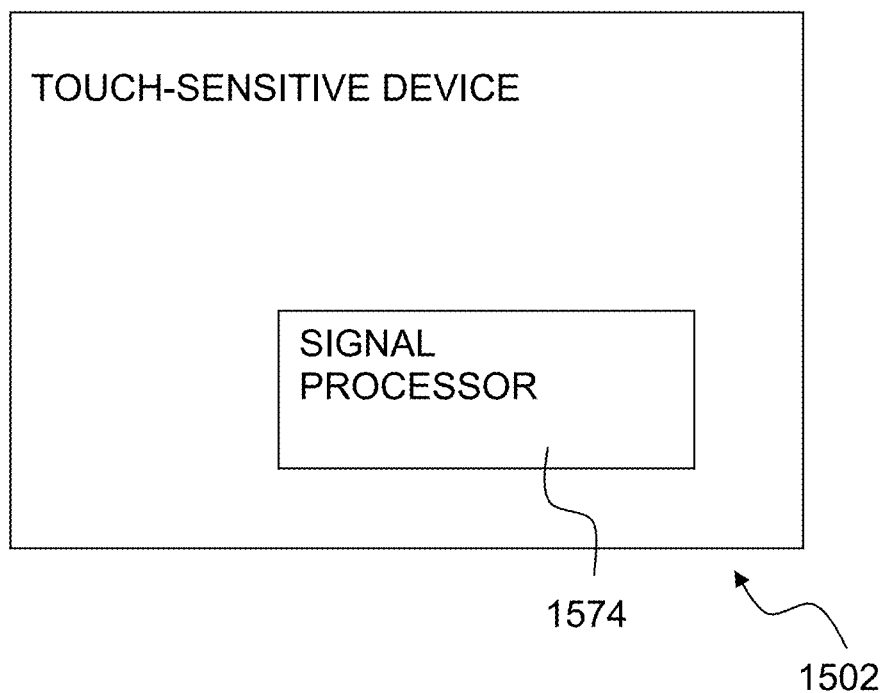
Figure 30:
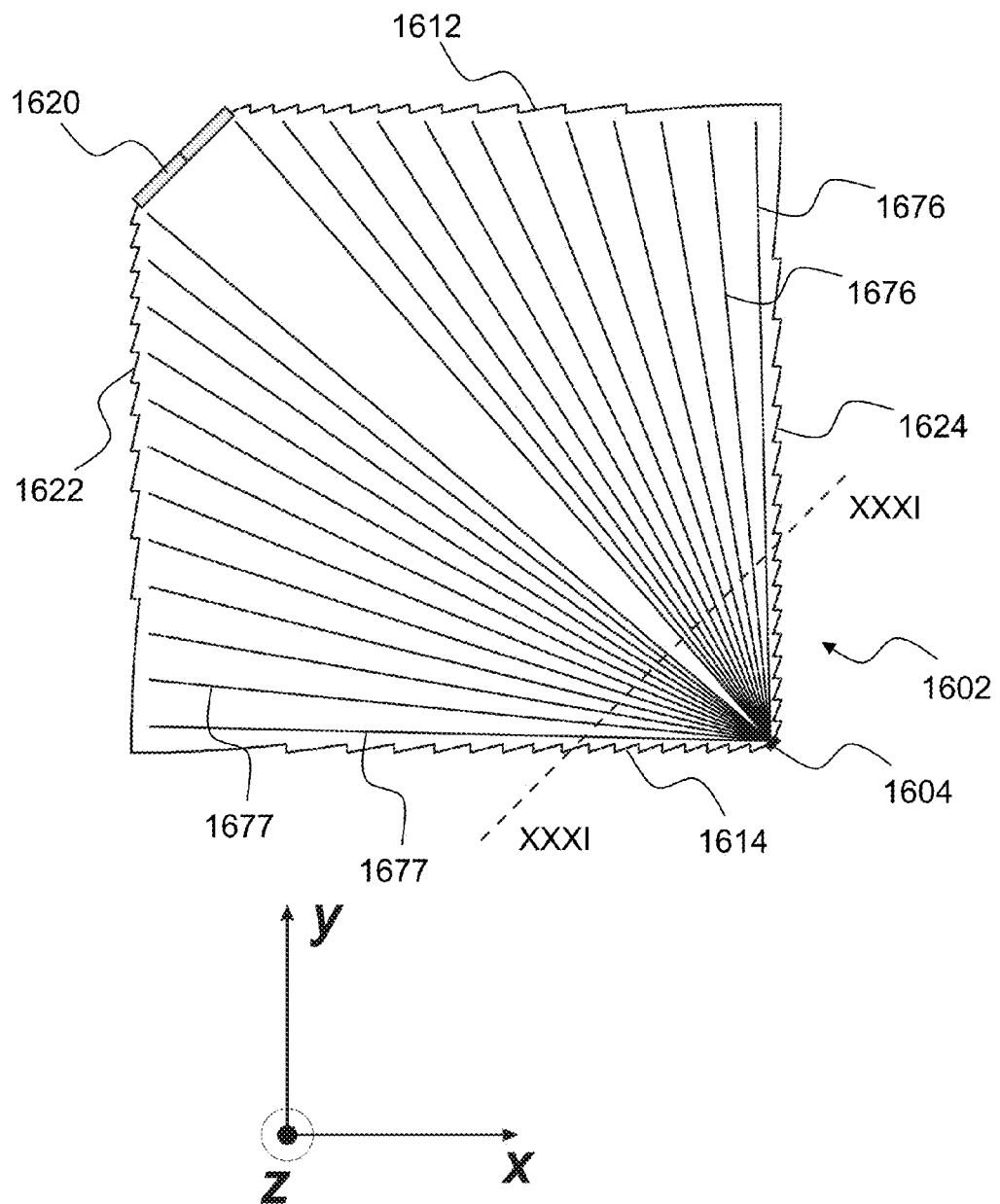

FIG. 29 schematically illustrates an embodiment of a touch-sensitive device 1502 according to the present invention comprising a signal processor 1574. The signal processor 1574 is adapted for position encoding a contact point between the object and a touch-sensitive waveguide (not shown) of the touch-sensitive device 1502. In one embodiment, the signal processor 1574 is adapted for calculating a contact area between the object and the touch-sensitive waveguide, a velocity between the object and the touch-sensitive waveguide, an acceleration between the object and the touch-sensitive waveguide, or any combination hereof FIG. 30 schematically illustrates a plane view of an embodiment of touch-sensitive device 1602 according to the present invention including a number of substantially one-dimensional cores 1676 for guiding light along a longitudinal extension of each of the one-dimensional cores 1676. The illustrated numbers of one-dimensional cores 1676 are embedded in the first transmitter waveguide. Thus, it is not possible that the object (not shown) touching the touch-sensitive surface can disturb light guided by a one-dimensional core 1676. The illustrated one-dimensional cores 1676 are adapted for guiding light from the light source 1604 to the second light redirecting member 1612. The illustrated one-dimensional cores 1677 are adapted for guiding light from the light source 1604 to the fourth light redirecting member 1622. A number of one-dimensional cores (not shown) may be adapted for guiding light from the first light redirecting member 1614 to the detector array 1620. A number of one-dimensional cores (not shown) may be adapted for guiding light from the third light redirecting member 1624 to the detector array 1620.

Figure 31:
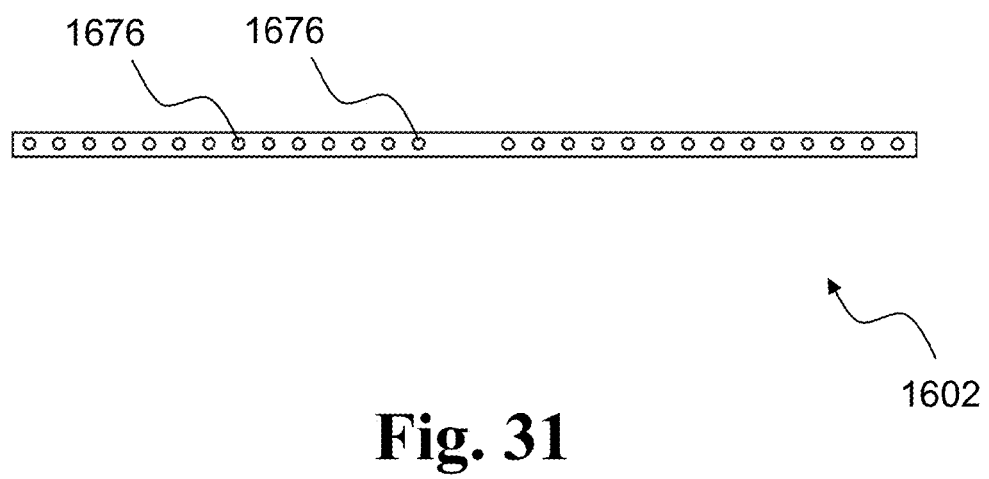
FIG. 31 illustrates a cross section taken along the line XXXI-XXXI of FIG. 30, FIG. 32 schematically illustrates a plane view of an embodiment of a device according to the present invention.

FIG. 31 illustrates a cross section taken along the line XXXI-XXXI of FIG. 30.

Figure 32:
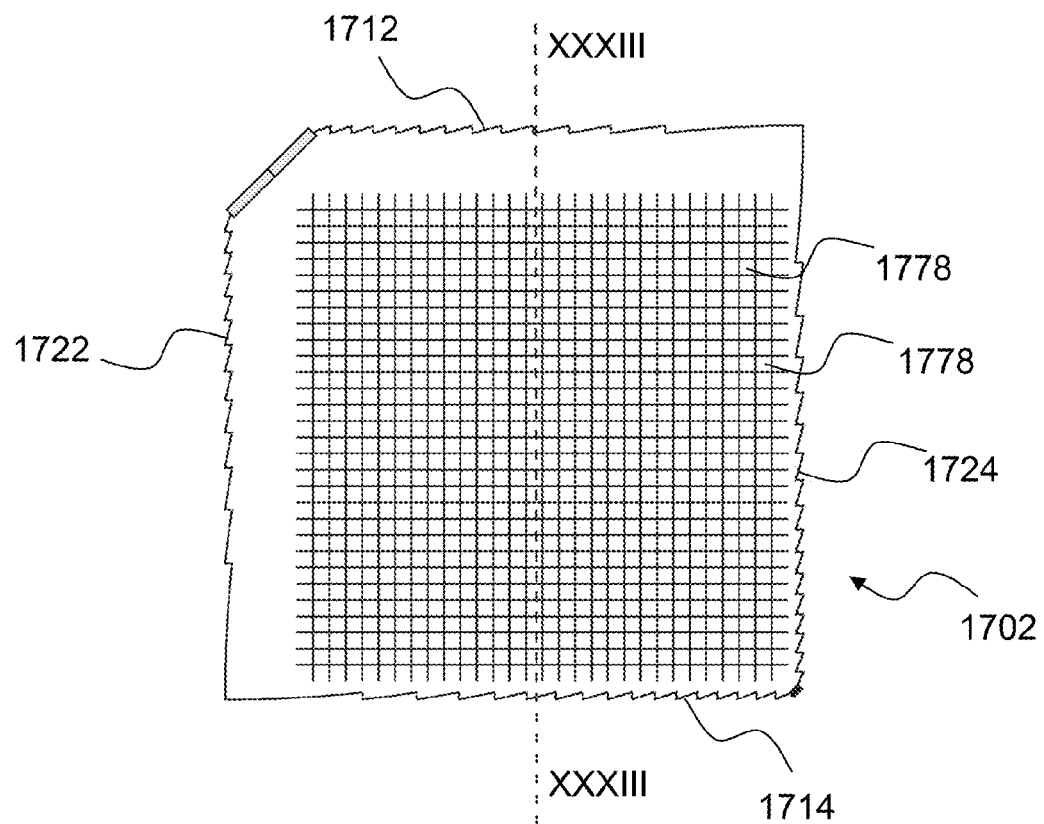
Figure 32:
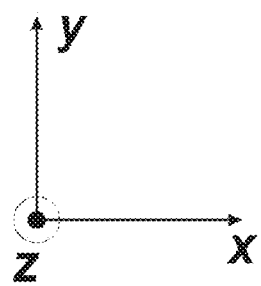

FIG. 32 schematically illustrates a plane view of an embodiment of touch-sensitive device 1702 according to the present invention having a substantially planar geometry with embedded grooves or channels 1778 for guiding light. At least some of the embedded grooves or channels 1778 for guiding light are intersecting. The intersecting grooves or channels 1778 for guiding light are substantially orthogonal. Some of the illustrated grooves or channels are adapted for guiding light from the second light redirecting member 1712 towards the first light redirecting member 1714. Some of the illustrated grooves or channels are adapted for guiding light from the fourth light redirecting member 1722 towards the third light redirecting member 1724.

Figure 33:
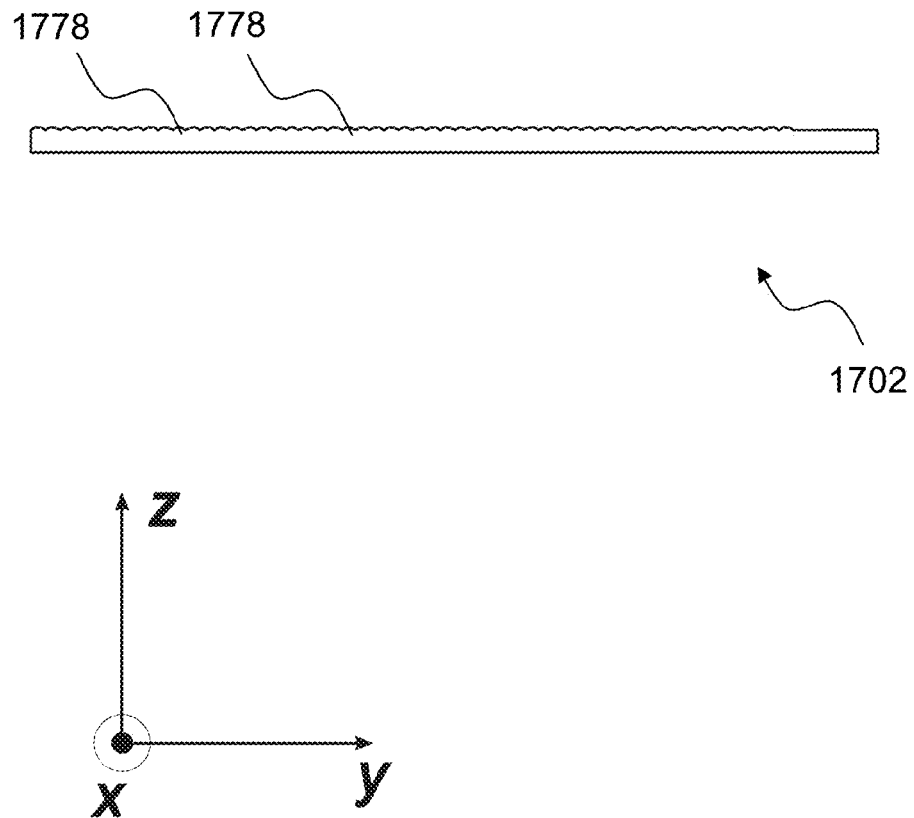
FIG. 33 illustrates a cross section taken along the line XXXIII-XXXIII of FIG. 32, FIG. 34 schematically illustrates a plane view of an embodiment of a device according to the present invention, FIG. 35 schematically illustrates a plane view of an embodiment of a device according to the present invention, FIG. 36 schematically illustrates an example of measured signal at a detector array as a function of a coordinate measured at the detector array, FIG. 37 schematically illustrates an example of measured signal at a detector array as a function of a coordinate measured at the detector array for two different times, and FIG. 38 schematically illustrates an example of measured signal at four specific coordinates of the detector array as a function of time.

FIG. 33 illustrates a cross section taken along the line XXXIII-XXXIII of FIG. 32.

FIG. 34 schematically illustrates a plane view of an embodiment 1802 of a device according to the present invention. The embodiment 1802 comprises a filter situated at the focal point 1858 in order to avoid noise, i.e. e.g. light from unwanted directions, to reach the detector array 1820. The filter is schematically illustrated in form of a pinhole in a plate 1880. The extension of the plate 1880 serves an illustrative purpose.

Figure 35:
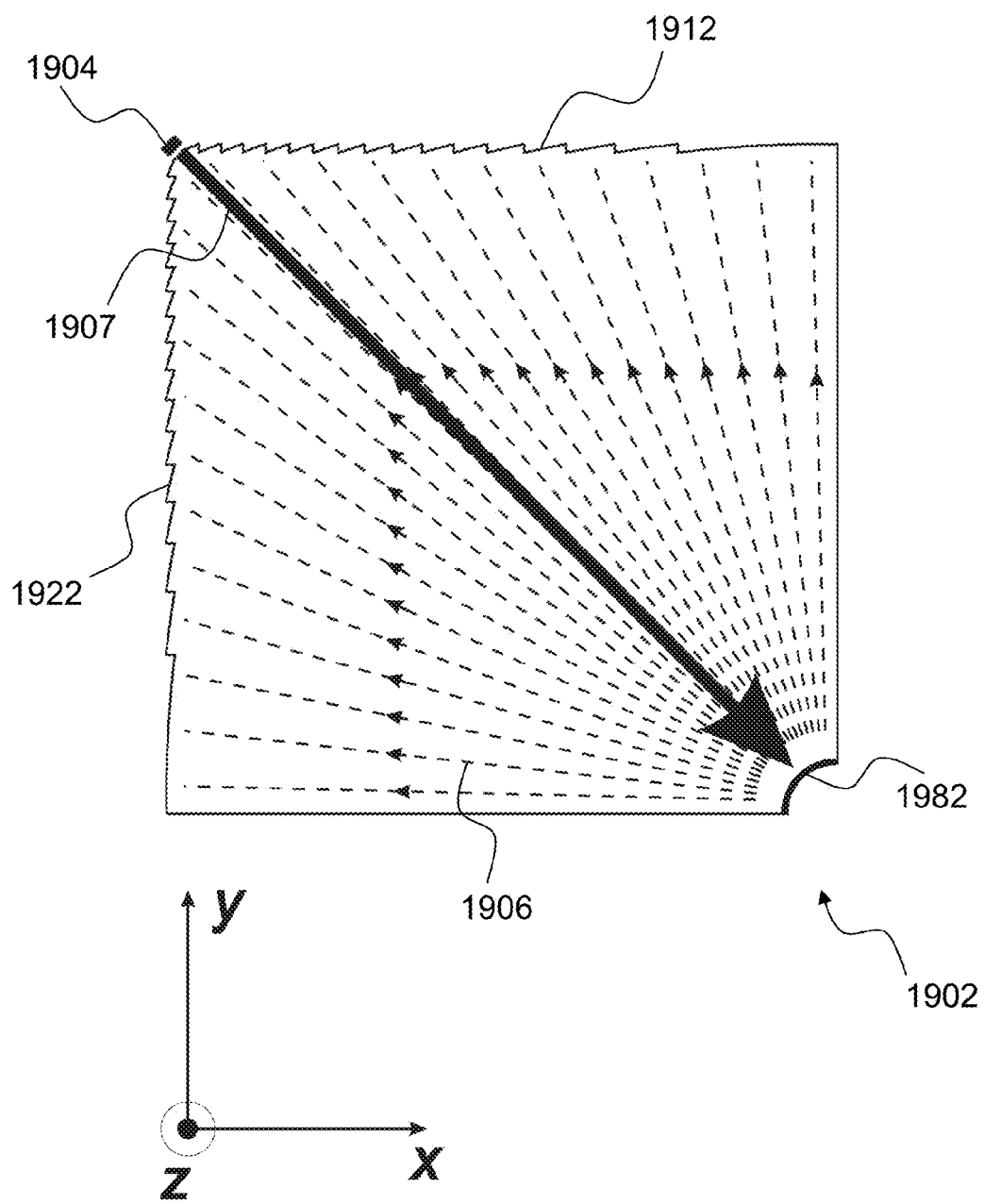

FIG. 35 schematically illustrates a plane view of an embodiment of a device according to the present invention. The embodiment may be a single and/or a multi-layer waveguide, e.g. one-layered, two-layered, or three-layered. In the distal corner of the light source 1904 is situated a mirror-like element 1982. The mirror-like element 1982 is curved in the xy-plane. Light 1907 from the light source 1904 is redirected, such that the resulting redirected light 1906 is redirected towards the second light redirecting member 1912 and the fourth light redirecting member 1922, respectively. The redirected light 1906 is illustrated by the broken lines. Preferably, the redirection is a reflection. Preferably, the mirror-like element 1982 is a mirror. Preferably, the redirected light 1906 is substantially evenly spread such that the second light redirecting member 1912 and the fourth light redirecting member 1922, respectively, are substantially illuminated. It may be an advantage that the light source 1904 is situated proximate to the detector array (not illustrated in FIG. 35), e.g. since the space needed around the waveguide may be less.

As mentioned above, based on a changed intensity distribution (signal) detected by the detector array, a position of a contact point may be determined. Preferably, the position is determined on the basis of two coordinates, such as an x- and y-coordinate, which are determined by means of the detected changes in intensity distribution at the detector array. If only one touch is present at a given time, the detected x- and y-coordinate relates to that touch.

If two or more contact points, e.g. generated by one, two or more objects simultaneously contacting the touch-sensitive surface at different contact points, are present for a common period, a proportional number of touch-coordinates may be determined by means of the detector array. However, it may not be straight forward to determine which combinations of the determined touch-coordinates that express the real contact points. Furthermore, two or more contact points may have at least one substantially common coordinate. Thus, the number of determined touch-coordinates may not be proportional to the number of different concurrent contact points.

Preferably, the device according to the present invention is adapted such that a user may generate input by creating two or more concurrent contact points by means of one, two or more objects, e.g. fingers, which simultaneously touch the device. Multiple touches existing for at least a common time are referred to as concurrent.

Figure 36:
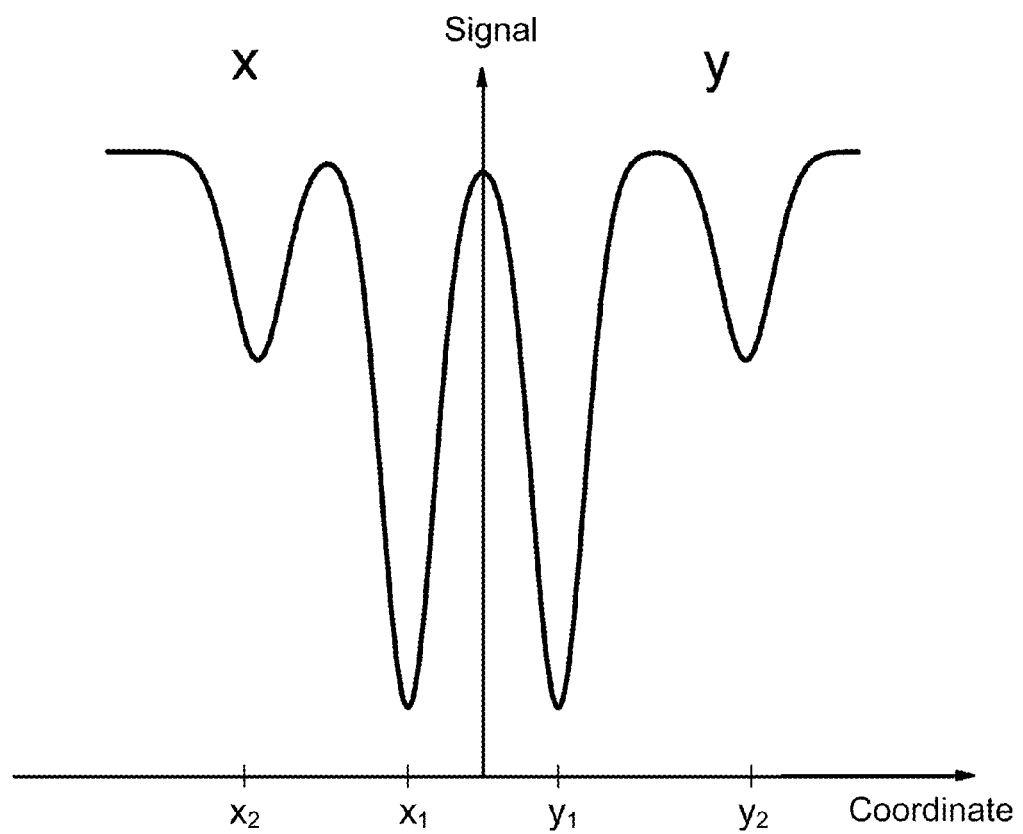
Figure 37:
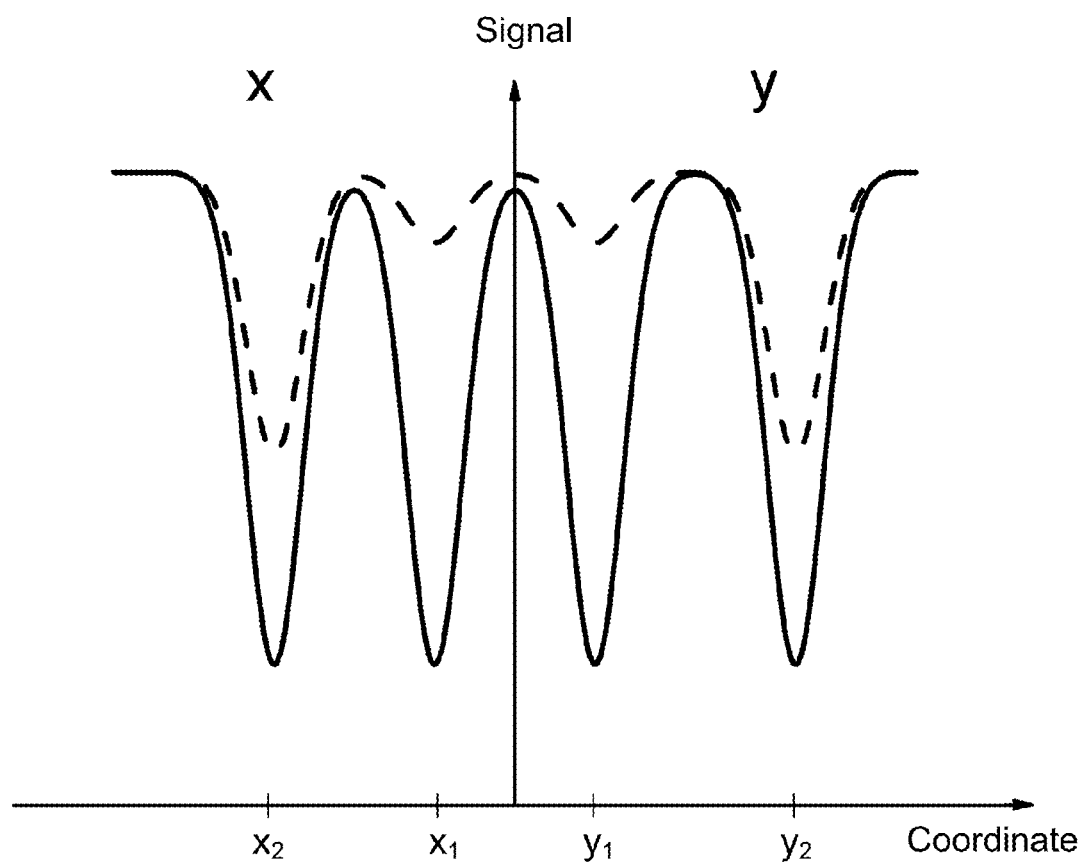
Figure 38:
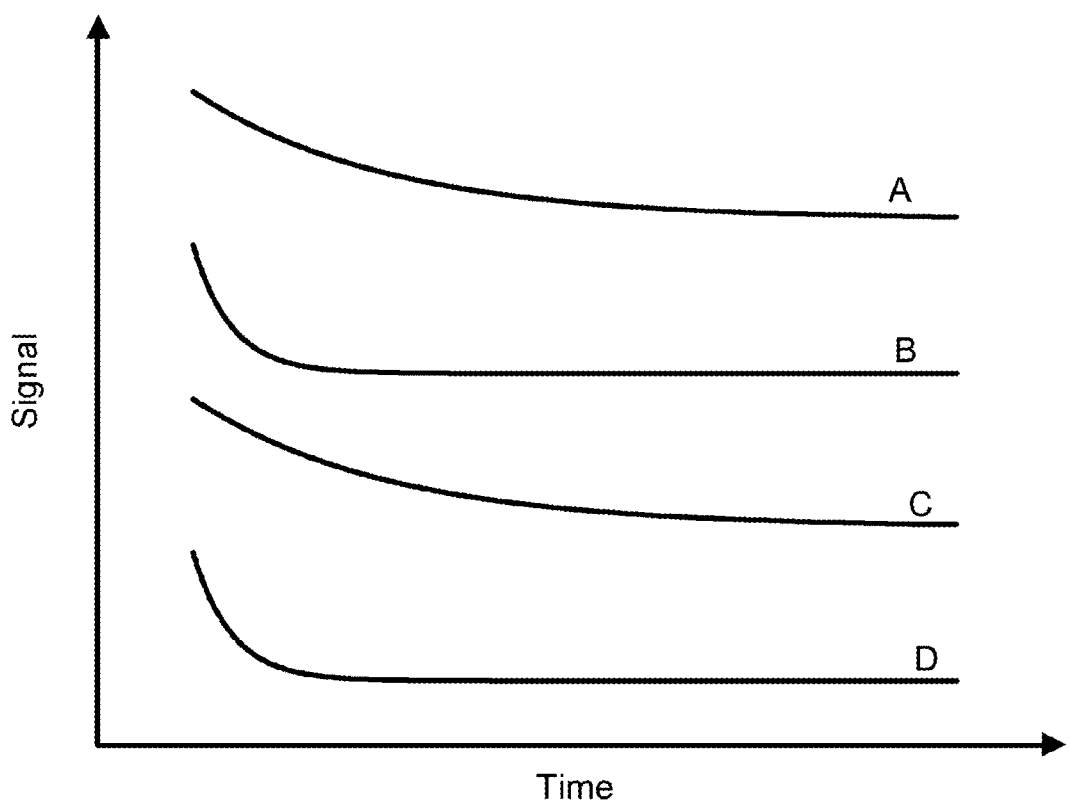

FIGS. 36-38 illustrate measurements used in exemplifying methods of determining the relation between detected coordinates and thus in determining touch-positions. The exemplifying measurements illustrated in FIGS. 36-38 illustrate how two sets of coordinates, which for instance are generated by two fingers touching the touch-sensitive surface of the device according to the present invention, may be mutually related. However, as explained above, the method may be used for more than two concurrent touches.

FIG. 36 schematically illustrates an example of the measured signal at a detector array as a function of coordinate at the detector array. As mentioned, the detector array may be two-dimensional. However, only a one-dimensional resolution may be of interest since both an x- and y-coordinate of a touch may be deduced from a detector array having a one-dimensional resolution as explained earlier. As mentioned in connection with FIG. 26, the other dimension of a two-dimensional detector array may for some embodiments provide information relating to a coordinate. However, this is not treated any further in connection with FIGS. 36-38.

FIG. 36 illustrates the detection of four coordinates: $x_1$, $x_2$, $y_1$, and $y_2$. It is seen that $x_1$ and $y_1$ have similar signal profiles and also $x_2$ and $y_2$ have similar signal profiles. Thus, it can be concluded that $x_1$ and $y_1$ may be the two coordinates corresponding to a first touch and that $x_2$ and $y_2$ may be the two coordinates corresponding to a second touch. Signal profiles for a given time may be analysed using methods forming part of the state of the art, for instance, the width and/or depth of valleys (touch-coordinates) may be compared.

FIG. 37 schematically illustrates an example of measured signal at a detector array as a function of a coordinate of the detector array for two different times. The broken line illustrates the measured signal a short while after two objects have touched the touch-sensitive surface. The solid line illustrates the measured signal a short while after the time for the measurement of the broken line, i.e. e.g. when the objects have changed the contact area slightly for instance by pushing slightly harder and thus e.g. making the contacted area slightly larger in case the objects are fingers. It is seen that it may be difficult to determine which touch-coordinates are generated by the same touch if only the solid line is used in the determination. However, using the data from the measurement illustrated by the broken line, a more reliable result may be obtained.

Preferably, a number of measurement data, such as those presented by the solid line and the broken line, comprising measurement of intensity as a function of coordinate for different times are evaluated in order to deduce the connection between the detected coordinates.

FIG. 38 schematically illustrates an example of measured signal at four specific coordinates (A, B, C, and D) of the detector array as a function of time. The four curves are shifted along the signal-axis for illustrative purpose. The four coordinates each corresponds to a touch-coordinate. The measured signal as a function of time is utilized for evaluating the relation between the detected coordinates, i.e. e.g. which x-coordinate corresponds to which y-coordinate. By running any curve correlation analysis as known in the art, it can be determined which touch-coordinates are generated by the same touch. In the illustrated example, A and C relate and B and D relate.

It is obvious that the invention is not limited to the above described embodiments. Furthermore, any of the above mentioned features may be combined.

The object may be a stylus, a finger, or any other physical object, which may be used for touching a touch-sensitive device according the present invention. The refractive index of the stratum corneum (the outermost layer of dead skin on a fingertip), is measured to a very stable value of approximately 1.47. The object may be movably connected to a touch-sensitive device according to the present invention. Alternatively or additionally, the object may be hand-held.

The object may disturb light that is guided within the touch-sensitive waveguide in several ways, for example the object may change the direction of propagation of light e.g. by coupling light out of the touch-sensitive waveguide, absorbing light, scattering light, or any combination hereof. Alternatively or additionally, the object may disturb light that is guided within the touch-sensitive waveguide by changing the intensity or intensity distribution of light incident upon the detector array by coupling light out of the touch-sensitive waveguide, absorbing light, scattering light, or any combination hereof.

When the object contacts the touch-sensitive surface, it means that the object influences the evanescent field of light that is guided by the touch-sensitive waveguide.

Position encoding a contact point between the object and the touch-sensitive surface of a touch-sensitive device according to the present invention may include determining a position of a contact point or area or determining a position change of a contact point or area between the object and the touch-sensitive surface or a combination of a position and a position change of a contact point or area.

A contact point between the object and the touch-sensitive waveguide may be a part of a contact area or may be derived from a contact area, such as the geometric centre of a contact area. For example, the object may have a ring-shaped foot print; however, it is desired to determine the contact point as the geometric centre of the ring-shaped foot print.

The object may point in a direction towards the touch-sensitive surface that intersects the touch-sensitive surface at a virtual contact point different from the actual contact point. The determined contact point may be equal to the virtual contact point derived from the actual contact point. In general, the object and the touch-sensitive surface and the user may cooperate in such a way that determination of a virtual contact point different from the actual contact point is required.

In embodiments, e.g. the embodiment shown in FIG. 7, wherein a light beam emitted by the light source and propagating towards the detector array can only be disturbed by the object during propagation from the second light redirecting member to the first light redirecting member or from the fourth light redirecting member to the third light redirecting member, respectively, a contact point of the object contacting the touch-sensitive device may be determined by simple geometrical calculations, since a point of incidence on the detector array by a light beam having propagated from the second light redirecting member to the first light redirecting member corresponds to a specific x-coordinate while a point of incidence on the detector array by a light beam having propagated from the fourth light redirecting member to the third light redirecting member corresponds to a specific y-coordinate as previously explained with reference to FIG. 1.

In general, a specific point of incidence on the detector array corresponds to a specific propagation path of a light beam emitted by the light source towards the detector array in a one-to-one relationship. Thus, a decrease in the detected light intensity at a specific point on the detector array indicates that an object has disturbed light at a contact point somewhere along the corresponding light propagation path. The contact point may then be determined as a point of intersection between light propagation paths along which light has been disturbed by the object.

Thus, a contact point of the object contacting the touch-sensitive device may be determined by estimating a point of intersection of a number of propagation paths of light beams emitted by the light source towards the detector array corresponding to an intensity distribution of light that is incident on the detector array or a change of intensity distribution of light that is incident on the detector array.

A touch-sensitive device according to the present invention may be designed for one or more specific objects or one or more objects where relevant part(s) of the objects have a refractive index above a certain value, for example above the refractive index air, preferably above the refractive index of water. A touch-sensitive device according to the present invention may be designed to the object in such a way that any other member or medium in contact with the touch-sensitive surface is not disturbing the light guiding properties of the waveguide if the other member or medium has a refractive index lower than the object, such as approximately two, five, seven, ten, fifteen, or twenty percent lower. Furthermore, a touch-sensitive device according to the present invention may be designed for one or more objects where the relevant part of the object furthermore has a refractive index below a certain value so that light with large angles of incidence with relation to the touch-sensitive surface may remain undisturbed by the object contacting the touch-sensitive surface while light with lesser angles of incidence with relation to the touch-sensitive surface will be disturbed by the object contacting the touch-sensitive surface. In this case, the refractive index of the relevant part of the object is within a certain range.

Light is electromagnetic radiation within a wavelength range comprising wavelength(s) within the visible spectrum, the ultraviolet spectrum, and the infrared spectrum.

A waveguide according to the present invention is a member capable of confining and guiding light propagating within the member, i.e., capable of restricting the spatial region in which the light may propagate.

A waveguide according to the present invention may guide light from the light source towards the detector array partly, mainly, or solely by means of total internal reflection. Alternatively or additionally, a waveguide may guide light by means of reflections e.g. from one or more metallic surfaces.

A waveguide according to the invention comprises a core which is the volume of a waveguide within which light from the light source propagates.

A waveguide according to the invention may comprise a cladding or coating for covering at least a part of the core. For example, the surface opposite the touch-sensitive surface of the touch-sensitive device may be covered by a cladding preventing light from being coupled out of the device at the opposite surface.

It should be noted that the light guiding properties of the waveguide is determined by the interaction between the core of the waveguide and the medium surrounding the core, e.g. the interaction between the core of the waveguide and the optional cladding or coating and possibly the medium surrounding the core and the optional cladding or coating.

A waveguide according to the invention may comprise a substantially one-dimensional core known from an optical fibre. A one-dimensional waveguide structure is capable of restricting the propagation of guided light such that propagation substantially is possible only in one direction that extends along a longitudinal direction of the core.

A waveguide according to the invention may comprise a substantially two-dimensional core. Such a waveguide is known as a planar waveguide, which is a waveguide with a substantially planar geometry. A planar waveguide is capable of restricting the propagation of guided light such that propagation substantially is possible only in a two-dimensional plane.

Alternatively or additionally, a waveguide according to the invention may comprise a number of substantially one-dimensional cores for guiding light along a longitudinal extension of each of the one-dimensional cores. A waveguide according to the invention may have a substantially planar geometry with embedded grooves or channels for guiding light. A preferred embodiment of a waveguide according to the present invention comprises intersecting grooves or channels for guiding light. Preferably, intersecting grooves are substantially orthogonal.

Alternatively or additionally, a waveguide according to the invention may comprise a number of substantially two-dimensional cores.

A core of a waveguide according to the invention may comprise a volume of larger refractive index than the intended medium surrounding the waveguide. The intended medium surrounding the waveguide may comprise air, water, any other gas or liquid, a solid material, such as metal, or a mixture of any of the mentioned media. Alternatively or additionally, the intended medium surrounding the waveguide may comprise a vacuum. Preferably, the core has a substantially uniform refractive index. The medium surrounding the waveguide may comprise different media with different refractive indices.

A waveguide having a core with a higher refractive index than the medium surrounding the waveguide may be able to guide light by means of total internal reflection. The occurrence of total internal reflection is dependent on the angle of incidence relative to the surface in question and a relation between the refractive index of the core and the medium surrounding the core. It is a necessity that the medium surrounding the core has a lower refractive index than the core for total internal reflection to be possible at the boundary between the core and the surroundings.

The touch-sensitive waveguide may be utilized for sensing purposes by detecting a change in the refractive index of the medium surrounding the waveguide. The basic sensing principle of the touch-sensitive waveguide is to measure changes in the refractive index of the medium surrounding the waveguide preferably due to changes in the critical angle at an interface between the touch-sensitive surface and the medium surrounding the waveguide. Only changes in the medium surrounding the waveguide occurring within the evanescent field for a given possible total internal reflection are capable of influencing the critical angle. The evanescent field is limited to a given penetration depth from the interface beyond which interaction with the field may no longer be detected.

A device according to the invention may be configured for detecting changes in the properties of the light the detector array receives. Thus, static coating(s) may be ignored, whether a coating is intentional, e.g. applied during fabrication, or non-intentional, such as dirt or another type of deposit.

A method according to the invention for position encoding contact of the object may be combined with a method of recording a corresponding time. Alternatively or additionally, further parameters of the object, such as velocity, acceleration, rotation, etc., or any combination hereof may be determined.

A light redirecting member may redirect light partly, mainly, or solely by means of total internal reflection. Alternatively or additionally, a light redirecting member may redirect light by means of reflections e.g. by means of one or more metallic interfaces. Alternatively or additionally, a light redirecting member may redirect light by means of refraction, e.g. by means of one or more curved or otherwise refractive surfaces. Preferably, redirection of light by a light redirecting member involves changing the direction of propagation in a plane parallel to the touch-sensitive waveguide, e.g. the touch-sensitive surface.

As illustrated in FIGS. 5, 20, 23-25, and 34, light preferably converges towards the detector array when propagating from the first/third light redirecting member towards the detector array. Thus, the dimension of the detector array may be considerable smaller than the dimension of the first/third light redirecting member, i.e. the dimension of the detector array may be considerable smaller than the length/width of the touch sensitive surface.

It may be possible to perform a change of settings, such as a calibration, of a device according to the present invention. Such a calibration or change of settings may be for changing the sensitivity of the touch-sensitive waveguide to objects with different dielectric constants. Alternatively or additionally, such a calibration or change of settings may be for changing from which refractive index the device should be insensitive. This may e.g. be carried out by altering the resulting angle of incidence or span of angles of incidence of light propagating within the touch-sensitive device relative to a surface such as the touch-sensitive surface.

A light redirecting member may comprise a surface configured for changing the angle of redirected light, such that the redirected light changes its sensitivity to a contacting object.

A waveguide according to the present invention preferably comprises a dielectric material. A waveguide according to the invention may have a core comprising glass, plastic, a photonic crystal, a semiconductor, or any other material with one or more similar optical characteristics. Alternatively, a waveguide may comprise any combination of the above mentioned materials. Glass may be crown glass, such as BK7. Plastic may be acrylic glass (PMMA (polymethylmethacrylate)), polystyrene, polycarbonate, etc. A possible cladding or coating may be made from similar materials.

It is an advantage that a device according to the present invention may comprise a waveguide that is designed for a specific object, such as a specific stylus, such that some objects may disturb light within the device while other objects cannot.

A waveguide is preferably substantially plain. However, a waveguide may be curved. One or more surfaces of a waveguide are preferably substantially plane. Alternatively or additionally, one or more interfaces of a waveguide are preferably substantially plane.

A waveguide according to the present invention may comprise one or more transparent glass plates.

A waveguide may have a coating or cladding comprising metal. Alternatively or additionally, a waveguide may have a coating or cladding comprising a dielectric with a low refractive index, such as fluoropolymer, such as Teflon®. An optional coating or cladding may cover at least a part of a waveguide or substantially the main part of a waveguide. An optional coating or cladding preferably has a refractive index that is lower than the refractive index of a core of the waveguide in question. An optional coating may furthermore function as a layer of isolation between two or more waveguides. The optional layer of isolation may be a light insulating layer.

The touch-sensitive surface of the touch-sensitive waveguide according to the invention may be substantially plane. Alternatively or additionally, any other surface of any waveguide according to the invention may be substantially plane. Alternatively or additionally, a surface of a waveguide according to the invention may be curved or have curved part(s). The touch-sensitive surface may comprise a number of individual parts of surfaces. The touch-sensitive surface or part(s) of the touch-sensitive surface may have an optical coating, such as an antireflective coating. The optional optical coating may be configured for impedance matching the refractive index of the object with the refractive index of the touch-sensitive waveguide, i.e. matching the object to the core of the waveguide or a coating of the waveguide.

The touch-sensitive surface may have a substantially rectangular shape, a substantially circular shape, or any other shape.

A waveguide may have a thickness between 0.01 mm and 10 mm, such as between 0.2 mm and 1 mm. A waveguide may have a length between 1 cm and 200 cm, such as between 1 cm and 50 cm, such as between 2 cm and 10 cm. A waveguide may have a width between 1 cm and 200 cm, such as between 1 cm and 50 cm, such as between 2 cm and 10 cm.

A light redirecting member may comprise one or more segments for deflection, reflection, refraction, diffraction, focusing, defocusing, collimating, converging, diverging, or any combination of the mentioned segments or the like. Such a segment may comprise one or more, gratings, mirrors, lenses, prisms, diffractive elements, or any combination of the mentioned elements. All or some of these may be bevelled, facetted, concave, convex, etc. A light redirecting member may comprise materials with different refractive indices.

A light redirecting member or a surface thereof may comprise one or more segments, where a cross section of each segment substantially forms a part of a parabola projected onto a plane of a waveguide or another plane. Each of these parabola segments within a single light redirecting member may have a focus point substantially at either the light source or the detector array, or substantially at the projection of the light source, the detector array, or both the light source and the detector array onto the plane of the waveguide in question or the other plane. Thus, a light redirecting member or a surface thereof may have a shape that is similar to at least a part of a cross section of a surface of a Fresnel lens, such as a cross section along a radius of a circular Fresnel lens.

A light redirecting member may comprise a one-dimensional parabolic reflector i.e. a three-dimensional structure having a parabolic curvature in one dimension.

A light redirecting member may be at least partly coated. An optional coating may comprise metal. A light redirecting member may have at least one metal coated part.

A light source may comprise at least one LED (light-emitting diode), laser, laser diode, VCSEL (vertical-cavity surface-emitting laser), or any combination hereof. Furthermore, a light source may comprise at least one SMD (surface-mount device). A light source may be a single light source, or it may comprise a plurality of light sources. A light source may substantially be considered a point source, which may be provided by light passing through a pinhole, another small aperture, a lens, or any combination hereof. Light from a light source may be emitted continuously during use. Preferably, light from a light source is emitted in pulses.

Light from a light source may be launched or coupled into a waveguide with a well defined angle of incidence or within a well defined range of angles of incidence relative to a surface of the waveguide in question utilizing an optical system that may be included in a touch-sensitive device according to the invention. Light may be coupled into a waveguide at an end facet of a waveguide, preferably over a range of angles or several ranges of angle of light incidence. The light may be coupled out of a waveguide at an end facet of a waveguide. Light from a light source may be coupled into a waveguide in such a way that the light substantially is propagating parallel to the touch-sensitive surface.

Light from a light source may be coupled into the waveguide using a device such as a fibre. Thus, the light source may be situated at a distance from the area where light from the light source is coupled into the waveguide.

A light source may be situated immediately in front of a waveguide or a light source may be an integral part of a waveguide. Light from a light source may be coupled into the touch-sensitive waveguide from another waveguide, preferably via a light redirecting member. Furthermore, light may be coupled into one end of the touch-sensitive waveguide from another end of the touch-sensitive waveguide. Light having different angles or one or more span of angles in relation to the touch-sensitive surface, may be coupled into the waveguide. More than one light source may couple light into a waveguide.

A detector array may comprise at least one photodetector, image sensor, CMOS (complementary metal-oxide semiconductor) sensor, semiconductor detector, active-pixel sensor, charge-coupled device, charge injection device, or any combination of the mentioned detectors and sensors or the like. A detector array may be at least one-dimensional, e.g. two-dimensional. A detector array may comprise a lens, an aperture, an imaging element or the like in front of the detector array.

As illustrated in the FIGS. 1, 3-7, 12, 17, 20, 21, 23-25, 30, 32, and 34, the dimension of the detector array is preferably considerably smaller than the dimensions of the touch-sensitive surface. Furthermore, it is an important advantage of the present invention that for position encoding one or more touches generated by one or more objects only a single detector array unit may be needed for detection of the one or more touches.

A detector array may be situated immediately in front of one end of a waveguide or a detector array may be an integral part of the waveguide. Light from the light source may arrive at a detector array via another waveguide, preferably via a light redirecting member. Furthermore, light may arrive at a detector via another end of the touch-sensitive waveguide. Light having different angles or one or more span of angles in relation to the touch-sensitive surface, may arrive at a detector. A detector may detect incident light regardless of the angle of incidence. Alternatively, a detector may detect incident light only within one or more specific ranges of angles of incidence.

In a preferred embodiment total internal reflection is utilized for guiding light within the waveguide. If at least a part of the touch-sensitive surface has contact with the object, the object may disturb the reflection at the contact point. A disturbance may be due to the object with a sufficiently high refractive index causing the light to couple out of the waveguide at the contact point. A disturbance may be due to the object absorbing light from the evanescent field at a contact point. A disturbance may be due to the object scattering light from the evanescent field at a contact point. Further, a disturbance may be due to a combination of the mentioned disturbances. A disturbance may result in a drop in intensity of the reflected light from the contact point. This drop in intensity can be detected at a position on the detector array that corresponds to the light path passing the contact point. In a preferred embodiment at least two light paths pass through a given contact point leading to at least two intensity drops at the detector array.

In a preferred embodiment light from the light source is coupled into the touch-sensitive waveguide, in a way that at least part of the light form an angle with the touch-sensitive surface, that makes that part of the light insensitive to the object contacting the surface. The light from the light source, which is coupled into the touch-sensitive waveguide, is then guided undisturbed across the touch-sensitive waveguide towards a second light redirecting member. The second light redirecting member redirects part of the light through the touch-sensitive waveguide towards the first light redirecting member. Furthermore, the second light redirecting member may change the angle a light beam forms with the touch-sensitive surface upon redirection by the second light redirecting member towards the first light redirecting member, such that the object, such as a finger, is capable of disturbing at least a part of the light. The first light redirecting member redirects incident light and may change the angle a light beam forms with the touch-sensitive surface, in a way that makes that part of the light insensitive to the object contacting the surface. Preferably, water contacting the touch-sensitive surface is not capable of disturbing light that is guided by the touch-sensitive waveguide.

Two or more waveguides within a device according to the present invention may have substantially the same shape or may have one or more parts with substantially the same shape. The shape of two or more waveguides may substantially be a mirror image of each other or may have at least one part which is a mirror image of at least one part of another waveguide within a device according to the present invention. Alternatively or additionally, two or more waveguides within a device according to the present invention may be non-identical such as of different shapes.

Two or more waveguides within a device according to the present invention may comprise at least one similar material. Alternatively or additionally, two or more waveguides within a device according to the present invention may comprise different materials.

Two or more waveguides may be merged together or linked otherwise, such that they constitute a single plate comprising more than one core, channel, groove, or any combination hereof. Two or more waveguides may be made in one piece.

A touch-sensitive device according to the present invention may comprise a controller for taking predetermined action according to input from the detector array. The optional controller may have an option to switch from a first state to a second state.

A signal processor according to the present invention may be a microprocessor, a DSP (digital signal processor), a CPU (central processing unit) or any other device adapted for position encoding a contact point between the object and the touch-sensitive surface of a device according to the present invention. A signal processor may be adapted for calculations in real time.

A touch-sensitive device according to the present invention may comprise one or more microstructures for displaying information to a user. The one or more microstructures may display information to a user by redirecting light illuminated on the one or more microstructures. Such one or more microstructures may comprise any number or combination of diffractive elements, holographic elements, or any combination hereof. One or more microstructures may be integrated, combined, interconnected, or otherwise combined with a waveguide, such as situated on a surface thereof. A microstructure may be illuminated by light emitted by the light source. Alternative, or additionally, a microstructure may be illuminated by another light source or other light sources. One or more light sources may illuminate more than one microstructure.

A microstructure may provide a visualization of a button or a similar device for virtual interaction with a virtual button by contacting the touch-sensitive surface with the object.

Any waveguide may be connected to any other waveguide or waveguides, such as being integrated with, combined with, stacked with, interconnected to, or any combination hereof.

Any light redirecting member may be connected to any other light redirecting member or light redirecting members, such as being integrated with, combined with, interconnected to, or any combination hereof.

Any light redirecting member may be connected to any waveguide or waveguides, such as being integrated with, combined with, interconnected to, or any combination hereof.

The light source may be connected to any waveguide or waveguides, such as being integrated with, combined with, stacked with, interconnected to, or any combination hereof.

The light source may be connected to any light redirecting member or light redirecting members, such as being integrated with, combined with, interconnected to, or any combination hereof.

The detector array may be connected to any waveguide or waveguides, such as being integrated with, combined with, stacked with, interconnected to, or any combination hereof.

The detector array may be connected to any light redirecting member or light redirecting members, such as being integrated with, combined with, interconnected to, or any combination hereof A touch-sensitive device according to the present invention may be used in a number of applications. These may include any of the following: a touch pad, a touch screen, a computer, a mobile phone, a portable music player, a remote control, a keyboard, a combination of any of the mentioned, or any other handheld device or non-handheld device. A touch-sensitive device according to the invention may be situated in front of a display. Alternatively or additionally, a touch-sensitive device may be an integrated part of a display. Alternatively or additionally, a touch-sensitive device according to the invention may form a display.

A touch-sensitive device according to the present invention may be used together with one or more mechanical buttons, where a part of at least one button may be capable of being pressed against the touch-sensitive surface according to the invention. This interaction may for instance be utilized in a computer, a mobile phone, a portable music player, a remote control, a keyboard, any other device comprising at least one button, or any combination of the mentioned.

In a preferred embodiment, position encoding the object contacting a touch-sensitive surface is based on the absence or reduction of light reflected from a contact point.

In one embodiment, a touch-sensitive device according to the present invention is designed for the object having a lower refractive index than the intended surrounding medium. In one embodiment, a touch-sensitive device according to the present invention is designed for an object with mirror-like properties.

Light, which converges from a first light redirecting member may start to diverge before the light is incident upon a detector array, e.g. due to a placement of the detector array behind the focal point of the light converging from the first light redirecting member.

Items

1. A touch-sensitive device (2), comprising:
    a light source (4) for emitting light (6),
    a touch-sensitive waveguide (8) configured for guiding light (6) from the light source (4) towards a touch-sensitive surface (30) of the touch-sensitive waveguide (8) in such a way that an object disturbs at least a part of the guided light (6) at a contact point (32) where the object contacts the touch-sensitive surface (30),
    a detector array (20) configured for detecting intensity distribution of light (6) having propagated from the light source (4) through the touch-sensitive waveguide (8) for position encoding the contact point (32) between the object and the touch-sensitive surface (30), and
    a first light redirecting member (14) configured for redirecting light (6) having propagated from the light source (4) through the touch-sensitive waveguide (8) and to the first light redirecting member (14) towards the detector array (20), wherein
    at least a part of the light (6) propagating towards a specific point of the detector array (20) is prevented from being incident upon the specific point of the detector array (20) when the object contacts the touch-sensitive surface (30) at a corresponding specific contact point (32).
2. A touch-sensitive device (2) according to item 1, wherein the touch-sensitive waveguide (8) is a planar waveguide.
3. A touch-sensitive device (2) according to item 1 or 2, wherein the touch-sensitive waveguide (8) furthermore is configured for guiding light (6) that has been redirected and converged towards the detector array (20) by the first light redirecting member (14) towards the detector array (20).
4. A touch-sensitive device (202) according to item 1 or 2, comprising a first transmitter waveguide (236) configured for guiding light (206) that has been redirected and converged towards the detector (220) array by the first light redirecting member (214) towards the detector array (220).
5. A touch-sensitive device (202) according to item 4, wherein the first transmitter waveguide (236) is a planar waveguide.
6. A touch-sensitive device according to item 4 or 5, wherein the touch-sensitive waveguide (208) and the first transmitter waveguide (236) are stacked.
7. A touch-sensitive device (102) according to any of the previous items, comprising a second light redirecting member (112) configured for redirecting incident light (106a) from the light source (104) through the touch-sensitive waveguide (108) which is configured for guiding at least a part of the redirected light (106b) towards the first light redirecting member (114) which is configured for redirecting and converging at least a part of the incident light (106b) towards the detector array (120).
8. A touch-sensitive device (102) according to item 7, wherein the touch-sensitive waveguide (108) furthermore is configured for guiding light (106a) from the light source (104) towards the second light redirecting member (112) which is configured for redirecting at least a part of the incident light (106a) back through the touch-sensitive waveguide (108) which is configured for guiding at least a part of the redirected light (106b) towards the first light redirecting member (114) which is configured for redirecting and converging at least a part of the incident light (106*b*) towards the detector array (120).

9. A touch-sensitive device (202) according to item 7 as dependent on any of the items 4-6, wherein the first transmitter waveguide (236) furthermore is configured for guiding light (206*a*) from the light source (204) towards the second light redirecting member (212) which is configured for redirecting at least a part of the incident light (206*a*) through the touch-sensitive waveguide (208) which is configured for guiding at least a part of the redirected light (206*b*) towards the first light redirecting member (214) which is configured for redirecting and converging at least a part of the incident light (206*b*) towards the detector array (220).

10. A touch-sensitive device (302) according to item 7, comprising a second transmitter waveguide (338) configured for guiding light (306) from the light source (304) towards the second light redirecting member (312) which is configured for redirecting at least a part of the incident light (306) through the touch-sensitive waveguide (308) which is configured for guiding at least a part of the redirected light (306) towards the first light redirecting member (314) which is configured for redirecting and converging at least a part of the incident light (306) towards the detector array (320).

11. A touch-sensitive device (302) according to item 10, wherein the second transmitter waveguide (338) is a planar waveguide.

12. A touch-sensitive device (302) according to item 10 or 11, wherein the touch-sensitive waveguide (308) and the second transmitter waveguide (338) are stacked.

13. A touch-sensitive device (2) according to any of the previous items, wherein light (6) emitted by the light source (4) is modulated.

14. A touch-sensitive device (2,1502) according to any of the previous items, comprising a signal processor (1574) adapted for position encoding the contact point (32) between the object and the touch-sensitive waveguide (8).

15. A touch-sensitive device (2,1502) according to item 14, wherein the signal processor (1574) furthermore is adapted for calculating a contact area between the object and the touch-sensitive waveguide (8).

16. A touch-sensitive device (2,1502) according to item 14 or 15, wherein the signal processor (1574) furthermore is adapted for calculating a velocity between the object and the touch-sensitive waveguide (8).

17. A touch-sensitive device (2,1502) according to any of the items 14-16, wherein the signal processor (1574) furthermore is adapted for calculating an acceleration between the object and the touch-sensitive waveguide (8).

18. A touch-sensitive device (102) according to any of the previous items, wherein at least a part of the touch-sensitive surface (130) comprises an optical coating (131).

19. A touch-sensitive device (102) according to item 18, wherein the optical coating (131) is an anti-reflective coating.

20. A touch-sensitive device (2) according to any of the previous items, wherein light (6) from the light source (4), which light (6) is guided by the touch-sensitive waveguide (8), has an angle of incidence relative to the touch-sensitive surface (30), such that the light (6) is not disturbed by water contacting the touch-sensitive surface (30).

21. A touch-sensitive device (2) according to any of the previous items, wherein light (6) from the light source (4), which light (6) is guided by the touch-sensitive waveguide (8), has an angle of incidence relative to the touch-sensitive surface (30), such that the light (6) is not disturbed by a material contacting the touch-sensitive surface (30) which material has a lower refractive index than the object, such as approximately five percent lower.

22. A touch-sensitive device (2) according to any of the previous items, wherein the first light redirecting member (14) comprises at least one reflecting part (16).

23. A touch-sensitive device (2) according to any of the previous items, wherein the first light redirecting member (14) comprises at least one facetted element (14).

24. A touch-sensitive device (2) according to any of the previous items, wherein the first light redirecting member (14) comprises at least one concave element (16).

25. A touch-sensitive device (102) according to any of the previous items, wherein the first light redirecting member (114) comprises at least one bevelled element (116).

26. A touch-sensitive device (2) according to any of the items 23-25, wherein the at least one element is a mirror.

27. A touch-sensitive device (2) according to any of the previous items, wherein the first light redirecting member (14) comprises at least one diffraction grating.

28. A touch-sensitive device (202) according to any of the previous items, wherein a waveguide (208) comprises a layer (244) having a lower refractive index than a core of the waveguide (208).

29. A touch-sensitive device (202) according to item 28, wherein the layer (244) comprises a fluoropolymer.

30. A touch-sensitive device (1302) according to any of the previous items, comprising at least one microstructure (1364) configured for redirecting light through the touch-sensitive surface (30) for displaying information to a user (1370).

31. A touch-sensitive device (1302) according to item 30, wherein the at least one microstructure (1364) is embedded in a waveguide (1366) situated behind the touch-sensitive waveguide (8), where light redirected by the at least one microstructure is propagating through the touch-sensitive waveguide and through the touch-sensitive surface for displaying information to the user (1370).

32. A touch-sensitive device (102) according to any of the previous items, wherein the first light redirecting member (114) comprises a reflective surface (116) having an angle within 60°-89° relative to the touch-sensitive surface (130), such as an angle within 70°-86°, such as an angle around 81°.

33. A touch-sensitive device (1602) according to any of the items 4-32, wherein the first transmitter waveguide includes a number of substantially one-dimensional cores (1676) for guiding light along a longitudinal extension of each of the one-dimensional cores (1676).

34. A touch-sensitive device (1702) according to any of the previous items, wherein the touch-sensitive waveguide has a substantially planar geometry with embedded grooves or channels (1778) for guiding light.

35. A touch-sensitive device (1702) according to the preceding item, wherein at least some of the embedded grooves or channels (1778) for guiding light are intersecting.

36. A touch-sensitive device (1702) according to the preceding item, wherein the intersecting grooves or channels (1778) for guiding light are substantially orthogonal.

37. A method of position encoding an object contacting a touch-sensitive surface (30), the method comprising:
    emitting light (6) from a light source (4),
    guiding light (6) from the light source (4) towards the touch-sensitive surface (30) of the touch-sensitive waveguide (8), using a touch-sensitive waveguide (8), in such a way that the object disturbs at least a part of the guided light (6) at a contact point (32) where the object contacts the touch-sensitive surface (30), detecting, using a detector array (20), intensity distribution of light (6) having propagated from the light source (4) through the touch-sensitive waveguide (8) for position encoding the contact point (32) between the object and the touch-sensitive surface (30), and redirecting light (6) having propagated from the light source (4) through the touch-sensitive waveguide (8) and to the first light redirecting member (14) towards the detector array (20) using a first light redirecting member (14), wherein at least a part of the light (6) propagating towards a specific point of the detector array (20) is prevented from being incident upon the specific point of the detector array (20) when the object contacts the touch-sensitive surface (30) at a corresponding specific contact point (32).

What is claimed is:

1. A touch-sensitive device, comprising:
a light source for emitting light into a touch-sensitive waveguide, the touch-sensitive waveguide comprising side parts and a touch-sensitive surface extending between the side parts of the touch-sensitive waveguide, the touch-sensitive waveguide being configured for guiding light from the light source towards the touch-sensitive surface of the touch-sensitive waveguide in such a way that at least part of the guided light may be disturbed by an object at a contact point where the object contacts the touch-sensitive surface,
a detector array configured for detecting intensity distribution of light having
propagated from the light source through the touch-sensitive waveguide for position encoding the contact point between the object and the touch-sensitive surface, and
a first light redirecting member and a second light redirecting member included in at least two of the side parts of the touch-sensitive waveguide, the first light redirecting member and the second light redirecting member being configured for redirecting light having propagated from the light source through the touch-sensitive waveguide and to at least one of the light redirecting members towards the detector array, such that the redirection of light involves changing the direction of propagation in a plane parallel to the touch-sensitive surface, such that light from the first redirecting member and second redirecting member is incident on the detector array at different angles, the angles being defined in the plane parallel to the touch-sensitive surface, wherein
at least a part of the light propagating towards a specific point of the detector array is prevented from being incident upon the specific point of the detector array when the object contacts the touch-sensitive surface at a corresponding specific contact point.

2. The touch-sensitive device according to claim 1, wherein the light redirected by the two different light redirecting members is distinguished from each other at the detector.

3. The touch-sensitive device according to claim 1, wherein the light source is a single light source.

4. The touch-sensitive device according to claim 1, wherein the light source is positioned at one corner of the device.

5. The touch-sensitive device according to claim 1, wherein the detector is a single detector.

6. The touch-sensitive device according to claim 4, wherein the detector is positioned at another corner of the device opposite the light source.

7. The touch-sensitive device according to claim 1, wherein the first light redirecting member and the second light redirecting member are opposite each other.

8. The touch-sensitive device according to claim 1, wherein the first light redirecting member and the second light redirecting member intersect in one corner of the device.

9. The touch-sensitive device according to claim 1, wherein the device further comprises a third light redirecting member and a fourth light redirecting member included in at least additional two of the side parts of the touch-sensitive waveguide, at least one of the third light redirecting member and the fourth light redirecting member being configured for redirecting light having propagated from the at least first redirecting member and second redirecting member through the touch-sensitive waveguide and towards the detector array.

10. The touch-sensitive device according to claim 1, wherein the touch-sensitive waveguide is a planar waveguide.

11. A method of position encoding an object contacting a touch-sensitive surface, the method comprising:
emitting light from a light source into a touch-sensitive waveguide comprising side parts and the touch-sensitive surface extending between the side parts of the touch-sensitive waveguide,
guiding light from the light source towards the touch-sensitive surface of the touch-sensitive waveguide, using the touch-sensitive waveguide, in such a way that at least part of the guided light may be disturbed by the object at a contact point where the object contacts the touch-sensitive surface,
detecting, using a detector array, intensity distribution of light having propagated from the light source through the touch-sensitive waveguide for position encoding the contact point between the object and the touch-sensitive surface, and
redirecting light having propagated from the light source through the touch-sensitive waveguide and to a first light redirecting member and a second light redirecting member included in at least one of the side parts of the touch-sensitive waveguide towards the detector array using at least one of the first light redirecting member and the second light redirecting member, such that the redirected light changes the direction of propagation after having propagated in the waveguide, whereby light from the first redirecting member and second redirecting member is incident on the detector array at different angles, the angles being defined in the plane parallel to the touch-sensitive surface, wherein
at least a part of the light propagating towards a specific point of the detector array is prevented from being incident upon the specific point of the detector array when the object contacts the touch-sensitive surface at a corresponding specific contact point and with the redirecting members configured so that at least part of the guided light after having been redirected by the redirecting members changes between being prevented from being disturbed and being disturbed by the object at a contact point.

* * * * *

UNITED STATES PATENT AND TRADEMARK OFFICE
CERTIFICATE OF CORRECTION

Page 1 of 1

PATENT NO. : 9,740,336 B2
APPLICATION NO. : 15/153626
DATED : August 22, 2017
INVENTOR(S) : Michael Linde Jakobsen, Vagn Steen Gruner Hanson and Henrik Chresten Pedersen It is certified that error appears in the above-identified patent and that said Letters Patent is hereby corrected as shown below:

On the Title Page

Add item --(30) Foreign Application Priority Data: Jan. 11, 2008 (DK)............PA200800051--

Signed and Sealed this
Twenty-fourth Day of October, 2017

Joseph Matal
*Performing the Functions and Duties of the
Under Secretary of Commerce for Intellectual Property and
Director of the United States Patent and Trademark Office*